United States Patent [19]

Meurer

[11] Patent Number: 4,933,524
[45] Date of Patent: Jun. 12, 1990

[54] CLARIFIER APPARATUS AND METHODS WITH 3-D ARRAYS

[75] Inventor: Charles L. Meurer, Golden, Colo.

[73] Assignee: Envirotech Corporation, Salt Lake City, Utah

[21] Appl. No.: 325,274

[22] Filed: Mar. 16, 1989

Related U.S. Application Data

[63] Continuation-in-part of Ser. No. 207,987, Jun. 17, 1988, Pat. No. 4,865,753.

[51] Int. Cl.⁵ .............................................. B01D 21/02
[52] U.S. Cl. ..................................... 210/739; 210/802; 210/109; 210/521; 210/522
[58] Field of Search .................... 210/232, 242.1, 521, 210/522, 523, 525, 247, 109, 739, 802

[56] References Cited

U.S. PATENT DOCUMENTS

| | | | |
|---|---|---|---|
| 2,878,935 | 3/1959 | Magrath et al. | 210/82 |
| 3,077,987 | 2/1963 | Morimoto | 210/77 |
| 3,399,135 | 8/1968 | Conley et al. | 210/42 |
| 3,471,025 | 10/1969 | Dobson | 210/282 |
| 3,491,892 | 1/1970 | McCann | 210/521 |
| 3,613,889 | 10/1971 | Reed | 210/84 |
| 3,837,501 | 9/1974 | Pielkenwood | 210/522 |
| 3,894,955 | 7/1975 | Forsell | 210/522 |
| 3,903,000 | 9/1975 | Miura et al. | 210/522 |
| 3,925,205 | 12/1975 | Sparham | 210/73 |
| 3,951,818 | 4/1976 | Bosnjak | 210/522 |
| 3,963,624 | 6/1976 | Henderson et al. | 210/521 |
| 3,975,276 | 8/1976 | Schmid | 210/521 |
| 4,054,520 | 10/1977 | McGivern | 210/122 |
| 4,056,477 | 11/1977 | Ravitts | 210/522 |
| 4,071,445 | 1/1978 | Katayama et al. | 210/23 |
| 4,089,782 | 5/1978 | Huebner | 210/206 |
| 4,120,796 | 10/1978 | Heubner | 210/522 |
| 4,120,797 | 10/1978 | Heubner | 210/522 |
| 4,246,118 | 1/1981 | Tada et al. | 210/275 |
| 4,391,703 | 7/1983 | Crosby | 210/151 |
| 4,446,027 | 5/1984 | Simmers | 210/661 |
| 4,514,303 | 4/1985 | Moore | 210/521 |
| 4,526,691 | 7/1985 | Melis et al. | 210/521 |
| 4,547,286 | 10/1985 | Hsiung | 210/738 |
| 4,559,141 | 12/1985 | Gyulavari | 210/521 |
| 4,591,437 | 5/1986 | Ernryd et al. | 210/265 |
| 4,608,181 | 8/1986 | Hsiung et al. | 210/786 |

*Primary Examiner*—W. Gary Jones
*Assistant Examiner*—Christopher Upton
*Attorney, Agent, or Firm*—Steve Rosenblatt

[57] ABSTRACT

A clarifier basin is provided with upflow channels for removing solids from liquid that flows up the channels. The channels are defined by pairs of spaced sheets. Each sheet is provided with three-dimensional (3D) members, such as spherical bubbles or ellipsoids, that are in a two-dimensional array or regular pattern. The sheets are positioned closely adjacent to each other so that the 3D members on one sheet nest with the 3D members of the adjacent sheet to form interstices that collect the solids. The sheets are movable to enlarge the interstices so that air bubbles can flow up a selected channel and remove the solids for collection by a reservoir located above the selected channel. An air supply and the reservoir traverse the channels to remove the solids from the channels on a one-by-one basis.

70 Claims, 35 Drawing Sheets

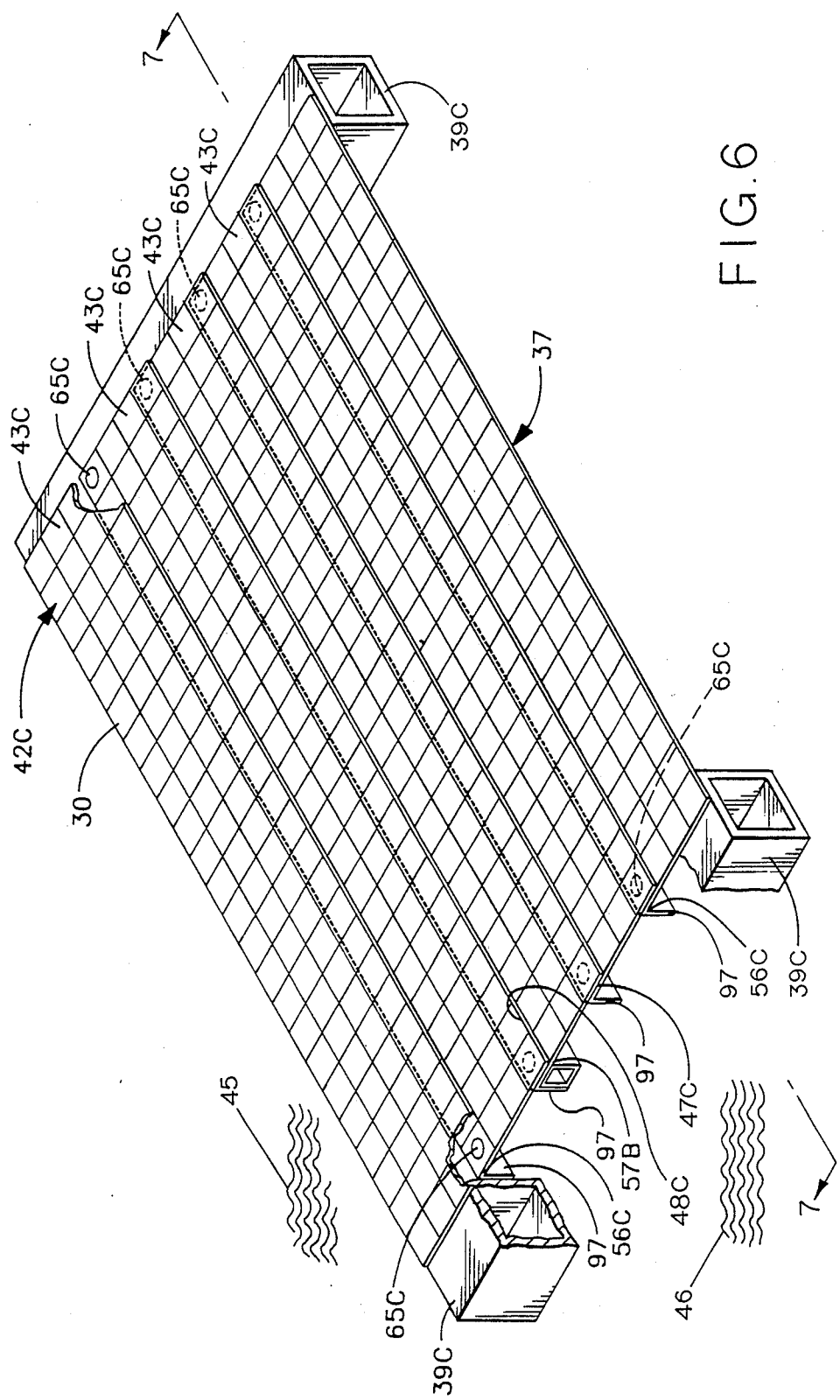

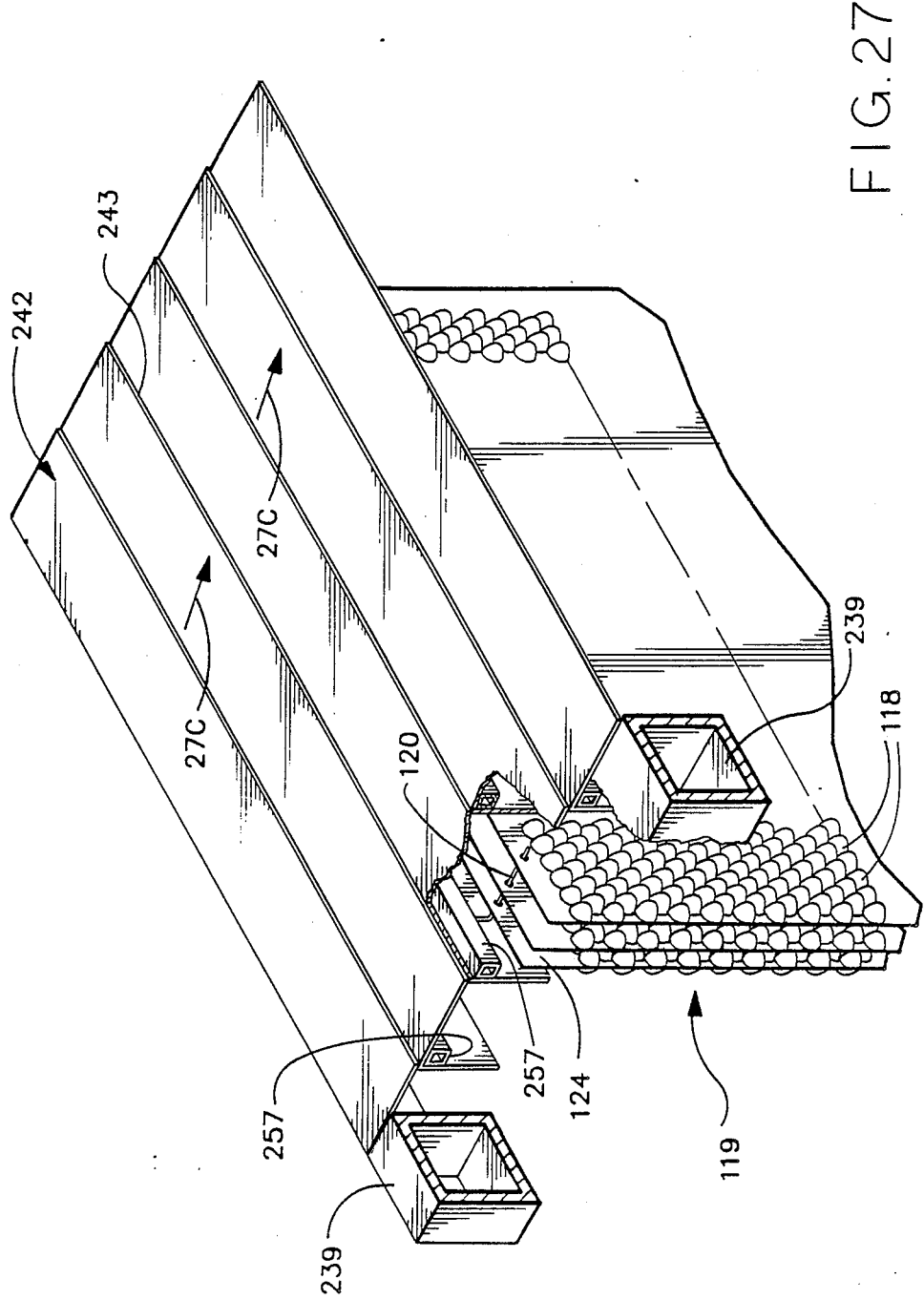

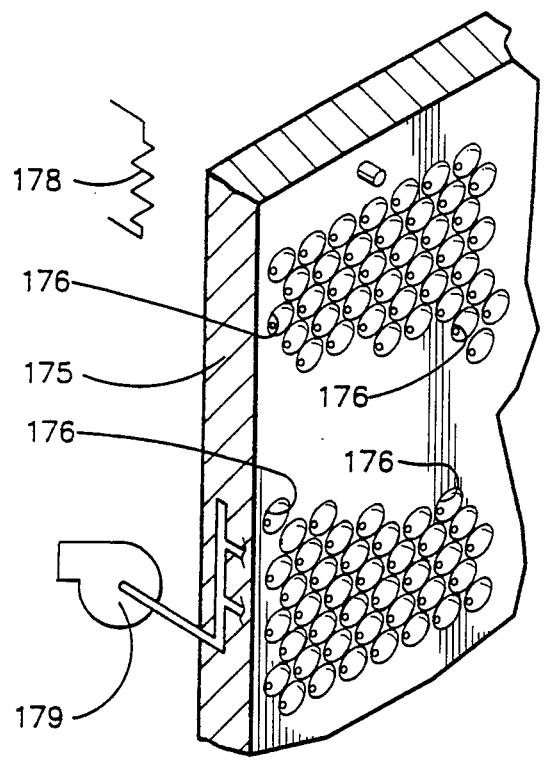
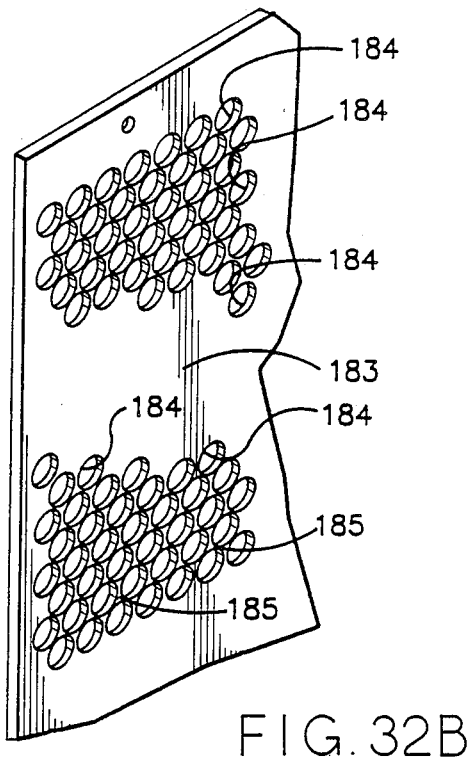
FIG. 32A
FIG. 32B
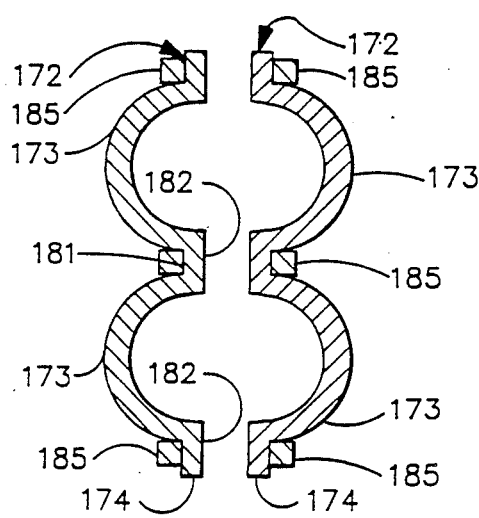
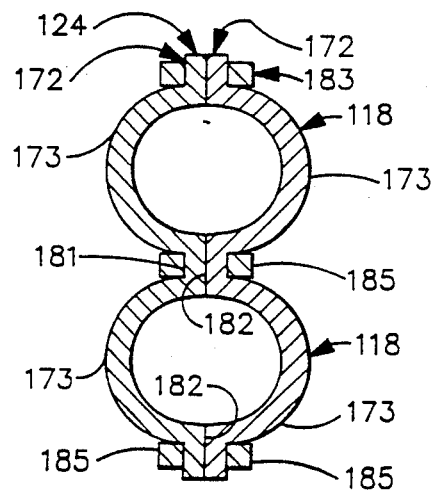
FIG. 32C
FIG. 32D

CLARIFIER APPARATUS AND METHODS WITH 3-D ARRAYS

REFERENCE TO EARLIER FILED APPLICATION

This Application is a continuation-in-part of application Ser. No. 07/207,987 filed June 17, 1988 for Apparatus and Methods For Liquid Treatment by C. L. Meurer, now U.S. Pat. No. 4,865,753.

BACKGROUND OF THE INVENTION

1. Field of the Invention

This invention relates to liquid treatment and more particularly to controlling the flow of particle-laden water to promote particle removal in water and waste water clarification systems.

2. Description of the Prior Art

Clarifiers are used to remove certain materials or particles from liquid. These materials are generally suspended in the liquid. Clarifiers are generally designed to remove these materials under the force of gravity when the flow of the liquid is substantially reduced, as in a very low flow, or quiescent, zone in the clarifier. Since these materials are generally solid and are said to "settle" out of the liquid, they are referred to as "settleable solids". Such settleable solids may include naturally occurring materials (e.g., clay, silts, sand and dirt), chemical precipitants and biological solids.

Clarifiers are used, for example, in water and waste water treatment plants. In water treatment the water drawn from a water supply has various non-settleable colloidal solids therein. When mixed with chemicals, the colloidal solids and the chemicals agglomerate to form solids. In waste water treatment, the solids include organic solids and biological solids, among other wastes. The solids in water and waste water treatment plants range in size and have densities that are essentially the same as water. The solids having a density somewhat greater than that of water will settle under the force of gravity (and are referred to as settleable solids). The solids having a density equal to that of water will not settle (and are referred to as poorly settleable or non-settleable). Reference herein to "both types of solids" includes both settleable and non-settleable solids. The word "solids" as used herein to describe the present invention refers to such settleable solids unless the context indicates otherwise or unless a distinction is made between settleable solids and poorly settling or non-settleable solids. The word "liquid" as used herein to describe the present invention refers to water and waste water.

Water and waste water have been treated in clarifiers to remove the settleable solids. Loose filter media have been used to remove the non-settleable solids, in an attempt to make the water clear and suitable for use or reuse.

An object of water and waste water clarifiers is to create quiescent zones having very low flow rates to promote maximum settlement of the settleable solids to the bottom of the clarifiers. Clarifiers typically include a large detention basin where the settlement of the solids occurs. Tubes or flat sheets mounted at fixed or variable angles relative to the upper surface of the liquid have been used to form multiple, thin liquid flow paths and create quiescent zones within the detention basin in an attempt to promote settling of solids. Plates have also been mounted within the detention basins at fixed or variable angles relative to the upper surface of the liquid. Fixed plates have been constructed out of relatively heavy single sheets of metal or plastic that are supported on their sides and connected to the sidewalls of self-contained modules positioned within the detention basins. Alternatively the tops of such plates have been fixed and a frame attached to the bottoms of such plates is moved to adjust the angle of the plates relative to the upper surface of the liquid.

The clarifiers are designed in an attempt to have the liquid containing the solids flow upwardly between the plates or tubes at flow rates that allow sufficient time for most of the solids to settle onto the plates or tubes. Ideally the solids then slide down the plates or tubes to the bottom of the detention basin for collection, and clarified liquid flows out of the openings between and at the top of the plates or tubes.

Prior art clarifiers have also used loose, buoyant and non-buoyant filter media to trap both types of solids suspended in the liquid. For example, such media has been between 1.5 and 20 mm in diameter and has been used in the form of loose polypropylene pellets. When the loose pellets are buoyant they have been prevented from flowing with the liquid by screens positioned across the flow path. The flowing liquid urges the loose pellets against the screen to form a bed.

To remove both types of solids from the bed of loose pellets, air scouring systems have been provided. These include pipes mounted at fixed positions below the pellets. After the liquid level in the clarifier has risen to an abnormal level, air flows from the fixed pipes, through the loose pellets, expands the bed of pellets and removes both types of solids from the pellets. Both types of solids are collected in an upper trough that is effective only when the liquid level is abnormally high for cleaning the pellets.

Loose, non-buoyant media has also been used with screens and is cleaned in a similar manner using abnormally high liquid levels.

In other embodiments of loose buoyant filter media, various sized spheres have been loosely provided below screens that prevent the spheres from floating out of the clarifier. The larger spheres have been at the bottom of a layer of such sphere and the relative buoyant forces on the spheres are relied on to maintain a continuous gradation of the sizes of the spheres in the filter.

Other clarifiers have used sand beds as filters. Complex mechanisms have been used to remove part of the sand from the bed, clean it and then return the cleaned sand to the bed.

Prior art clarifiers have also included some type of weir or trough extending across, or along the sides of, the detention basins. Such weirs or troughs are effective to form a relatively thick (e.g., two feet) layer of partially clarified liquid on top of the plates or tubes. The weight of such weirs or troughs necessitates additional support within or surrounding the detention basin, adding to the weight and expense of the clarifiers. In general, the liquid flowing from the tubes or plates into this thick layer is subject to changes in flow rate due to random variations in the upward flow of the liquid through different ones of the quiescent zones of the clarifier. This thick layer is used to diffuse the flow of the liquid from the quiescent zones to the weirs, rendering the flow of the liquid more uniform as the liquid enters the weirs that are at the perimeter of the basin or that extend across the basin.

SUMMARY OF THE INVENTION

Applicant has studied prior clarifiers in an endeavor to improve the removal of both types of solids while reducing the weight and cost of such clarifiers. Such studies indicate that both types of solids are often disturbed by random movements of the liquid within a clarifier. These random movements are caused by temperature gradients, surface disturbances and channelling currents within the clarifier. Parallel plates mounted at a fixed angle relative to the surface of the liquid have been used in an attempt to increase the settlement of solids within the clarifiers. It has been found, however, that the rate of liquid upflow in a channel between two adjacent fixed plates varies depending upon such random liquid movements. As a result, the amount of settling of the solids in the quiescent zone formed by such channel varies with such random liquid movements.

In addition problems have been observed using the loose buoyant or loose non-buoyant filter media. Such media is inherently loose and subject to flowing away with the liquid to be clarified. Further, others indicate a need to increase liquid levels in prior art clarifiers during cleaning of such loose media. This detracts from the normal clarifier operation. Such normal clarifier operation is also interrupted when the entire media bed is subject to air flow to expand the entire media bed. Further, such loose filter beds need frequent cleaning since settleable solids that become trapped in such beds tend to clog the beds unless cleaned frequently. Also, when the buoyant filter media is in the form of small chips of buoyant material, the chips become covered with the solids that are removed from the liquid. The covering of the chips by the solids renders the chips non-buoyant and they sink to the bottom of the clarifier, reducing the the filter bed. If a screen is placed below the bed to prevent such sinking, the openings of the screen must be small enough to retain the chips. As a result, the solids easily clog the small openings and require frequent cleaning.

The present invention seeks to overcome these long-felt problems by providing methods of and apparatus for equalizing the liquid flow within all of the quiescent zones of a clarifier. The present invention promotes this equalized flow using lightweight lamina in place of the heavy plates of the prior art. The equalized flow is further reduced in speed by providing an array of relatively large, three-dimensional ("3D") media in each flow channel.

In contrast to prior art metal plates that often have sharp edges and that are therefore difficult to remove for cleaning, it is a general object of the present invention to provide light, strong and flexible lamina, having integral protuberances thereon in a 3D array for providing interstices for collecting both types of solids and promoting clarification of the liquid while minimizing the problems found in prior art clarifiers.

Consistent with the general object, the present invention provides a sequence of clarifier action, in which lamina settle the settleable solids and 3D arrays remove the non-settleable solids from the partially clarified liquid.

A further object of the present invention is to provide methods of and apparatus for clarifying liquid, wherein a horizontal planar flow control deck overlies pairs of parallel lamina and 3D arrays are provided between the pairs of lamina so that the liquid flow is quiescent in zones between such pairs of lamina.

Another object of the present invention is to provide methods of and apparatus for changing the angle of inclination of parallel lamina of a clarifier to control the nesting of 3D protuberances provided on such lamina or on sheets between such lamina so as to promote greater removal of both types of solids suspended in liquid.

An additional object of the present invention is to provide improved clarification of liquid by using a submerged planar flow control deck positioned near the surface of the liquid, in conjunction with arrays of three-dimensional media below the deck.

Yet another object of the present invention is to provide methods of and apparatus for clarifying liquid in underground detention basins having limited openings for installing plates or other barriers, wherein the barriers of the present invention are in the form of lamina rolled into cylinders for insertion into such basins through small access openings.

A still further object of the present invention is to provide methods of and apparatus for clarifying water and waste water wherein parallel lamina are connected to a horizontal planar flow controller, and protuberances are provided on such lamina or on sheets between such lamina to promote slow, uniform flow of clarified water in channels provided under the planar flow controller.

A related object of the present invention is to provide an adjustment mechanism for parallel lamina within a clarifier so that the lamina can be disengaged and easily removed for cleaning.

A yet additional object of the present invention is to provide clarifier apparatus that can be supported by floating structures.

It is an object of the present invention to provide methods of and apparatus for clarifying liquid wherein flexible parallel lamina are connected to a submerged adjustment mechanism that can be selectively moved to control the nesting of bubbles provided in 3D arrays mounted between such lamina to promote removal of both types of solids from the liquid and cleaning of both types of solids from the parallel lamina and the bubbles.

It is another object of the present invention to provide apparatus for water and waste water clarification which is relatively easy to install so that retrofitting of an existing clarifier is commercially feasible.

It is a further object of the present invention to provide a clarifier for liquid that is relatively light in weight, inexpensive and requires minimal structural support.

It is an additional object of the present invention to provide methods of and apparatus for water clarification that utilize a woven, metal or plastic, lamina that is provided with protuberances that nest with other protuberances on other lamina, where all of the lamina are suspended in a detention basin to form quiescent zones.

It is still another object of the present invention to provide methods of and apparatus for clarifying liquid Wherein unitary barriers perform both the function of removal of both types of solids as well as the flow regulation function in a clarifier.

It is still a further object of the present invention to provide improved methods of and apparatus for clarifying liquid within a circular detention basin.

Related to the above objects, it is an object of the present invention to provide an air supply under a pair of lamina and to provide arrays of three-dimensional members between adjacent lamina of the pair, with the air supply travelling under successive pairs of the lamina and a solids collection device travelling above the lamina and the air supply.

Also related to the above objects, an object of the present invention is to provide woven hanging lamina that are selectively moved into a bent position to form upper and lower quiescent zones, with a 3D array being provided in each upper quiescent zone for removing non-settleable solids from liquid.

With these and other objects in mind the present invention relates to methods of and apparatus for clarifying liquid. The apparatus for clarifying the liquid is used in a detention basin for containing the liquid and solids suspended therein. The basin receives a flow of the liquid and the solids suspended therein. The basin is divided into upper and lower sections. A plurality of two-dimensional ("2D") arrays of 3D members extend downwardly from the upper section. Adjacent ones of the 2D arrays are positioned to close-pack or nest the 3D members of the adjacent 2D arrays and define a 3D array having interstices for reducing the flow rate of the liquid flowing from the lower section to the upper section.

In the preferred embodiment of the 3D arrays, the detention basin is also provided with flexible, inclined lamina. The 2D arrays of the 3D members are located between the lamina to form quiescent zones in which the liquid flow is reduced so that both types of solids carried by the liquid are separated from the liquid. The lamina are suspended in the basin in parallel relationship, with the angle at which the lamina are inclined being adjustable by a submerged adjustment mechanism. Adjacent pairs of the parallel lamina form each quiescent zone, which is effective as a separate inclined settling or solids removal channel. The 2D arrays are provided in the upper end of each quiescent zone. The 3D members of the 2D arrays become nested as the angle of the lamina is selectably changed, so that interstices are formed in the quiescent zones.

Each channel is open at the bottom to receive the liquid laden with both types of solids. The upper end of each settling channel is closed by the cooperation of flap members, one of which extends horizontally from a vertex adjacent the top of each lamina. Each lamina is supported at the vertex leaving that flap member free to flex or otherwise allow the opposite edge of the flap member to move vertically in response to the upward flow of liquid in the solids removal channel. In combination, the flap members form a flow control deck that promotes uniform liquid flow through all of the solids removal channels. This embodiment can be installed in detention basins having square, rectangular or circular walls. The 3D arrays of 3D members are preferably located toward the upper end of each solids removal channel. In this manner, the lower end of each channel settles the settleable solids under gravitational forces, and in the upper end the remaining solids are removed from the liquid by additional settling action, by the mechanical action of the 3D array of 3D members and by attraction from non-setteable settleable solids previously removed by the 3D array of 3D members.

The lamina are preferably constructed of woven strips of steel or plastic. The submerged adjustment mechanism is adjustable to change the angle of inclination of the lamina to select the desired amount of nesting of the 3D members to maximize removal of both types of solids.

In a preferred embodiment of the 2D arrays a pair of sheets is provided, with each sheet having hemispherical bubbles extending from one side in a regularly spaced pattern. The sheets are placed with their opposite sides adjacent and with the bubbles aligned. The sheets are connected to each other so that the opposed bubbles form spherical protrusions extending from both sides of the now connected sheets. Grommets are provided along one edge of the connected sheets for hanging the sheets.

A method of the present invention for clarifying liquid by separating suspended solids from the liquid includes the steps of dividing the detention basin into a plurality of generally vertical flow paths each having an upper end. 2D arrays of 3D members are mounted in each of the vertical flow paths. The arrays are moved toward each other to urge the 3D members of adjacent arrays together and position such members in close-packed relationship to promote removal of both types of solids in the flow paths. When the flow paths are formed by separate lamina, the lamina are moved into an inclined position to decrease the width of each flow path and urge the adjacent 2D arrays into close-packed relationship. When the 2D arrays are used without lamina, the 2D arrays are directly moved together so that the 3D members become close-packed to form a series of interstices in the flow paths to promote removal of both types of solids that are in the flow paths.

BRIEF DESCRIPTION OF THE DRAWINGS

Other objects, features and advantages of the present invention will be apparent from an examination of the following detailed descriptions, which include the attached drawings in which:

FIGS. 4A and 4B are side elevational views of two adjacent parallel lamina having the flap members as shown in FIG. 3B, illustrating the upward flow of the liquid in the quiescent zone between two adjacent parallel lamina and the flow of the liquid from such zone between a free edge of one flap member and a fixed edge of an adjacent flap member, wherein FIG. 4A shows the zone closed and FIG. 4B shows the zone open to permit such flow;

FIG. 6 is a perspective view of one section of the detention basin showing a portion of one embodiment of the flow control deck without the depending parallel lamina, wherein beams are shown for supporting the fixed edge of the flap members;

FIGS. 10A and 10B are front views of a preferred embodiment of the lamina, showing the lamina as a sheet formed from woven strips of metal or plastic, wherein FIG. 10B shows an enlarged portion of the woven strips;

FIG. 27 is a perspective view of one section of the detention basin showing a portion of one embodiment of the flow control deck without the depending parallel lamina, where 2D arrays of 3D members are mounted under the flow control deck and are positioned to close-pack the 3D members and form a 3D array;

FIG. 32A is a perspective view of a vacuum mold having cavities for forming half of the 3D members of the 2D arrays;

FIG. 32B is a perspective view of a heat sealer plate having webs for engaging and heat sealing the sheets to form the 2D arrays having the 3D members;

FIG. 32C is a cross-sectional view of two sheets with the half 3D members aligned in preparation for heat sealing;

FIG. 32D is a cross-sectional view of the two sheets shown in FIG. 32C, illustrating the two sheets heat sealed together to form a 2D array;

FIG. 34A is a view similar to FIG. 33 illustrating a knee rung for forming a knee in the lamina to position the upper ends of the lamina at an angle to close-pack the 3D members and form a 3D array;

FIG. 34B is a view of a portion of the lamina shown in FIG. 34A, also illustrating a mechanism for moving the knee rung to form the knee in the lamina;

DETAILED DESCRIPTION OF THE PREFERRED EMBODIMENTS

Clarifier 25

Figure 1:
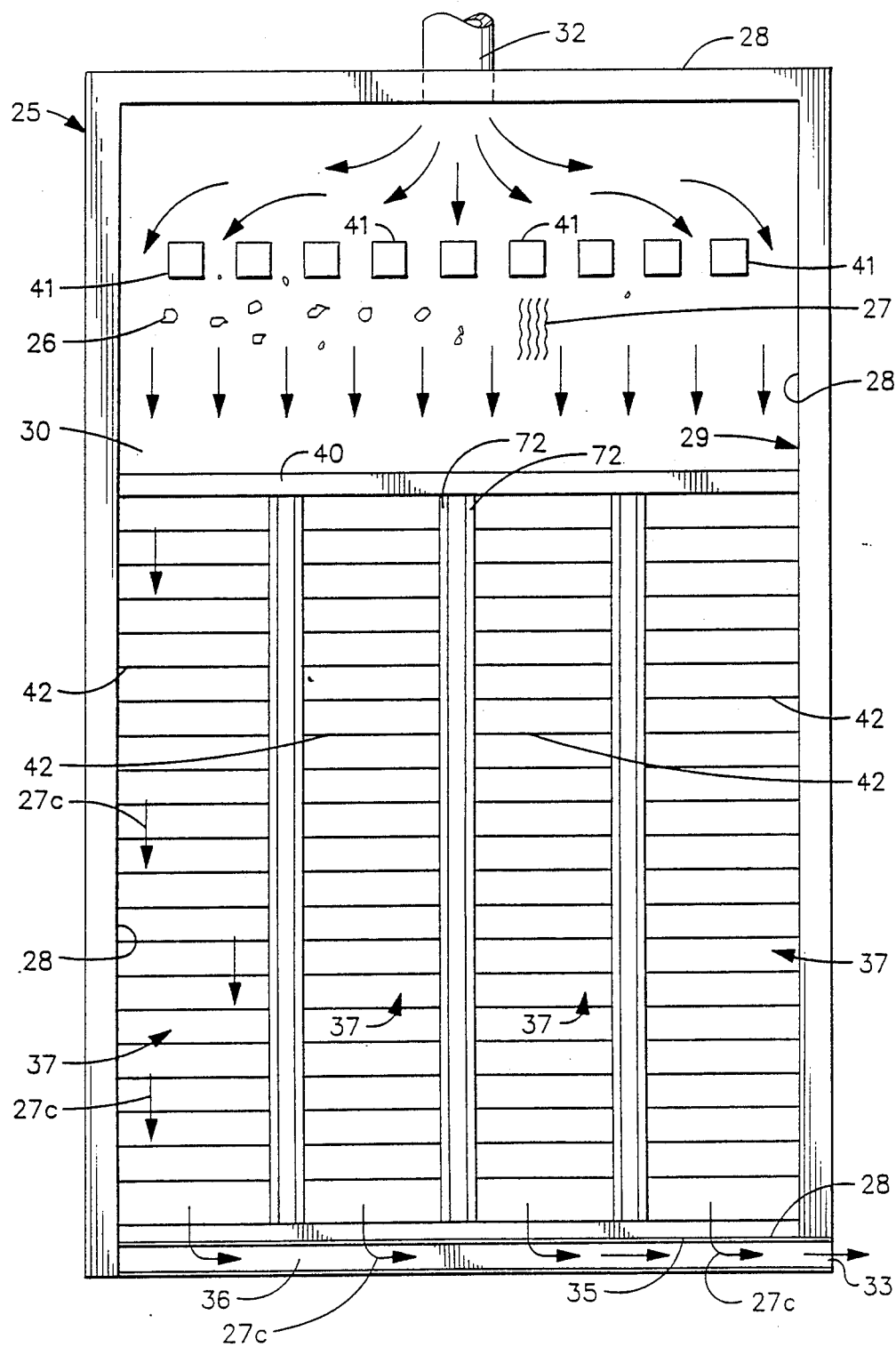
FIG. 1 is a plan view of a detention basin showing four separate clarifier sections, wherein each section includes inclined parallel lamina that form quiescent zones through which liquid to be clarified flows, each section further including a deck that covers the detention basin for controlling liquid flow through such zones.
Figure 2:
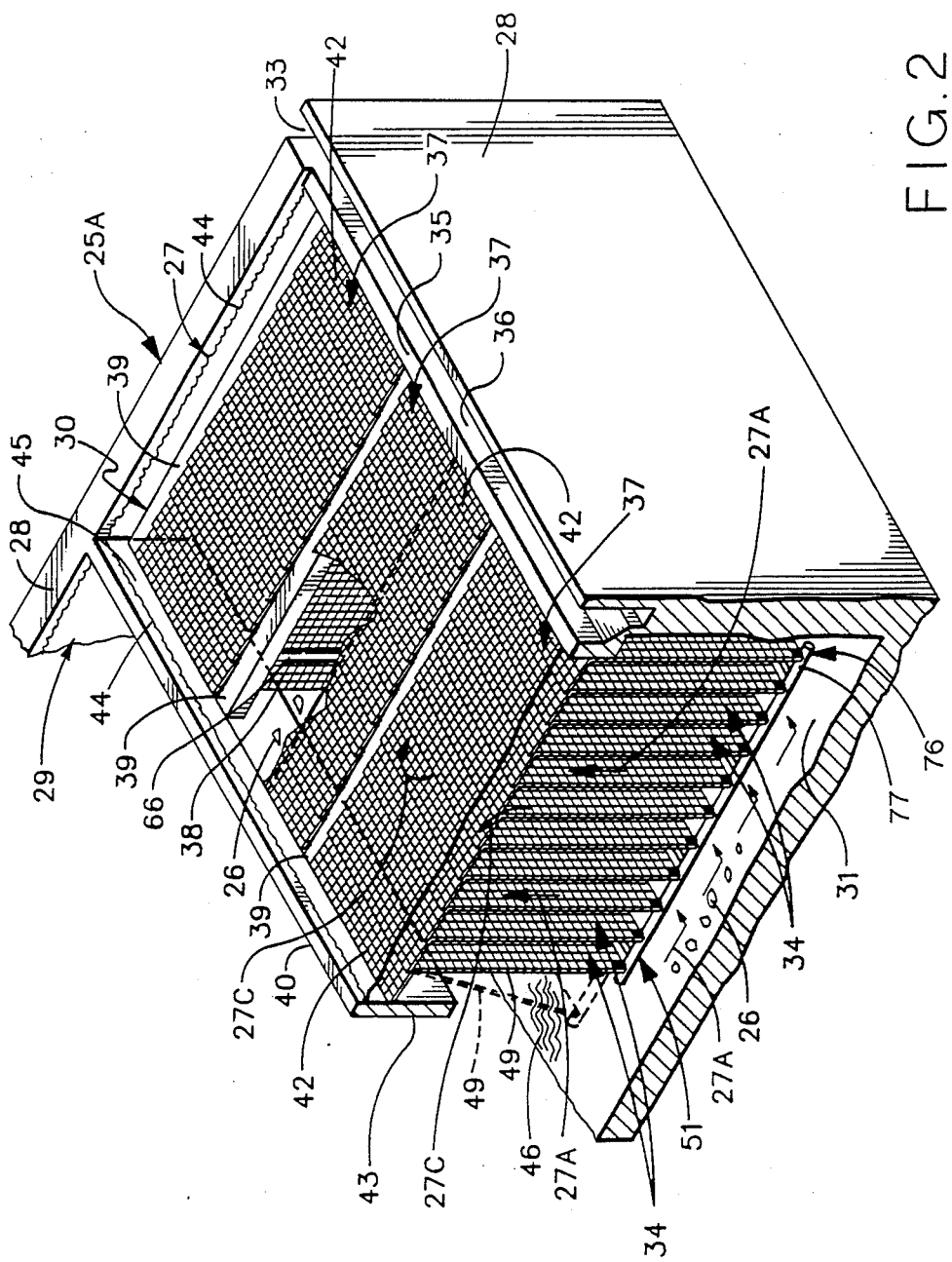
FIG. 2 is a perspective view of three of the clarifier sections shown in FIG. 1 in which a cross baffle causes solid-laden liquid to flow under the lamina into the quiescent zones.

Referring to FIG. 1, a clarifier 25 is shown for removing materials such as solids 26 from liquid 27. The clarifier 25 is shown including vertical outer walls 28 which define a detention basin 29 having an open top 30 (FIGS. 2 and 3A) and a bottom 31 (FIG. 2). One embodiment of the clarifier 25 is shown in FIG. 1 and is referred to as a rectangular clarifier 25A (FIG. 2). Another embodiment of the clarifier 25 is shown in FIGS. 13-18 and is referred to as a circular clarifier 25B. The clarifier 25 may have other shapes, such as square, and be used with the present invention. References to the clarifier 25 apply to all embodiments of the clarifier.

Figure 3A:
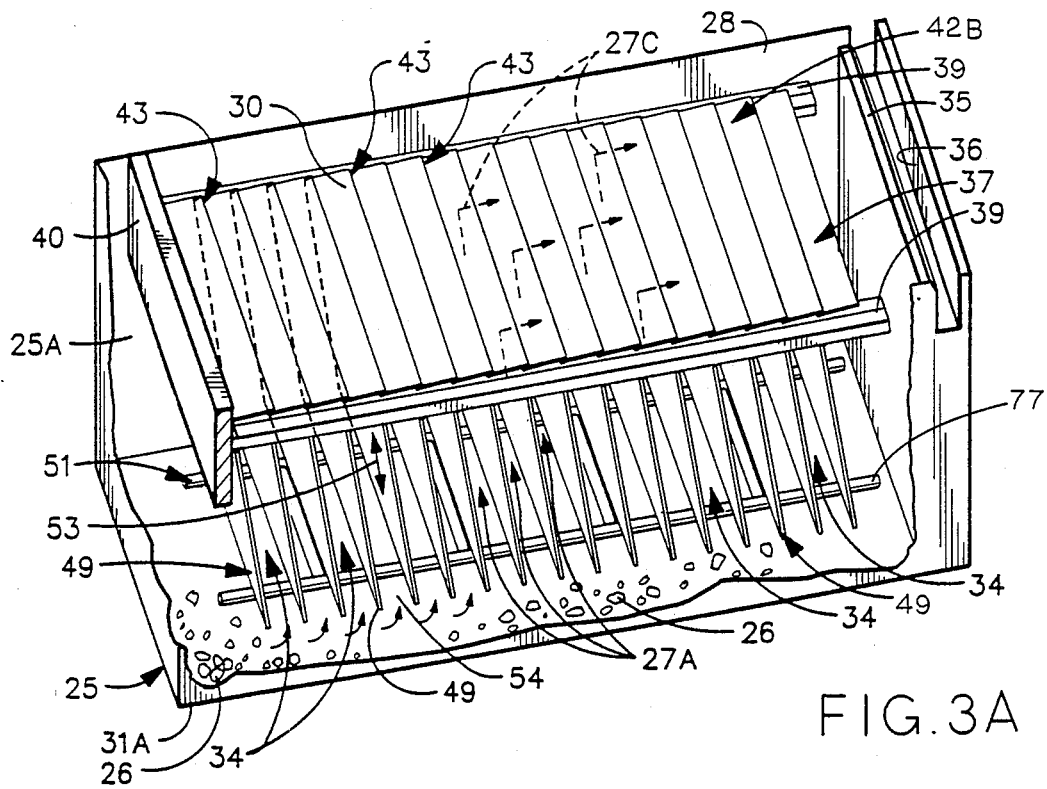
FIG. 3A is a perspective view of a preferred embodiment of the present invention showing one section of the deck shown in FIG. 2, wherein the inclined parallel lamina are shown hanging from the deck and connected to a submerged adjustment mechanism.

Referring also to FIGS. 2 and 3A, as the liquid 27 and the solids 26 flow through the detention basin 29 from an inlet 32 (FIG. 1) to an outlet 33 (FIGS. 1 and 2), the flow of the liquid 27 and the solids 26 is substantially reduced according to the principles of the present invention to form many very low flow rate, or quiescent, zones 34 in the clarifier 25. The liquid 27 and the solids 26 flow upwardly (see liquid/solids flow arrows 27A in FIGS. 2, 3A and 3B, for example) in the quiescent zones 34 so that the solids 26 settle out of the liquid 27 and the resulting clarified liquid (represented by arrows 27C in FIGS. 1, 4B and 5B), flows to the outlets 33 of the clarifier 25. These outlets 33 may be in the form of weirs 35 that lead to troughs 36.

Figure 5A:
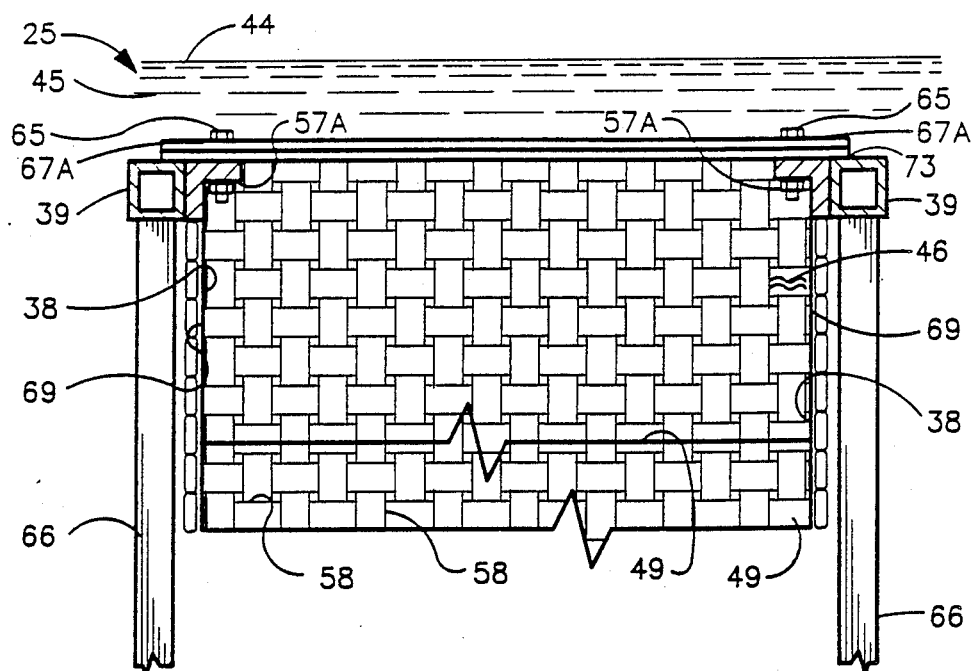
FIG. 5A is an end elevational view of the two adjacent flap members shown in FIG. 4A, with the rearward flap member being in the closed position.

As shown in FIG. 1, the detention basin 29 is divided into a number of sections 37. Referring to FIGS. 2 and 5A, vertical internal partitions 38 define the center sections 37 and one partition 38 and one wall 28 define the outer sections 37. The internal partitions 38 extend downwardly from beams 39 which extend along the length of the detention basin 29 between one of the opposite outer walls 28 and a cross baffle 40. As shown in FIG. 1, the liquid 27 and the solids 26 suspended therein flow into the detention basin 29 and are spread out by barriers 41. As shown in FIGS. 1 and 2, they flow along the bottom 31 toward the cross baffle 40. The cross baffle 40 prevents the liquid 27 and the solids 26 from flowing over the clarifier sections 37 without flowing through those sections 37. As shown in FIG. 2, the liquid 27 and the suspended solids 26 spread out across the bottom 31 and flow underneath and upwardly into the sections 37 of the detention basin 29 as indicated by the liquid/solid flow arrows 27A.

Planar Flow Control Deck 42

Figures 4A, 4B:
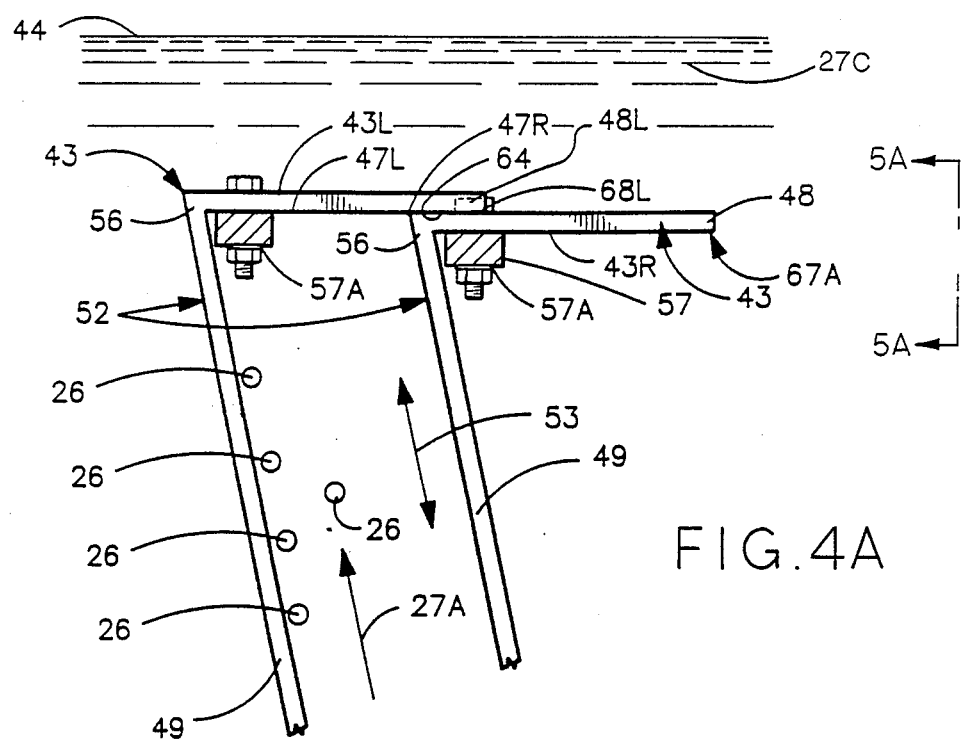
Figure 5B:
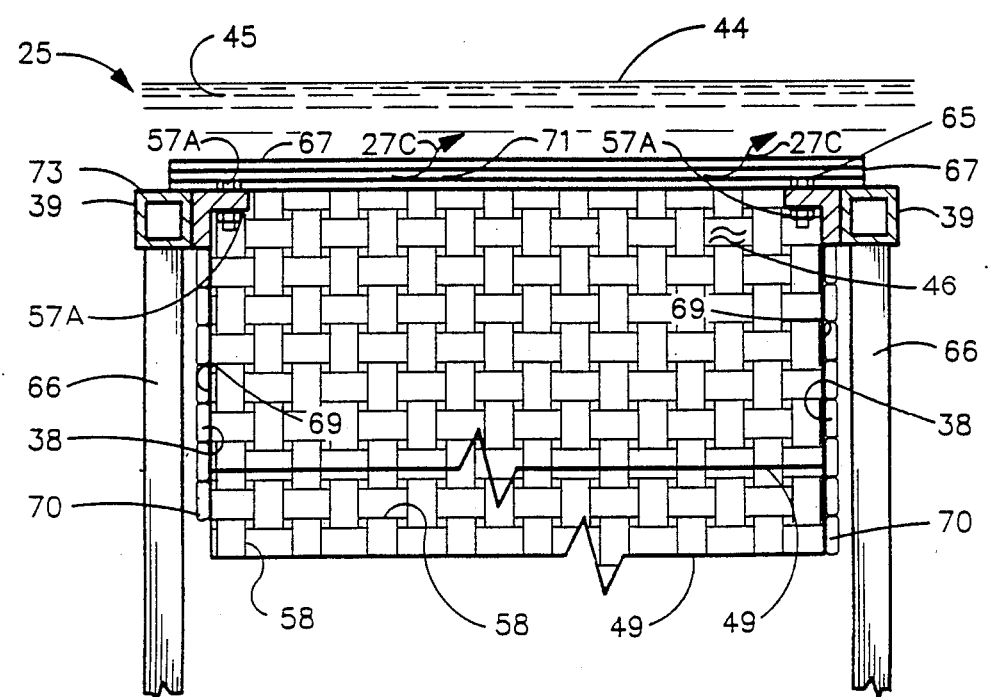
FIG. 5B is an end elevational view of the two adjacent flap members shown in FIG. 4B, with the rearward member being in the open position, showing a gap formed between the adjacent flap members in response to the upward flow of the liquid through the quiescent zone.

For clarifying the liquid 27, a planar flow control deck 42 is shown in FIGS. 1 and 2 extending across each section 37 of the detention basin 29. The deck 42 is formed from a plurality of elongated flap members 43 shown in FIGS. 3A, 3B, 3C, for example. The planar deck 42 is supported beneath the upper surface 44 of the liquid 27 for dividing the liquid 27 into upper and lower layers 45 and 46, respectively (FIGS. 5A and 5B). As shown in greater detail in FIG. 4B, one edge 47 of each such flap member 43 is fixed and an opposite or free edge 48 thereof is in releasable sealing engagement with an adjacent flap member. To distinguish the left flap member (FIG. 4B) from the adjacent flap member, when the relationship between flap members is noted, the left flap member is referred to as 43L and the adjacent flap member is referred to as 43R. The free edge 48 of each such flap member 43L is movable out of engagement with such adjacent flap member 43R in response to the upward flow of the liquid 27 in the clarifier 25 as represented by the liquid/solids flow arrows 27A in FIG. 4B.

Adjustable Lamina 49

Figure 3B:
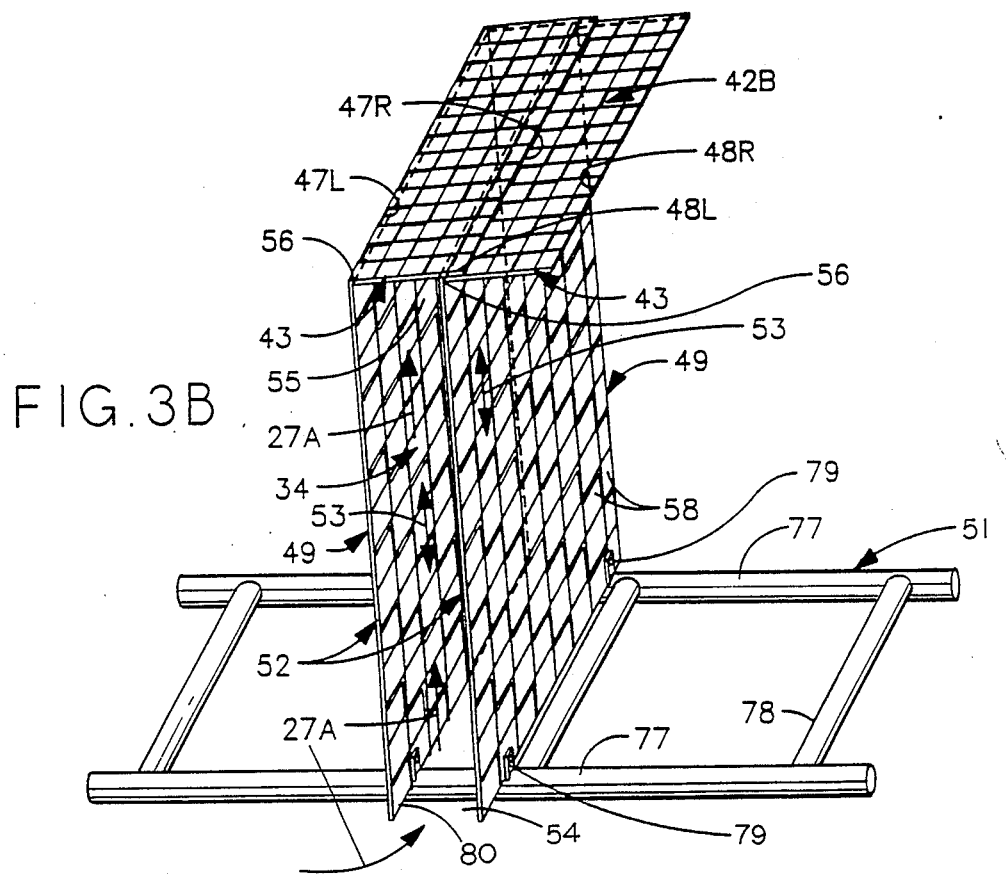
FIG. 3B is an enlarged portion of FIG. 3A showing two of the parallel lamina each having a flap member that overlaps the flap member of an adjacent lamina.
Figure 3C:
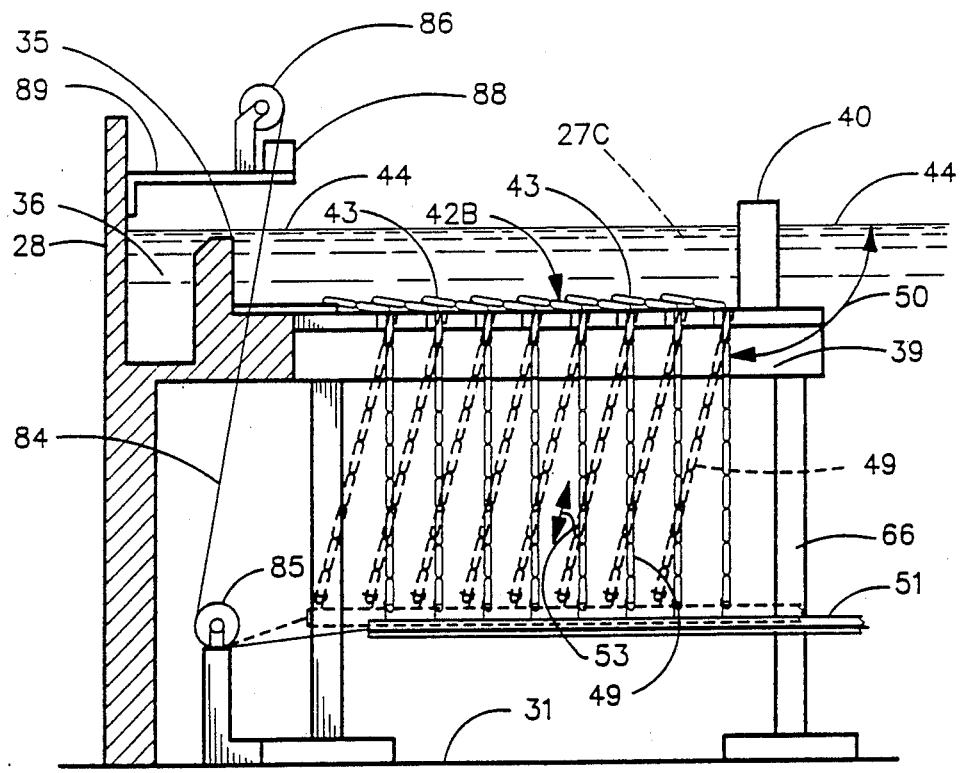
FIG. 3C is an enlarged portion of FIG. 3A shown as a side elevational view showing the submerged mechanism connected to two of the parallel lamina for changing, in tandem, the angle of inclination of the parallel lamina.

Referring to FIGS. 3A through 3C, each section 37 of the detention basin 29 is also provided with flexible, inclined lamina 49 that define the quiescent zones 34 to assist in reducing the rate of upward liquid flow so that the solids 26 carried by the liquid 27 settle and are separated from the liquid 27. The lamina 49 are suspended in parallel relationship, with the angle 50 (FIG. 3C) at which the lamina 49 are inclined relative to the liquid surface 44 being adjustable by a submerged adjustment mechanism 51. Adjacent pairs or sets 52 (see joined arrows in FIG. 3B) of the parallel lamina 49 define the quiescent zones 34, which are effective as separate inclined settling channels (indicated by double arrow 53). Each channel 53 is open at the bottom 54 to receive the liquid 27 that is laden with the solids 26. The top 55 of each channel 53 is releasably closed by one of the flap members 43. Each flap member 43 extends horizontally from a vertex 56 (FIGS. 3B, 5A and 5B) adjacent the top 55 of the channel 53 across the respective section 37. Each lamina 49 is supported at the vertex 56 by a bracket 57, such as an angle bracket 57A (FIG. 5A) or a beam-type bracket 57B (FIG. 6). In this manner, the flap member 43 is free to flex or otherwise allow the free edge 48 to move vertically in response to the upward flow 27A of the liquid 27 in the settling channel 53. The flap members 43 combine to form the flow control deck 42 that promotes uniform liquid flow through all of the settling channels 53.

Figure 10A:
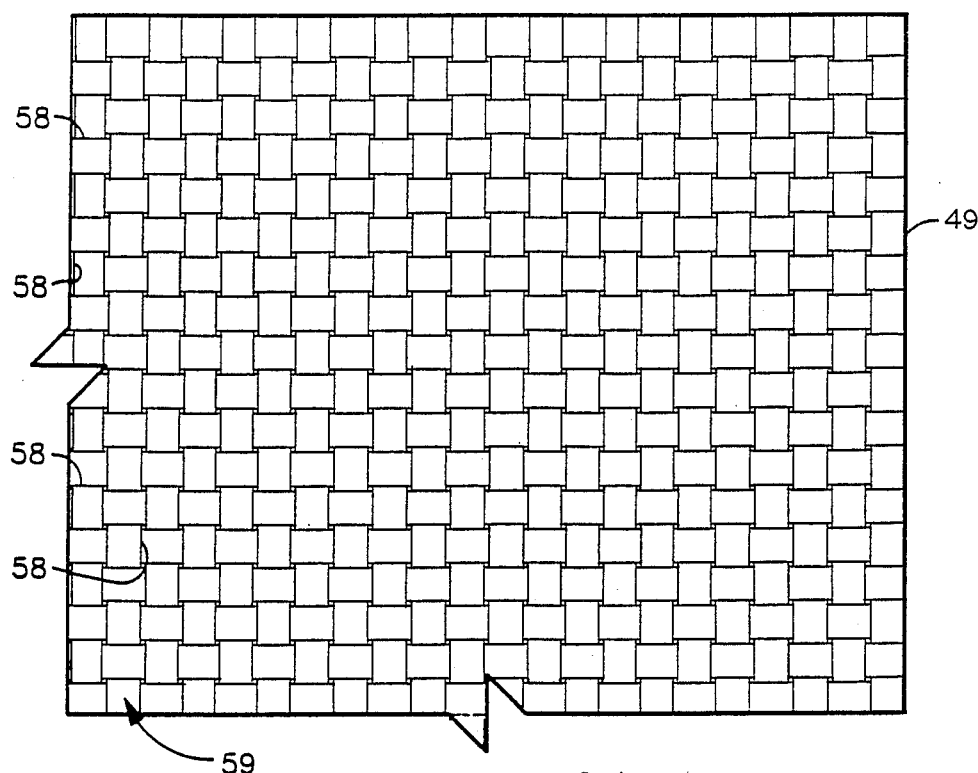
Figure 10B:
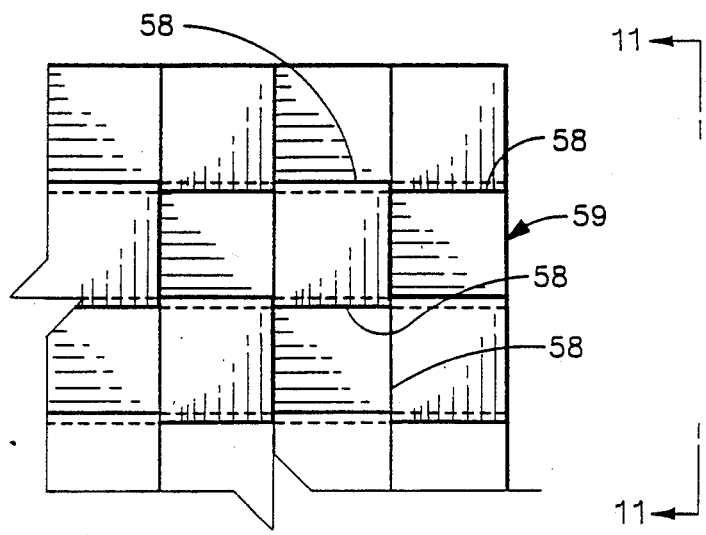
Figure 11:
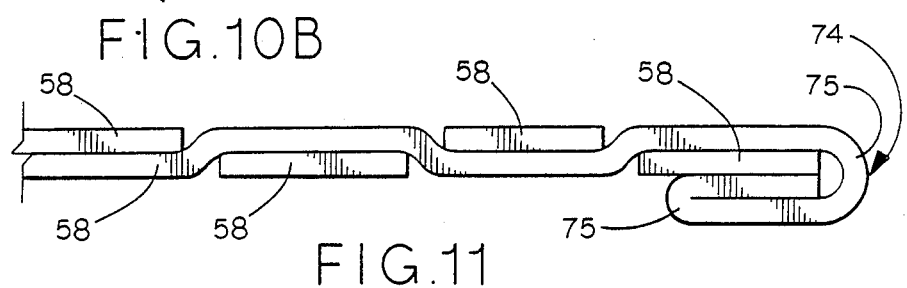
FIG. 11 is a cross-sectional view taken along line 11—11 in FIG. 10B showing the strips of the woven lamina.

In the preferred embodiment of the invention, each lamina 49 and each partition 38 is constructed of woven strips 58 of steel or plastic (FIGS. 10 and 11). Also, the submerged mechanism 51 changes the angle 50 (FIG. 3C) of inclination of the lamina 49 to maximize settlement. The lamina 49 are secured to (but may be detached from) the adjustment mechanism 51 to permit removal for cleaning. Additionally, the adjustment mechanism 51 may be vibrated to promote settlement of the solids 26 or may 20 be moved vertically to buckle or flex the lamina 49 to clean the lamina 49 without removing the lamina 49 from the basin 29.

Clarification Methods

One embodiment of the method of the present invention clarifies the liquid 27 by separating the suspended solids 26 from the liquid 27. The method includes the steps of dividing the detention basin 29 into a plurality of generally vertical flow paths represented by the liquid/solids flow arrow 27A and defined by the channels 53. The next step releasably closes the top 55 of each of the flow paths 27A. The liquid 27 and the solids 26 are then supplied to the basin 29 at a pressure that causes the liquid 27 to open each of the releasably closed flow paths 27A so that the clarified liquid 27C (FIG. 5B) exits the basin 29 while the liquid flow rate is sufficiently low and uniform in the flow paths 27A to permit the solids 26 to settle in the flow paths 27A and to the bottom 31 of the detention basin 29.

Another embodiment of the method of the present invention for separating the settleable solids 26 from the liquid 27 includes the steps of containing the liquid 27 and the solids 26 in the detention basin 29 and providing a plurality of the parallel lamina 49 extending in such basin 29 at the angle 50 (FIG. 3C) relative to the surface 44 of the liquid 27 in the basin 29 for defining the separate liquid flow channels 53. The lamina 49 are moved to change the angle 50 thereof according to the settling characteristics of the solids 26 suspended in the liquid 27 and the desired operational characteristics of the clarifier 25A. When the lamina 49 are sheets 59 woven from the strips 58 (FIGS. 10 and 11) that are suspended in the basin 29 the movement of the sheets 59 is such as to cause them to buckle to remove the solids 26 therefrom.

Circular Clarifier 25B

Referring to FIGS. 13 through 18, the circular clarifier 25B is shown for removing the solids 26 from the liquid 27. The circular clarifier 25B is shown including a central cylindrical wall 60 and the inlet 32B. The liquid 27 and the solids 26 flow upwardly and out of the inlet 32B and then to and along the bottom 31B of the circular retention basin 29B for flow radially outward toward an intermediate partition 61. The intermediate partition 61 has a much larger diameter than that of the central wall 60 to define the inner side of an annular clarifier section 62. An outer cylindrical wall 63 (FIG. 14) defines the other side of the annular clarifier section 62.

Annular Flow Control Deck 42B

In a second embodiment of the present invention the planar flow control deck 42B is mounted within the annular clarifier section 62 of the circular clarifier 25B. To distinguish from the first embodiment of the invention shown in FIGS. 1 through 5B, the structure of the first embodiment that is common to the second circular embodiment is referred to using the same reference numbers plus the letter "B". Thus, the deck in the annular clarifier section 62 is referred to as the annular flow control deck 42B. This annular deck 42B is also formed from the plurality of elongated, flap members 43B. As shown in greater detail in FIG. 15, each of the flap members 43B has the two opposing fixed and free edges 47B and 48B, respectively, and is generally the same as the flap members 43 shown in FIGS. 2, 3A and 3B. In particular, the fixed edge 47B of the flap member 43B is fixed and the opposite, free edge 48B thereof is in releasable sealing engagement with the adjacent flap member 43BR. Thus, the opposite edge 48BL of each flap member 43B of the annular deck 42B is free to move out of sealing engagement with the adjacent flap member 43BR in response to the upward flow 27B of the liquid 27 from the bottom 31B of the circular detention basin 29B.

Adjustable Lamina 49B for Circular Clarifier 25B

Still referring to FIGS. 13 through 18, when the quiescent zones 34 are to be formed in the circular clarifier 25B, that clarifier 25B is also provided with the flexible, inclined lamina 49, referred to as the lamina 49B. The quiescent zones are referred to as the zones 34B and assist in reducing the upward liquid flow 27B so that the solids 26 carried by the liquid 27 settle and are separated from the liquid 27. The lamina 49B are resuspended in parallel relationship, with the angle 50B (FIG. 15) at which the lamina 49B are inclined being adjustable under the control of a submerged annular adjustment mechanism 51B. The adjacent pairs or sets 52B of the parallel lamina 49B form the quiescent zones 34B, which are effective as the separate inclined settling channels (shown by dual arrows 53B). The flap members 43B of the annular flow control deck 42B function in a manner similar to the flap members 43 of the planar flow control deck 42A for promoting uniform liquid flow 27B through all of the settling channels 53B.

First Embodiment of Planar Flow Control Deck 42

Referring to FIGS. 1, 2, 3A, 3B, 3C, 4A, 4B, 5A and 5B, the first embodiment of the planar flow control deck 42 is shown. In this embodiment, each flap member 43 of the deck 42 is formed integrally with one of the lamina 49. In particular, in the first embodiment the planar flow control deck 42 extends across at least a part of the detention basin 31, which is shown as one of the sections 37. The section 37 is shown generally rectangular in plan view, although other shapes may be provided, such as square (not shown) or circular as in the second embodiment shown in FIGS. 13 through 18. As shown in FIGS. 3A and 3B, the first embodiment of the control deck 42 is formed from the plurality of flap members 43. As shown in detail in FIGS. 3B 4A and 4B, each of the flap members 43 is sheet-like, elongated and has the fixed edge 47 and the opposing free edge 48. The fixed edge 47 of each flap member 43 is defined as that portion of the right (or adjacent) flap member 43R that extends from the vertex 56 along a surface 64 that is overlapped by the free edge 48L of the left flap member 43L. The fixed edge 47R is shown secured as by flat head bolts 65 to the brackets 57A.

Referring to FIGS. 5A and 5B, the brackets 57A are shown extending horizontally partially across the section 37 of the detention basin 29. Still referring to FIGS. 5A and 5B, it may be understood that each bracket 57A is supported on one of the beams 39 that extend the length of the clarifier 25 from the cross baffle 40 to the end wall 28 adjacent the trough 36. Each beam 39 is supported on a post 66 that rests on the bottom 31 of the detention basin 29. Each bracket 57A is in the form of a short, rigid beam secured to its respective end 67 of the flap member 43. The fixed edge 47 of each flap member 43 is bolted at the ends 67 to the opposed brackets 57A so that each flap member 43 is taut and extends horizontally as shown in FIG. 5A, for example. With the fixed edge 47L secured in this manner, as shown in FIGS. 4A and 4B the free edge 48L of each flap member 43 is cantilevered so that it extends over the overlapped surface 64 to form an overlapping surface 68. In this manner, in the absence of force from the upward flow 27A of the liquid 27, the free edges 48L of the left flap members 43L are in releasable sealing engagement with the adjacent fixed edges 47R of the right, adjacent flap member 43R. As shown in FIG. 4A, a releasable sealing engagement results from the overlapping of the left flap member 43L with respect to the right flap member 43R. In particular, the free edge 48L of the left flap member 43L extends over the fixed edge 47R of the right flap member 43R to form the opposed, overlapping and overlapped, flat surfaces 68L and 64R, respectively, that are effective to seal or close the top 55 of the settling channel 53.

The position of the respective adjacent left and right flap members 43L and 43R shown in FIG. 4A is referred to as the closed position. As shown in FIGS. 5A and 5B, opposite generally vertically extending edges 69 of each lamina 49 are positioned in close proximity to the partitions 38 that are in the form of baffles 70 that are bolted to and hung from the beams 39. As shown in FIG. 2, the baffles 70 extend the length of the basin 29 in the direction of the beams 39. The baffles 70 may also be formed from the woven sheets 59. The center settling channels 53 are formed between the respective adjacent left and right lamina 49 (the pairs 52) and between the baffles 70 that are adjacent the opposite edges 69 (FIG. 5A) of each pair 52 of the lamina 49. The settling channels 53 along the walls 28 of the basin 29 are formed between one of the walls 28, one of the baffles 70 and the pair 52 of lamina 49 Further, the ends 67 of the flap members 43 extend over the beams 39 such that the clarified liquid 27C (shown by the arrows 27C in FIG. 4B) will not flow out of the top 55 of the channel 53 when the left flap member 43L is in the closed position shown in FIG. 4A in releasable sealing engagement with the right flap member 43R.

As shown in FIG. 4B. the free edge 48L of the left flap member 43L is free to move out of the releasable sealing engagement with the fixed edge 47R of the right adjacent flap member 43R in response to the force of the upwardly flowing liquid 27 within the settling channel 53. The position of the free edge 48L of the left flap member 43L shown in FIG. 4B is referred to as the open position. In the open position and as further shown in FIG. 5B, the left flap member 43L has flexed to provide a gap or opening 71 between the overlapping surface 68L of the left flap member 43L and the overlapped surface 64 of the right flap member 43R. As shown in FIG. 5B, this gap is generally rectangular and results in the free edge 48L being spaced from the fixed edge 47R of the right flap member 43R. In the preferred embodiment of the first embodiment shown in FIGS. 1, 2, 3A, 3B, 4A, 4B, 5A and 5B, the pairs 52 of the lamina 49 are spaced apart by two to four inches and the length of the lamina 49 across each section 37 is from three to six feet. The flap members 43 have a length (from left to right in FIGS. 4A and 4B) of about four inches and the surfaces 64 and 68L overlap about one inch. In the first embodiment, with the flap members 43 formed integrally with the lamina 49 and formed from the sheet 59 of woven stainless steel strips 58, the gap 71 opens to about 0.030 inch in the vertical direction in FIGS. 4A and 4B. The upward movement of the free edge 48L may be limited by a plate 72 (FIG. 1) secured to the top 73 (FIG. 5A) of each beam 39 and that extends over part of the ends 67 of the flap members 43. The plates 72 limit the cross-sectional area of the gap 71.

Referring to FIG. 5B, it may be understood that for the section 37 adjacent the right side wall 28 (FIG. 1), the wall 28 supports the bracket 57A. In a similar manner, one of the brackets 57A is secured to the left wall 28 (FIG. 1).

As shown by the arrows 27C in FIGS. 3A and 4B, the clarified liquid 27C flows through the gaps 71 when the flap members 43 are in the open position. The clarified liquid 27C then flows into the upper liquid layer 45 above the deck 42 and flows generally from left to right in FIG. 2 within a given section 37 to the right end of the section 37 where it exits the detention basin 29 via the trough 36.

Referring to FIGS. 2 and 3A, it may be understood that the various flap members 43 and the supporting brackets 57A mount the planar flow control deck 42 so that it extends completely across the length and width of a particular section 37 of the detention basin 29 and is under the upper surface 44 of the liquid 27 to divide the liquid 27 into the layers 45 and 46. The structure of the deck 42 also provides a safety feature since the deck 42 prevents objects, people, etc. from falling into the detention basin 29.

Adjustable Lamina 49

As indicated above, the first embodiment of the flow control deck 42 includes one of the lamina 49 formed integrally with one of the flap members 43. Alternative ways of joining the lamina 49 to the flap members 43 can be provided, such as by using a hinge (not shown) at the vertex 56 and a coil spring 43S (FIG. 20A) for biasing the left flap members 43L downwardly onto the right flap members 43R.

In the first embodiment, the respective integral flap member 43 and lamina 49 may be formed by bending the thin, sheet 59 of stainless steel strips 58 into the generally reversed-seven-shape (or generally upside down "L" shape) shown in FIGS. 3A, 3B, 4A, 4B, 5A and 5B. Such bending forms the vertex 56 at which the fixed edge 47 of the flap member 43 is supported. Alternatively, the integral lamina 49 and flap members 43 may be bent into the generally seven-shape shown iu FIGS. 2 and 3C. In either version of the integral lamina 49 and flap member 43, each lamina 49 extends downwardly from its vertex 56 in a generally vertical, but inclined, direction. As shown in FIGS. 3A, 3B, 4A and 4B, for example, the various lamina 49 extend downwardly in parallel relationship to each other. Each lamina 49 extends to a depth spaced from the bottom 31 of the detention basin 29 so that the liquid 27 and the solids 26 flowing along the bottom 31 from the inlet 32 flow upwardly into the settling channel 53 formed between the pairs 52 of the lamina 49.

As described above, each channel 53 is formed in part by the adjacent relationship of the baffles 70 (FIG. 5B) on each edge 69 of the lamina 49. As also noted above, in the first embodiment of the invention, the integral lamina 49 and the flap members 43 are constructed from woven stainless steel sheets 59 shown in FIGS. 5B, 10 and 11, for example. The thin and flexible nature of the sheets 59 is particularly suited for the functions of the integral lamina 49 and flap members 43 since a single sheet 59 of the strips 58 of woven stainless steel material can be bent at the vertex 56 to resemble the inverted "L" or reversed seven-shape (FIGS. 3A and 3B) or the seven-shape (FIG. 3C) thereby forming both the woven lamina 49 and the flap member 43 integral therewith. Moreover, the flexible nature of the woven stainless strips 58 provides the resilient, spring-like characteristic of the flap members 43 that is necessary to provide the releasable sealing engagement between the overlapping surfaces 68L and the overlapped surfaces 64R. In particular, the woven stainless steel strips 58 that form the first embodiment of each lamina 49 and flap member 43 have a width of one to two inches and a thickness of 0.005 inches. These strips 58 are formed by slitting a large roll of sheet material using a standard sheet metal slitter. Referring to FIGS. 10 and 11, the strips 58 are woven such that the woof (or vertical) strips 58 (FIGS. 10A and 10B) are tightly arranged so as to touch each other. The other strips 58 form the warp (or horizontal) part of the woven sheet 59 and are spaced apart by about 0.1 to 0.2 inches as shown in FIG. 10B. For ease of illustration of the weave, in FIG. 10, the woof strips 58 are shown spaced, whereas in FIG. 11 they are shown abutted as described above. Despite such spacing the sheets 59 are effective in operation to direct the liquid/solid flow 27A along the channels 53 and to withstand the pressure in the channels 53. As shown in detail in FIG. 11, to promote safe handling the perimeter edges 74 of each lamina 49 formed from the woven stainless steel strips 58 are formed by bending the strips 58 twice onto themselves so that only rounded surfaces 75 are exposed.

When the woven sheets 59 are used for the baffles 70, the warp and woof strips 58 are reversed to provide the horizontal strips 58 tightly arranged.

In the first embodiment, the lamina 49 have a somewhat lesser width than the flap members 43 (FIGS. 5A and 5B) and hang from the vertex 56 about two to ten feet. These various dimensions of the flap members 43 and the lamina 49 will vary in actual installations according to the liquid 27, the solids 26 and the flow conditions.

The lamina 49 formed from such woven stainless steel sheets 59 hang in tension from the respective brackets 57A located at the vertices 56 of the lamina 49. With the lamina 49 thus in tension resulting from being supported along the fixed edges 47, the lamina 49 may be relatively thin and need not be supported along the other edges 69 thereof that are adjacent to the vertical baffles 70 nor at a bottom 80 of the lamina 49.

The lamina 49 may be rolled up into relatively small diameter cylinders that can be inserted through openings (not shown) in covers (not shown) of the clarifier 25A. This facilitates clarifier installation where removal of such covers is undesirable.

As described with respect to FIGS. 5A and 5B, the channels 53 are defined by the pairs 52 of lamina 49 (shown as 49L and 49R in FIG. 4B), the baffles 70 on opposite sides of the lamina 49 and the flap members 43 at the tops 55 of the channels 53. With the left flap member 43 in the closed position shown in FIG. 4A, the force of the liquid 27 and the solids 26 tending to flow upwardly in the channel 53 is exerted on the lamina 49, the baffles 70 and the flap members 43. This force overcomes the weight of the flap member 43 plus the force of the flap member 43 that tends to keep it in the closed position. The force of the liquid 27 is sufficient to flex the flap members 43 so that the free edges 48 move into the open position shown in FIG. 4B, where the free edge 48L is shown flexed and the free edge 48R (which is not shown as part of a channel 53 under the flap member 43R) is not flexed. The force required to flex the flap members 43 is linear with respect to the amount of the gap 71, e.g., force=k times the amount of the gap 71. As noted above, the solids 26 are often disturbed by random movements of the liquid 27 within the clarifier 25A. These random movements are caused by temperature gradients, surface disturbances and channelling currents within the clarifier 25A. These random movements of the liquid 27 vary the pressure in each channel 53 by an amount of about two to five percent. Thus, the random forces exerted on the flap members 43 are about two to five percent of the force of the liquid 27 that flexes the flap members 43. These random forces are not effective to vary the amount of the gap 71 to any appreciable extent, such that the rate of the flow of the clarified liquid 27C (FIG. 4B) through the gaps 71 does not vary appreciably in response to the random forces. As a result, the rate of flow of the clarified liquid 27C (FIG. 4B) through all of the channels 53 tends to be equal. In this manner, with the lamina 49 being parallel and set at the same angle 50 (FIG. 3C), the solids 26 in each channel 53 tend to settle at similar or uniform rates. If the influent liquid 27 and the influent solids 26 suspended therein have been uniformly mixed before entering the bottom 54 of the channels 53, the uniform rates of settling tend to result in uniformly clear clarified liquid 27C flowing from the top 55 of each of the channels 53.

If in the operation of the clarifier 25A there are substantially different pressures in different ones of the channels 53, such that very different forces are applied to the different flap members 43 of different channels 53, the linear force-gap relationship of the flap members 43 can be made non-linear by providing the spring 43S as a non-linear spring above each free edge 48. In this manner, as the upward force of the liquid 27 on the flap member 43 increases, the resulting incremental flexure of the flap member 43 will be less so that the incremental increase in the amount of the gap 71 will be less, which will further tend to equalize the rates of flow of the clarified liquid 27C from the various channels 53 into the upper liquid layer 45.

Adjustment Mechanism 51

In the first embodiment of the invention shown in FIGS. 2 and 3A through 3C, each respective lamina 49 is connected to the submerged mechanism 51 that is effective to vary in tandem the angle 50 (FIG. 3C) at which the parallel lamina 49 hang from the brackets 57A (FIG. 5A). Such adjustment of the angular position of the parallel lamina 49 with respect to the surface 44 of the liquid 27 in the detention basin 29 enables the clarifier 25A to function as desired despite, for example, variations in the liquid 27 or the solids 26 that are introduced into the detention basin 29. Further, in the design of clarifiers, such as the clarifier 25A, it is difficult to anticipate the exact angle 50 (FIG. 3C) at which the lamina 49 should be installed. Larger angles 50 reduce the distance that the solids 26 have to fall or settle before they come to rest on the lamina 49. Smaller angles 50 (to 90°) tend to cause the solids 26 that settle onto the lamina 49 to continue to move downwardly in the chamber 53 and settle to the bottom 31 of the basin 29 for removal. Thus, one design goal is to maximize the amount of the solids 26 that settle onto the lamina 49, but a conflicting goal is to maximize the amount of the solids 26 that settle to the bottom 31 of the detention basin 29. The adjustment mechanism 51 allows both design goals to be achieved.

Referring now in detail to FIGS. 3A through 3C, it is recognized first that the flap members 43 in FIG. 3C are even-shaped and incline to the left, whereas the flap members 43 in FIGS. 3A and 3B are reverse-seven-shaped and incline to the right. The lamina adjustment mechanism 51 is shown in each case including a ladder-like structure 76 having parallel beams 77 that extend in the major direction of each section 37 of the detention basin 29. Cross pieces or rungs 78 of the ladder-like structure 76 extend in the minor direction of each section 37 between and are secured to the beams 77. Each beam 77 is provided with a series of tabs 79. The tabs 79 connect each beam 77 to the bottom edge 80 of each lamina 49 Referring to FIG. 4B, such connection between the tab 79 and the bottom edge 80 of each lamina 49 is preferably by providing appropriately spaced apertures 81 and 82 in such respective bottom edge 80 and in each tab 79 and providing a flexible bolt 83 in the apertures 81 and 82 such that the tabs 79 can move relative to the lamina 49.

As shown in detail in FIG. 3C, the lamina adjustment mechanism 51, including the beams 77 and the rungs 78, is effectively suspended on and thus supported vertically by the lamina 49. The lamina 49 tend to hang vertically from the brackets 57A but are moved into the inclined positions shown in FIGS. 3A and 3C, for example, upon movement of the beams 77, which is to the left in FIG. 3A and to the right in FIG. 3C. Such movement of the beams 77 is effective to swing each lamina 49 around the vertex 56 such that the beams 77 move upwardly as they swing to increase the inclination angle 50. The left-right movement of the lamina adjustment mechanism 51 is controlled in a selective manner by a metal tape 84 that is attached to the leftmost rung 78 in FIG. 3C or the rightmost rung in FIG. 3B. The metal tape 84 extends around a pulley 85 and then upwardly to a winch 86 having a motor that can be accurately stepped to incrementally wind or unwind the metal tape 84 by selected lengths so that the left to right positioning of the beams 77 can be selected.

Limit switches (not shown) can also be used to control the winch 86 so as to incrementally wind or unwind the tape 84 on the winch 86 Also, a squeegee or wiper 87 (FIG. 12) is provided for cleaning the tape 84. In a preferred embodiment of the lamina adjustment mechanism 51, the metal tape 84 is formed from a thin strip of stainless steel, having a width of one to two inches and a thickness of 0.005 inches.

Figure 12:
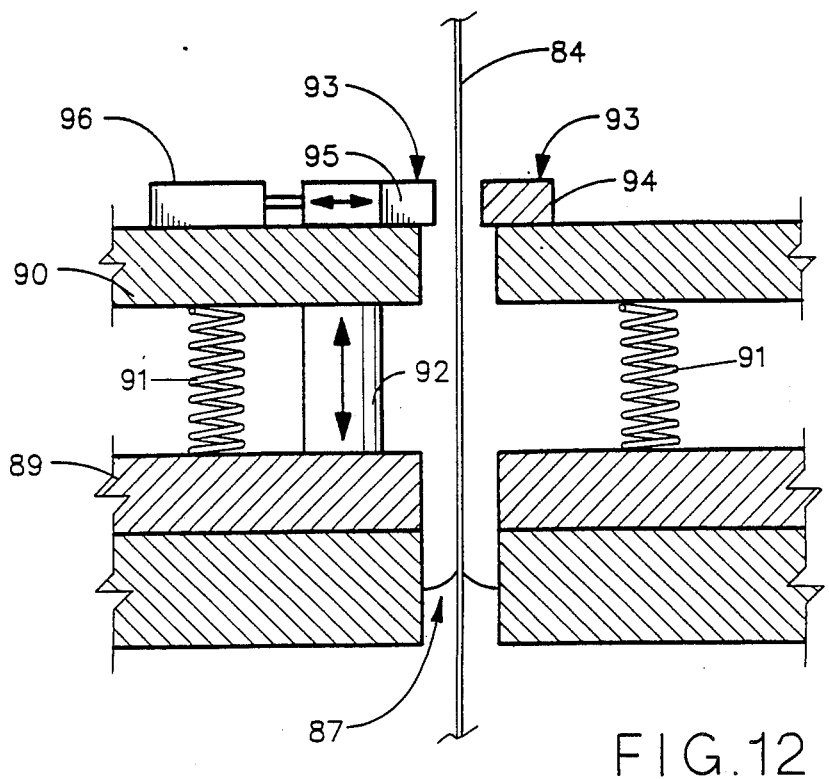
FIG. 12 is a side elevational view of one section of the outlet end of the detention basin depicted in FIG. 3C showing a vibrator mechanism that moves a tape-like cable of the adjustment mechanism to buckle the parallel lamina and promote cleaning of the parallel lamina wherein the cable is also moved by a winch of the submerged adjustment mechanism to vary the inclination of the parallel lamina.

The lamina adjustment mechanism 51 is also effective to rapidly raise and lower or vibrate the beams 77 and the rungs 78 once they have been moved into a desired left-right position to locate the parallel lamina 49 at a desired angle 50 of inclination. As shown in FIG. 12, the adjustment mechanism 51 also includes a vibrator 88 that grips the tape 84 and moves it up and down rapidly. In detail, the vibrator 88 is mounted on the wall 28 and includes a base 89 secured to the wall 28. A vibrator table 90 is mounted on springs 91. A vibrator drive 92 is mounted on the base 89 and is connected to the table 90 for rapidly moving the table 90 up and down. A pair of shoes 93 includes a fixed shoe 94 and a movable shoe 95 that is controlled by a pneumatic motor 96 to grip the tape 84. When the shoes 94 and 95 grip the tape 84, the tape 84 is rapidly moved up and down, which causes the adder 76 to move rapidly to the left and right, and thus up and down. The tabs 79 cause the bottoms 80 of the lamina 49 to move similarly, which causes a wave-like or buckling motion along the length of the lamina 49. Because of the thinness of the woven stainless steel strips 58 from which the sheets 59 of the lamina 49 are fabricated each lamina 49 easily buckles and assumes a random curved shape from the bottom 80 to the vertex 56 when the vibrator drive 92 moves the beams 77. Such buckling occurs rapidly so that the flexure from the bottom 80 to the vertex 56 of each lamina 49 is effective to cause the solids 26 that have rested on or adhered to the lamina 49 to become dislodged therefrom. The dislodged solids 26 settle downwardly through each settling channel 53 and to the bottom 31 of the detention basin 29 for removal in a standard manner. For example, equipment such as that disclosed in U.S. Pat. No. 4,401,576 issued Aug. 30, 1983 to applicant C. L. Meurer for Sediment Collecting Device may be utilized to remove the settled solids 26 from the bottom 31 of the detention basin 29.

The adjustment mechanism 51 enables the operator of the clarifier 25A to achieve both of the above design goals in the operation of the clarifier 25A. In particular, to promote settlement of the solids 26 onto the lamina 49, the angle 50 of inclination is increased to move the lamina 49 more horizontal. To aid in settling the solids 26 to the bottom 31 of the detention basin 29, the lamina 49 are moved to a more vertical position and the vibrator 88 operated to promote movement of the solids 26 from the lamina 49 to the bottom 31 of the basin 29.

Methods of Operation of the First Embodiment

The present invention clarifies the liquid 27 by separating the suspended solids 26 from the liquid 27. The method performed by the preferred embodiment includes the step of dividing the detention basin 29 into the many settling channels 53. These are the generally vertical flow paths 27A. The method includes the further step of releasably closing the top 55 of each such settling channel 53. This is performed by the overlapping free edges 48 in releasable sealing engagement with the overlapped fixed edges 47. The liquid 27 and the solids 26 are supplied to the detention basin at a pressure that causes the liquid 27 to open each of the closed and releasably sealed settling channels 53 so that the clarified liquid 27C exits the detention basin 29 at a liquid flow rate that is sufficiently low to permit the solids 26 to settle in the settling channels 53. Such releasable sealing effect may be provided by the flexible characteristic of the flap members 53 from the fixed edges 47 at the vertices 56 to the free edges 48.

Another aspect of the method of the present invention for separating the solids 26 from the liquid 27 includes the steps of containing the liquid 27 and the solids 26 in the detention basin 29 and providing the plurality of parallel lamina 49 extending in such basin 29 at the angle 50 relative to the surface 44 of the liquid 27 for defining the separate settling channels 53. Each of the lamina 49 is moved to change its angle 50 relative to the surface 44 of the liquid 27 according to the settling characteristics of the solids suspended in the liquid and the operational goals for setting the solids 26. When the lamina 49 are the woven sheets 59 that are hung in the basin 29, the movement of the lamina 49 is controlled as described above to cause each lamina 49 to buckle to remove the solids 26 therefrom.

Referring to FIGS. 1 and 2A, the planar deck 42 is shown covering one entire section 37. The deck 42 thus covers the portion of the open top 30 of the basin 29 that coincides with the section 37. This portion of the top 30 of the basin 29 is divided into equal areas by the settling channels 53. The flexible characteristic of the flap members 43 is selected to be relatively uniform from flap member 43 to flap member 43. In this manner, even though the force of the liquid flowing upwardly in one quiescent zone is greater than that in another quiescent zone due to the random movements of the liquid 27, the flexible characteristic will tend to equalize the rate at which the liquid 27 flows through the same unit area defined by the settling channels 53.

Third Embodiment of Flow Control Deck 42

Figure 7:
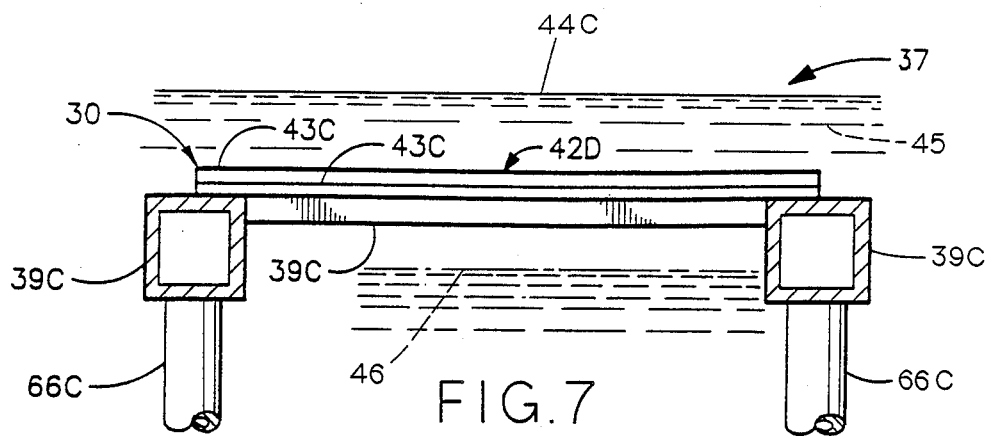
FIG. 7 is an end elevational view of the embodiment of the flow control deck shown in FIG. 6 also illustrating the beams on which the fixed edges of the flap members are mounted.

Reference is made to FIGS. 6 and 7 where a third embodiment of the flow control deck 42 is shown and is referred to as 42C. This embodiment of the deck 42C is used when it is primarily desired to separate the liquid 27 in the clarifier 25A into the respective upper and lower layers 45 and 46. As shown in FIG. 7, the second embodiment of the deck 42C extends at least part way across the open top 30 of the detention basin 29. In particular, the deck 42C extends across one section 37 of the detention basin 29. The deck 42C is formed from a series of sheet-like flap members 43C that have an overlapping relationship similar to that shown in FIGS. 4A and 4B, for example. However, and in general, the sheet-like flap members 43C are bent into an angular shape such that only a short section 97 (FIG. 6) depends from the vertex 56C of each flap member 43C. Each flap member 43C of the second embodiment of the deck 42C is supported on the beam 39C that is supported by a post 66C similar to the post 66 shown in FIGS. 5A and 5B. The beam 39C extends along the section 37 of the detention basin 29. The flat head bolts 65C secure the fixed edges 47C to the beams 39C, allowing the free edges 48C to move into open positions as described with respect to the free edge 48L shown in FIG. 4B. Referring to FIG. 6, the beam type of bracket 57B is connected to the beam 39C to provide added support to the flap members 43C. In the manner described above with respect to the deck 42, the deck 42C divides the liquid 27 in the basin 29 into the upper and lower layers 45 and 46, respectively. The portion of the open top 30 of the basin 29 that is covered by the deck 42C is also divided into equal areas by the flap members 43C. The deck 42C functions similar to the deck 42 to tend to equalize the rate of flow of the liquid 27 across those equal areas.

Fourth Embodiment of Flow Control Deck 42

Figure 8:
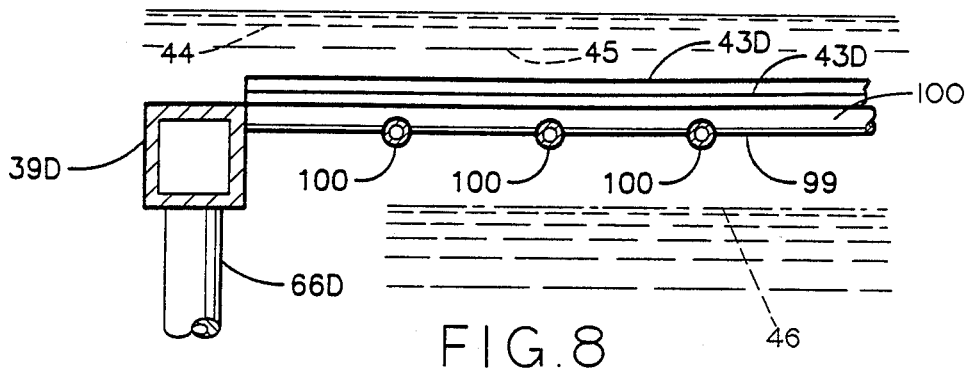
FIG. 8 is an end elevational view similar to FIG. 7 of a portion of another embodiment of the flow control deck without the depending parallel lamina, showing a mesh support for mounting the fixed edges of the flap members.
Figure 9:
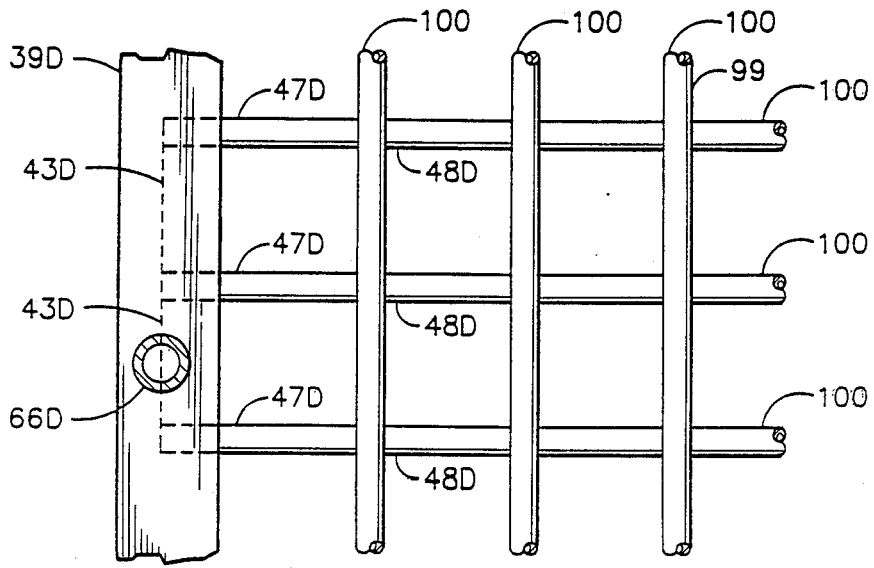
FIG. 9 is a plan view looking upwardly at the clarifier section shown in FIG. 8, showing the mesh supporting the fixed edges of the flap members.

Referring now to FIGS. 8 and 9, the flow control deck 42 may also be provided as generally shown in FIGS. 6 and 7 but without the short section 97 that depends from the flap members 43C of the second embodiment of the deck 42C. In particular, and referring to FIG. 8 and FIG. 9, the flap members 43D of the third embodiment of the deck 42D are in an overlapping relationship similar to that shown in FIGS. 4A and 4B. Such flap members 43D are held in that horizontal or planar overlapping relationship by a rigid mesh structure 99 of open woven bars 100 that are supported on a beam 39D (similar to the beam 39C in FIG. 7) which is supported on a post 66D (similar to the post 66C in FIG. 7). To hold the fixed edges 47D of a given flap member 43D against movement, one of the bars 100 that extends under the fixed edge 47D of each flap member 43D is secured, such as by welding, to the fixed edge 47D of each flap member 43D, leaving the free edge 48D free. This is shown in FIG. 9 where the mesh 99 is shown extending with some of the bars 100 parallel to the length of the flap members 43D and the other bars 100 of the mesh 99 extending perpendicular thereto.

The deck 42D functions in a manner similar to the deck 42C.

Fifth Embodiment of the Flow Control Deck 42E

Figure 20A:
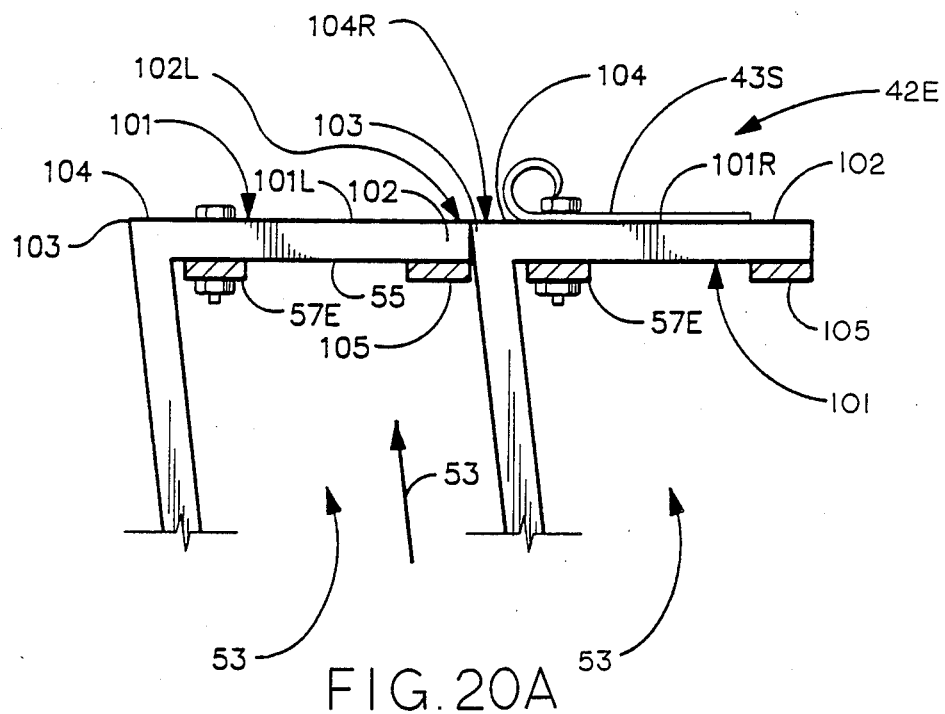
FIGS. 20A and 20B are side elevational views of another embodiment of the flap members in which the releasable sealing engagement is accomplished without overlapping the flap members.
Figure 20B:
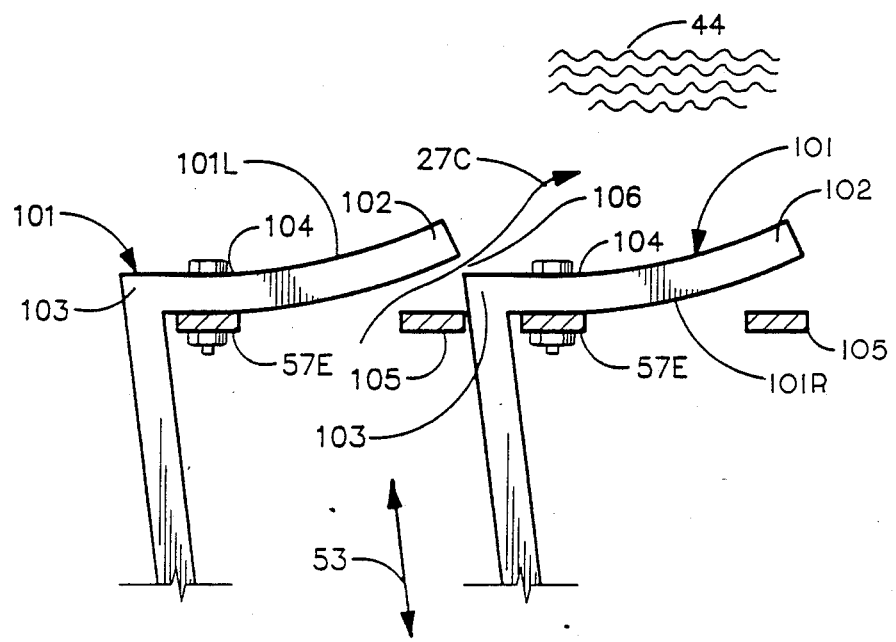

Referring now to FIGS. 20A and 20B, a fifth embodiment of the planar flow control deck 42 is shown. This embodiment is referred to using the reference number 42E and is provided with adjacent flap members 101 that do not overlap but that still provide a releasable sealing relationship between adjacent flap members 101. The releasable sealing relationship is formed by a free edge 102 of each flap member 101 moving into adjacent, but non-overlapping, relationship with a vertex 103 of the next adjacent flap member 101. As in the description of the flap members 43, the flap member 101L is on the left in FIG. 20 and the flap member 101R is on the right. In particular, the planar flow control deck 42E extends across at least a part of the detention basin 29, which is one of the sections 37 Each of the flap members 101 is elongated and has a fixed edge 104 and the opposing free edge 102. The fixed edge 104 of each flap member 101 is secured as by welding or being bolted to a bracket 57E that extends partly across the section 37 of the detention basin 29 in a manner similar to the bracket 57A. With the fixed edges 104 secured to the brackets 57E, in the absence of force from the upward flow of the liquid 27 the free edges 102 of the left flap members 43L are in releasable sealing engagement with the adjacent fixed edges 104R of an adjacent right flap member 101R. As shown in FIGS. 20A and 20B, the releasable sealing engagement results from a support bracket 105 (supported on the beam 39) below each free end 102 that holds the free end 102 adjacent the vertex 103 of the adjacent flap member 101R in a closed position. The position of the adjacent left and right flap members 101L and 101R, respectively, shown in FIG. 20A is referred to as the closed position. Opposite ends of each flap member 101 are positioned by the respective brackets 57E over the beams 39 as in FIGS. 5A and 5B. As a result the area covered by the flap members 101 is effectively closed when the left flap member 101L is in the closed position shown in FIG. 20A. Thus no clarified liquid 27C flows from the top 55 of the settling channel 53.

As shown in FIG. 20B, the free edges 102 of the left flap members 101L are free to move out of sealing engagement with the fixed edges 104 of the right adjacent flap member 101R in response to the force of the upwardly flowing liquid within the settling channel 53. The positions of the free edges 101 relative to the fixed edges 104 of the left flap member 101L shown in FIG. 20B are referred to as the open positions In the open position, the left flap member 101L has flexed to provide a gap or opening 106 between the free edge 102 of the left flap member 101L and the adjacent fixed edge 104 of the right flap member 101R. Similar to that shown in FIG. 5B, this gap 106 is generally rectangular and results in the free edge 102L being spaced from the fixed edge 104R of the right flap member 101R. The upward movement of the free edge 102L of the left flap member 101L may also be limited by the plates 72. The plates 72 extend partially over the flap members 101 and are thus in position limit the upward movement thereof and to thus limit the cross-sectional area of the gaps 106. The gaps 106 permit the clarified liquid 27C to flow above the planar flow control deck 42E so that the clarified liquid 27C can flow toward the trough 36 of the detention basin 29.

Circular Clarifier 25B

Referring to FIGS. 13 through 18, the circular clarifier 25B is shown for removing the solids 26 from the liquid 27. The circular clarifier 25B is shown including the central cylindrical wall 60 that receives the liquid 27 and the solids 26 from the upper inlet 32B. The liquid 27 and the solids 26 flow downwardly and radially outward toward the annular clarifier section 62 and under the circular partition 61 that defines the inner side of the annular clarifier section 62. The outer cylindrical wall 63 defines the other side of the annular clarifier section 62.

With this structure of the annular clarifier section 62 in mind, it may be appreciated that it would be possible to install vertical, rigid plates (not shown) in fixed radial positions in the annular clarifier section 62, so that such plates are perpendicular to the curved partition 61 and the curved outer wall 63. However, because such plates are rigid, any attempt to tilt or incline them would first require that the vertical edges be trimmed so as to assume a curved shape that would conform to the curved paths of the intersections between such edges and the partition 61 and the wall 62. Without such trimming, there would be spaces between the straight vertical edges of the plate and the partition 61 and the wall 62. Further, such trimmed plates could not be annularly adjusted to change the incline angle without removal from the basin 29B and further trimming.

As described below, the circular embodiment of the present invention overcomes such limitations encountered when prior art rigid plates are to be used in circular clarifiers.

Annular Flow Control Deck 42B

In the circular clarifier embodiment of the present invention, an annular flow control deck 42B is provided at the top 107 of the annular section 62 of the circular clarifier 25B. Since the structure of such deck 42B is similar to that of the first embodiment of the deck 42, the elements of the deck 42 that are used in the deck 42B are referred to using the reference letter "B" with the prior reference number. This annular deck 42B is also formed from a plurality of elongated, sheet-like flap members 43B. As shown in greater detail in FIGS. 13 and 17, each of the flap members 43B has the two opposing edges 47B and 48B and is generally the same as the flap members 43 shown in FIGS. 2, 3A and 3B. The annular flow control deck 42B can have any of the various configurations 42C through 42E that are described above. In a preferred embodiment, the edge 47B of each of the plurality of flap members 43B is fixed and the opposite free edge 48B thereof is in releasable sealing engagement with an adjacent or right flap member 43BR. Thus, the opposite free edges 48B and the overlapping surfaces 68B are free to move out of engagement with the overlapped surfaces 64B of the adjacent flap members 43BR in response to the upward flow of the liquid 27 from the bottom 31B of the cylindrical basin 29B.

Figure 13:
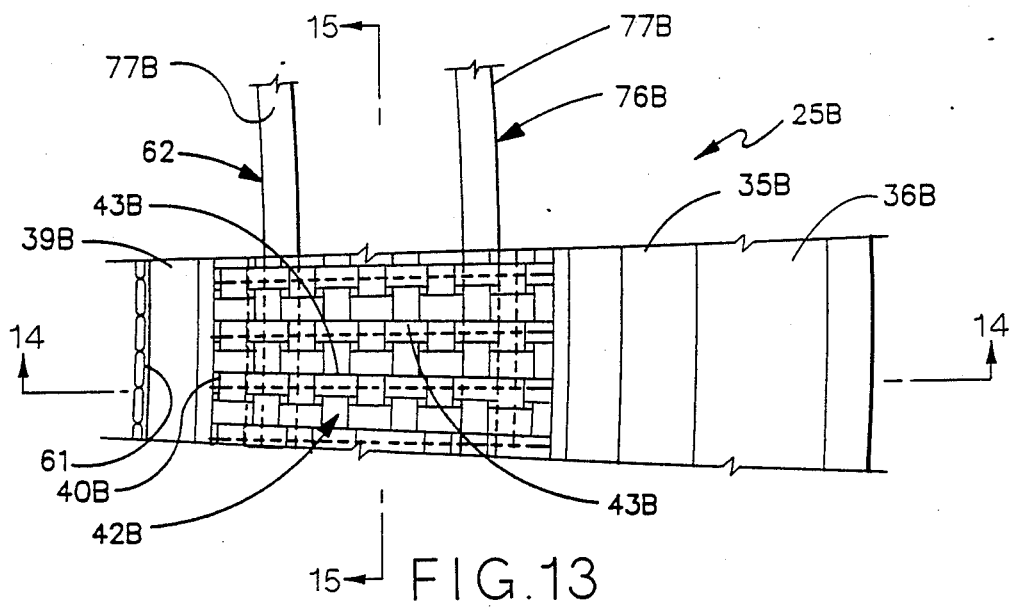
FIG. 13 is a plan view of a portion of a circular embodiment of the present invention showing radially extending lamina in an annular clarifier section of a circular detention basin.
Figure 17:
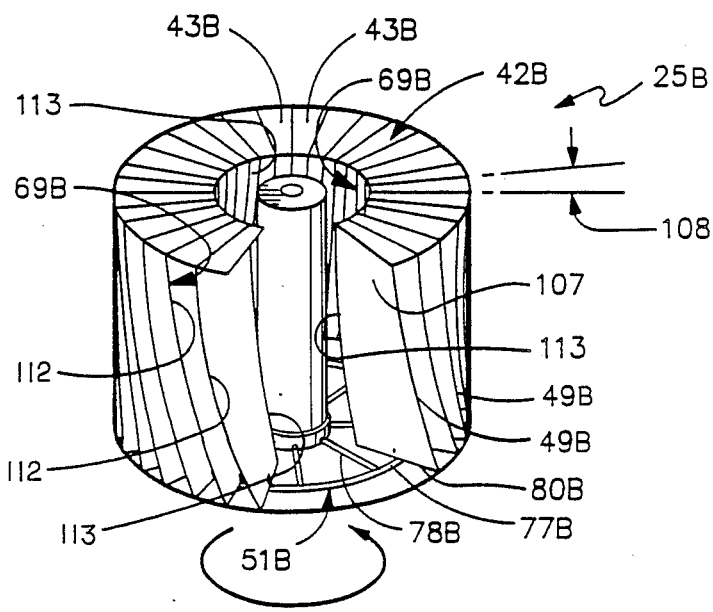
FIG. 17 is a perspective view of the circular clarifier shown in FIG. 13 illustrating the outer vertical edges of the lamina being curved to engage the outer wall of the detection basin as the lamina extend downwardly in an inclined position.

Referring in detail to FIGS. 13 and 17, two adjacent flap members 43BL and 43BR are shown positioned at an angle 108 relative to each other, such that they are not parallel as are the flap members 43L and 43R of the first embodiment (FIGS. 2 and 3A). This radial positioning of the fixed edges 47B at the angle 108 results in a tapering of the overlap of the free edges 48BL and the overlapping surfaces 68B over the fixed edges 47BR and the overlapped surfaces 64B. This overlap is somewhat less than one inch near the outer wall 63 and somewhat more than one inch near the partition 61. The free edges 48BL and the overlapping surfaces 68B, in cooperation with the fixed edges 47BR and the overlapped surfaces 64B, are still effective to close the tops 55B of the channels 53B of the circular clarifier section 62.

Except for the wedge-shape of the overlap of the flap members 43B, the flow control operation of the annular deck 42B is the same as that described above with respect to the planar deck 42. Thus the flow of the clarified liquid 27C through each gap 71B tends to be equal.

Adjustable Lamina 49B for Circular Clarifier 25B

In the embodiment of the annular flow controller deck 42B in which the quiescent zones 34B are to be formed, the circular clarifier 25B is also provided with flexible, inclined lamina 49B that form the quiescent zones 34B to assist in reducing the upward liquid flow so that the solids 26 carried by the liquid 27 settle and are separated from the liquid 27. The lamina 49B are formed integrally with, and extend downwardly from the vertices 56B of, the flap members 43B so that they hang in close relationship. Since the diameter of the outer cylindrical wall 63 may be about 100 feet and the radial extent of the clarifier section 62 may be only five feet, for example, the lamina 49B hang in generally but not exact parallel relationship since they are also connected to the radially extending fixed edges 47B that are at the angle 108 relative to each other. Adjacent pairs 52B of the lamina 49B form the quiescent zones 34B, which are effective as the separate inclined settling channels 53B.

Figure 14:
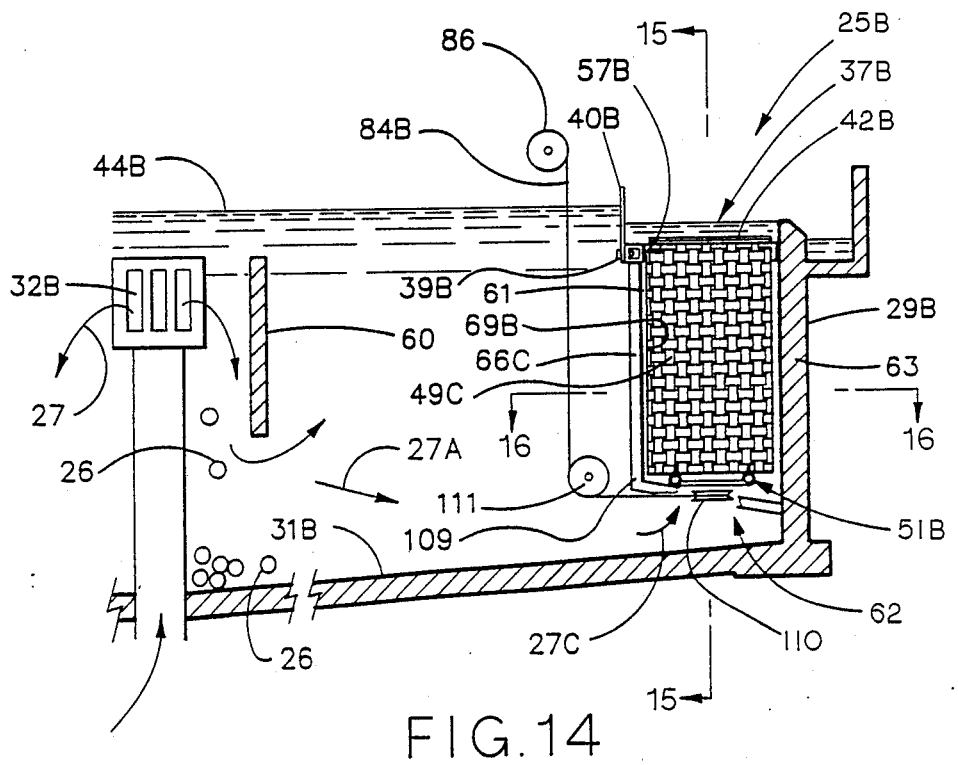
FIG. 14 is an elevational view taken along line 14—14 in FIG. 13 showing the outer vertical edges of the lamina extending along an outer wall of the circular detention basin and the inner edges of such lamina extending downwardly along a central circular partition.
Figure 15:
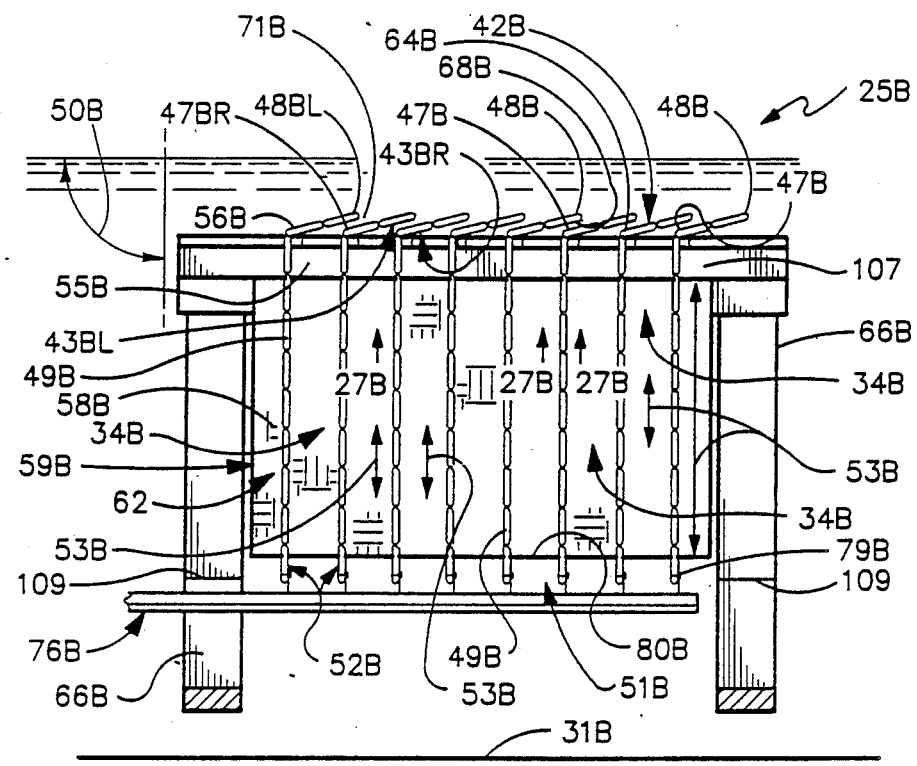
FIG. 15 is an elevational view taken along line 15—15 in FIG. 13 showing the lamina connected to a mechanism for changing, in tandem, the angle of inclination of the parallel lamina.

In a preferred embodiment of the circular clarifier 25B, the integral lamina 49B and flap members 43B are constructed from the sheet 59B formed from the same woven strips 58B of stainless steel material as is shown in FIGS. 10 and 11. As shown in FIGS. 14 and 15, the lamina 49B are mounted to the beam 39B on the brackets 57B in a manner similar to that shown in FIGS. 4A and 5A for the first embodiment. However, since the bottom 31B of the detention basin 29B must be clear of posts, etc. to allow a solids removal device (not shown) to scrape the bottom 31B underneath the clarifier section 25B, the post 66B has a knee 109 in it and is supported on the outer wall 63. Also, the cross baffle 40 is in the form of a circular baffle 40B. As shown in FIG. 13, the beams 39B, the weir 35B and the trough 36B are also circular.

Annular Lamina Adjustment Mechanism 51B

The angle 50B (FIG. 15) at which the lamina 49B are inclined is adjustable under the control of the submerged adjustment mechanism 51B. In the preferred embodiment of the circular clarifier 25B shown in FIGS. 13 through 18, each respective lamina 49B is connected to the submerged mechanism 51B that is effective to vary, in tandem, the angle 50B (FIG. 15) at which the lamina 49B hang from the vertices 56B. Such adjustment of the angular position of the lamina 49B with respect to the surface 44B of the liquid 27 in the annular clarifier section 25B of the detention basin 29B enables the circular clarifier 25B to function as desired despite variations in the liquid 27 or the solids 26 that are introduced into the detention basin and to accommodate the user's operational preferences.

Figure 16:
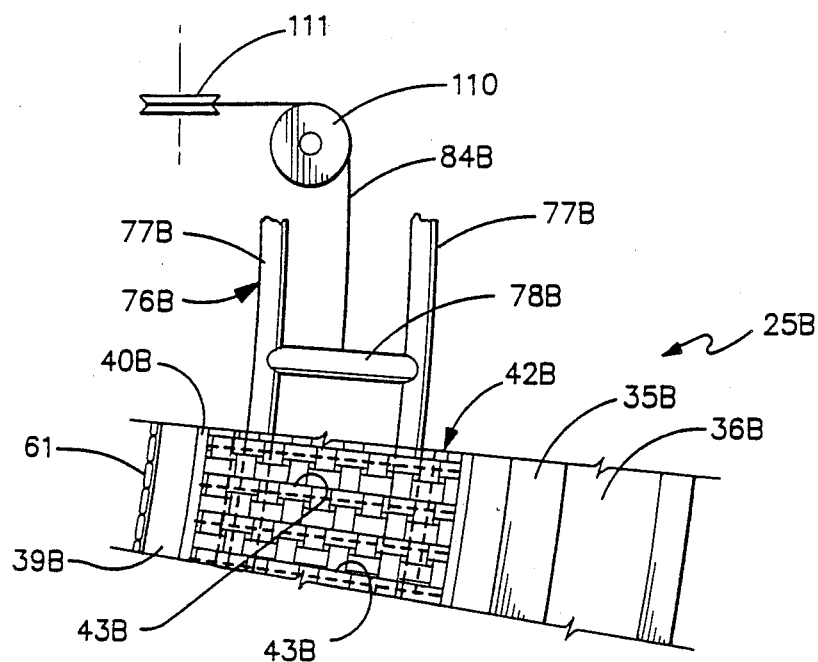
FIG. 16 is a plan view of a portion of FIG. 13 showing a second embodiment of the lamina adjustment mechanism for use in the annular clarifier section to adjust the angle of inclination of the parallel lamina.

Referring in detail to FIGS. 13 through 16, the adjustment mechanism is annular and is shown as an annular ladder-like structure 76B having the beams 77B in circular form that extend around the basin 29B above the bottom 31B of the annular clarifier section 37B. Cross pieces or rungs 78B of the ladder-like structure 76B extend radially between and are secured to the circular beams 77B. Each beam 77B is provided with the tabs 79B that are connected to the bottom edge 80B of each lamina 49B as described with respect to the lamina 49. The tabs 79B thus hold the bottom edge 80B of the lamina 49B in a radial direction. As shown in detail in FIG. 15, the annular lamina adjustment mechanism 51B is effectively suspended on and is thus supported vertically by the lamina 49B. The lamina 49B tend to hang vertically as shown in FIG. 15 but are moved into the inclined positions shown in FIGS. 17 and 18, for example, upon rotary movement of the beams 77B. Since the integral lamina 49B and flap members 43B are shown in the reversed-seven-shape, this movement is counterclockwise in FIG. 17. Such movement of the beams 77B is effective to swing each lamina 49B around the vertices 56B such that the beams 77B move upwardly as they swing to increase the inclination angle 50B. The clockwise-counterclockwise movement of the lamina adjustment mechanism 51B is controlled in a selective manner by a metal tape 84B that is attached to one of the rungs 78B (FIG. 16). The metal tape 84B extends around a submerged pulley 110, around another pulley 111 and then upwardly to a Winch that is similar to the winch 86 (FIG. 3C) having the motor that can be accurately stepped to incrementally wind or unwind the metal tape 84B by selected lengths so that the positioning of the beams 77B can be selected.

Limit switches (not shown) can also be used to control the winch 86B so as to incrementally wind or unwind the tape 84B. Also, a squeegee or wiper 87 is provided for cleaning the tape 84B.

The lamina adjustment mechanism 51B is also effective to rapidly raise and lower (or vibrate) the beams 77B and the rungs 78B once they have been moved into a desired position to locate the parallel lamina 49B at a desired angle 50B of inclination. The adjustment mechanism 51B also includes the vibrator 88 (FIGS. 3C and 12) that grips the tape 84B and moves it up and down rapidly. The vibrator 88 is similar to that shown in FIG. 3C and is not described in detail with respect to the clarifier 25B. The vibrator 88 moves the tape 84B rapidly up and down, which causes the ladder 76B to move rapidly clockwise and counterclockwise, and thus up and down. The tabs 79B cause the bottoms 80B of the lamina 49B to move similarly, which causes a wave-like or buckling motion along the length of the lamina 49B. Because of the thinness of the woven stainless steel strips 58B from which the sheets 59B of the lamina 49B are fabricated, each lamina 49B easily buckles and assumes a random curved shape from the bottom 80B to the vertex 56B when the vibrator drive 92 moves the beams 77B. Such buckling occurs rapidly so that the flexure from the bottom 80B to the vertex 36B of each lamina 49B is effective to cause the solids 26 that have rested on or adhered to the lamina 49B to become dislodged therefrom. The dislodged solids 26 settle downwardly through each setting channel 50B and to the bottom 3B of the detection basin 29B for removal in a standard manner.

The adjustment mechanism 51B enables the operator of the clarifier 25B to achieve both of the above design goals in the operation of the clarifier 25B. In particular, to promote settlement of the solids 26 onto the lamina 49B. the angle 50B of inclination is decreased to move the lamina 49B more horizontal. To aid in settling the solids 26 to the bottom 31B of the detention basin 29B, the lamina 49B are moved to a more vertical position and the vibrator 88 operated to promote movement of the solids 26 from the lamina 49B to the bottom 31B of the circular basin 29B.

Figure 18:
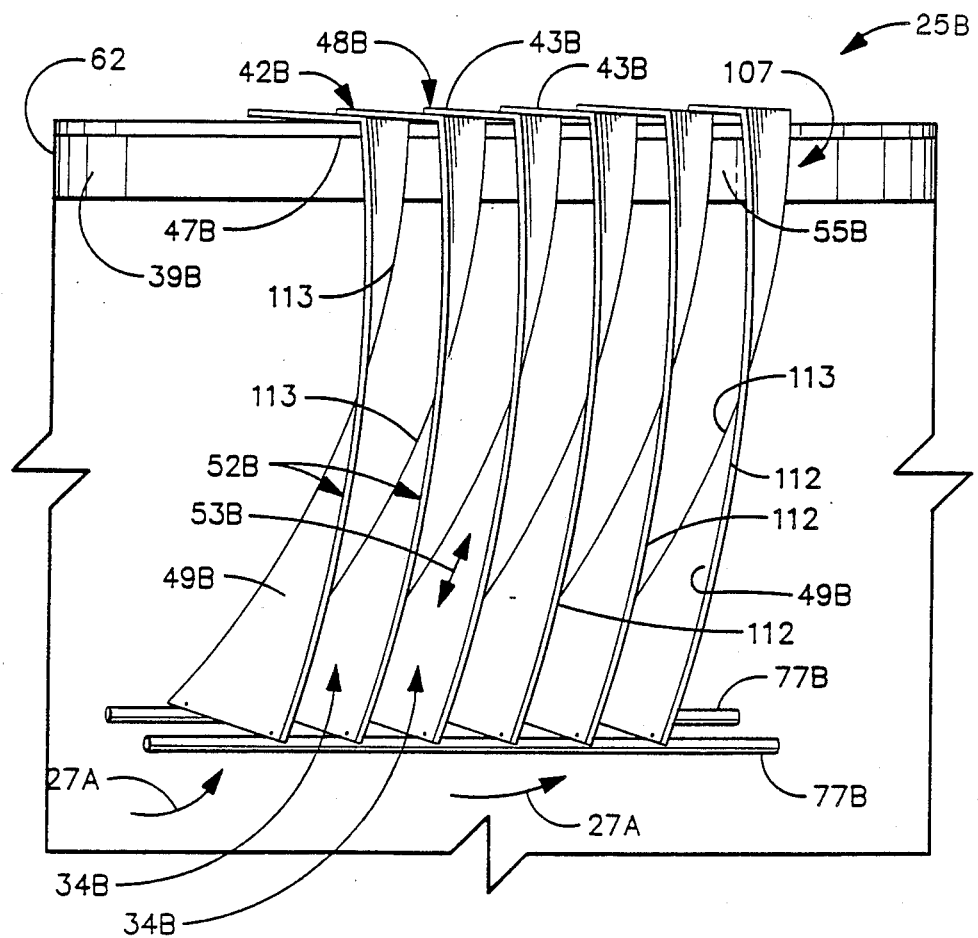
FIG. 18 is a side elevational view of the lamina shown in FIG. 17 illustrating the inner vertical edges of the lamina being curved to engage the inner partition of the detention basin, wherein the curvatures of those inner and outer edges are different.

It may be understood from FIG. 18 that the fixed edge 47B of the flap members 43B extends radially along a given radian. When the bottom 80B of a lamina 49B is moved counterclockwise the bottom 80B, which also extends radially, moves to a radian displaced by the angle 108 from the given radian.

Referring to FIGS. 17 and 18, the lamina 49B are shown with the side edges 69B extending along outer curved paths 112. In such paths 112, the outer edges 69B are in engagement with the outer wall 63 (FIG. 14) since the lamina 49B are flexible. The outer edges 69B remain in engagement with the outer wall 63 because of such flexibility of the lamina 49B. Thus, the outer edges 69B can extend in different curved paths 112 depending on the angle 50B of inclination of the lamina 59B. Similarly, the inner edges 69B of the lamina 59B extend along inner curved paths 113 adjacent the circular partition 61. In such paths 113, the inner edges 69B are in engagement with the partition 61 (FIG. 14) since the lamina 49B are flexible. The inner edges 69B remain in engagement with the partition 61 because of such flexibility of the lamina 49B. Thus the inner edges 69B can extend in different curved paths 113 depending on the angle of inclination 50B. The provision of the variably inclinable lamina 49B in the circular clarifier 25B provides more clarifier action since the nesting effect of the lamina 59B relative to each other can extend completely around the section 37B and need not stop, as with the deck 42 adjacent the weir 35 in FIG. 3C.

Floating Embodiment Clarifier 25C

Figure 19:
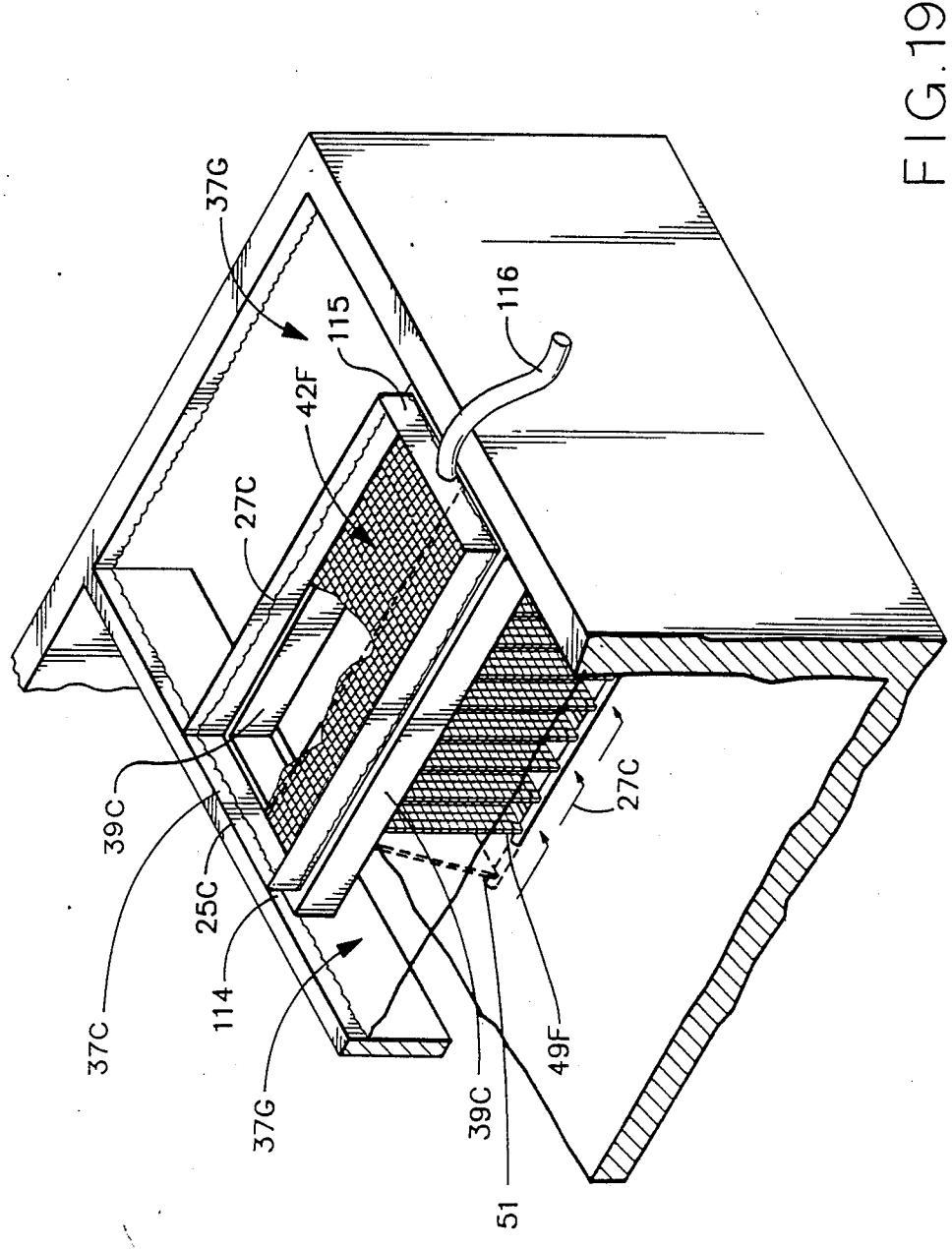
FIG. 19 is a perspective view of a floating embodiment of the present invention showing four sides of one clarifier section having a flotation structure for supporting the flow control deck and the plurality of parallel lamina depending therefrom.

Referring to FIG. 19, it may be understood that the clarifier 25 may be provided as a floating clarifier 25C in one section 37G. Here, the beams 39 are hollow and elongated vertically to form beams 39C. Hollow cross beams 114 extend from one beam 39C to the other beam 39C across the section 37G. The beams 39C and 114 are hollow and dimensioned to have a buoyant force sufficient to position the deck 42F at the desired location below the upper surface 44C of the liquid 27. A flexible discharge conduit 116 is connected to one side of a dam 115 to receive the clarified liquid 27C from the clarifier 25C and discharge liquid 27 from the basin 29. The deck 42F and the lamina 49F of the clarifier 25C may be configured as described above with respect to any of FIGS. 1 through 12, with the first embodiment of the clarifier 25 being preferred. Adjacent sections 37G can be open or receive similar floating clarifiers 25C.

Clarifier 225

Figure 21:
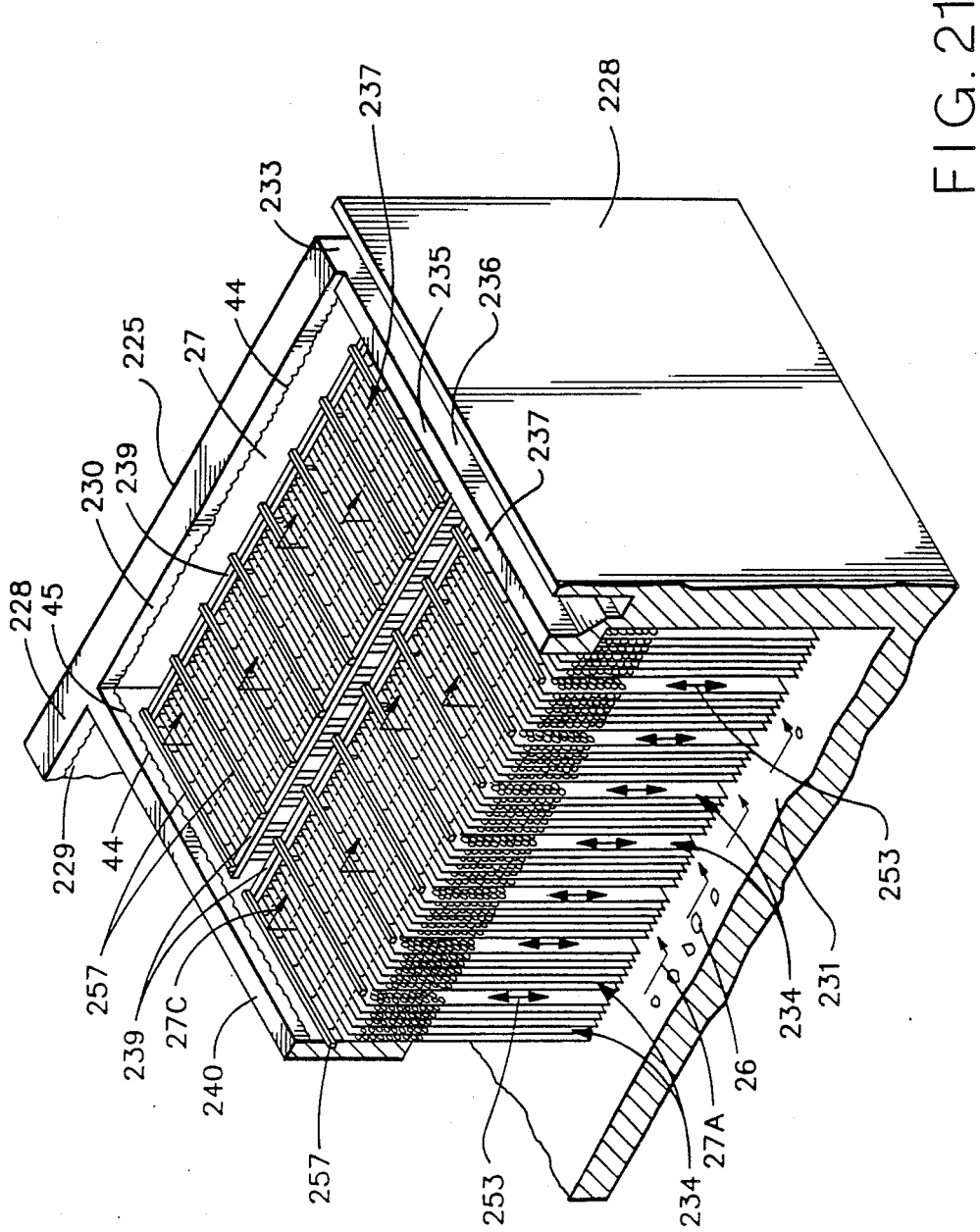
FIG. 21 is a perspective view of the clarifier sections that are similar to those shown in FIG. 2, showing 2D arrays having 3D members that are close-packed to provide enhanced removal of both types of solids in the quiescent zones.

Referring now to FIG. 21, a further embodiment of the clarifier 25 is shown. For ease of reference, when the structure of the further embodiments is similar to the previously described embodiments, the reference numbers 28 through 116 of the structure of the previous embodiments are increased by two hundred. Thus, in FIG. 21, the further embodiment of the clarifier 25 is shown as a rectangular clarifier 225. The clarifier 225 is shown for removing materials such as the solids 26 from the liquid 27. The clarifier 225 is shown including vertical outer walls 228 which define a detention basin 229 having an open top 230 and a bottom 231. As the liquid 27 and the solids 26 flow through the detention basin 229 from an inlet (such as the inlet 32 in FIG. 1) to an outlet 233, the flow of the liquid 27 and the solids 26 is substantially reduced according to the principles of the present invention to form many very low flow rate, or quiescent, zones 234 in the clarifier 225. The liquid 27 and the solids 26 flow upwardly (see liquid/solids flow arrows 27A in FIG. 21, for example) in the quiescent zones 234 so that the solids 26 are removed from the liquid 27 and the resulting clarified liquid (represented by arrows 27C), flows to the outlets 233 of the clarifier 225. These outlets 233 may be in the form of weirs 235 that lead to troughs 236.

The detention basin 229 is divided into sections and, in FIG 21 three sections 237 are shown. Vertical internal partitions 238 define a center section and one partition 238 and one wall 228 define an outer one of the sections 237. The internal partitions 238 extend downwardly from beams 239 which extend along the length of the detention basin 229 between one of the opposite outer walls 228 and a cross baffle 240. In a manner similar to that shown in FIG. 1, the liquid 27 and the solids 26 suspended therein flow into the detention basin 229, are spread out and flow along the bottom 231 toward the cross baffle 240. The cross baffle 240 prevents the liquid 27 and the solids 26 from flowing over the clarifier sections 237 without flowing through those sections 237. The liquid 27 and the suspended solids 26 spread out across the bottom 231 and flow underneath and upwardly into the quiescent zones 234 of the detention basin 229 as indicated by the liquid/solid flow arrows 27A.

Vertical Embodiment of 3D Arrays 119 of Three-Dimensional Members 118

Still referring to FIG. 21, each section 237 of the detention basin 229 is provided with two dimensional ("2D") arrays 117 of three-dimensional ("3D") members 118 that are close-packed or nested to form a 3D array 119. In the embodiment shown in FIG. 21, referred to as a vertical embodiment, the 2D arrays 117 are suspended in parallel relationship, and are shown extending vertically from rods 120 that extend from beam-type brackets 257 that are mounted on the beams 239. Grommets 121 are provided at the top 122 of each 2D array to receive the rods 120. Adjacent pairs 123 (see joined arrows in FIG. 21) of the 2D arrays 117 define the quiescent zones 234, which are effective as channels 253 for removing the solids 26 from the liquid 27 so that the clarified liquid 27C exits a top 255 of the quiescent zones 234.

Figure 22A:
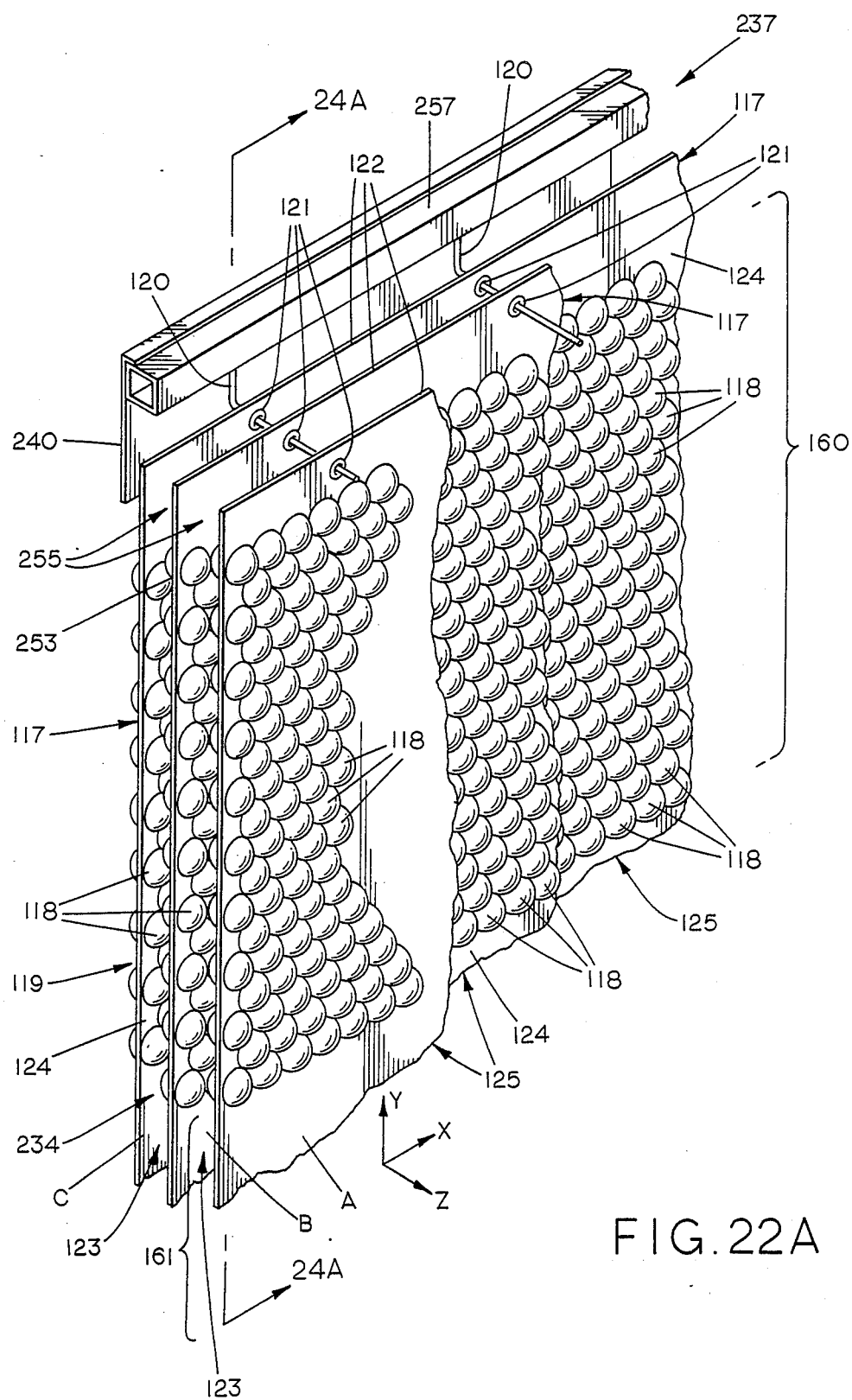
FIG. 22A is a perspective view showing three of the 2D arrays that are shown in FIG. 21, wherein a front sheet of one 2D array is cut away to show a middle sheet of another 2D array, and the middle sheet is cut away to show a third sheet, each sheet having 3D members thereon in a different regular pattern.
Figure 22B:
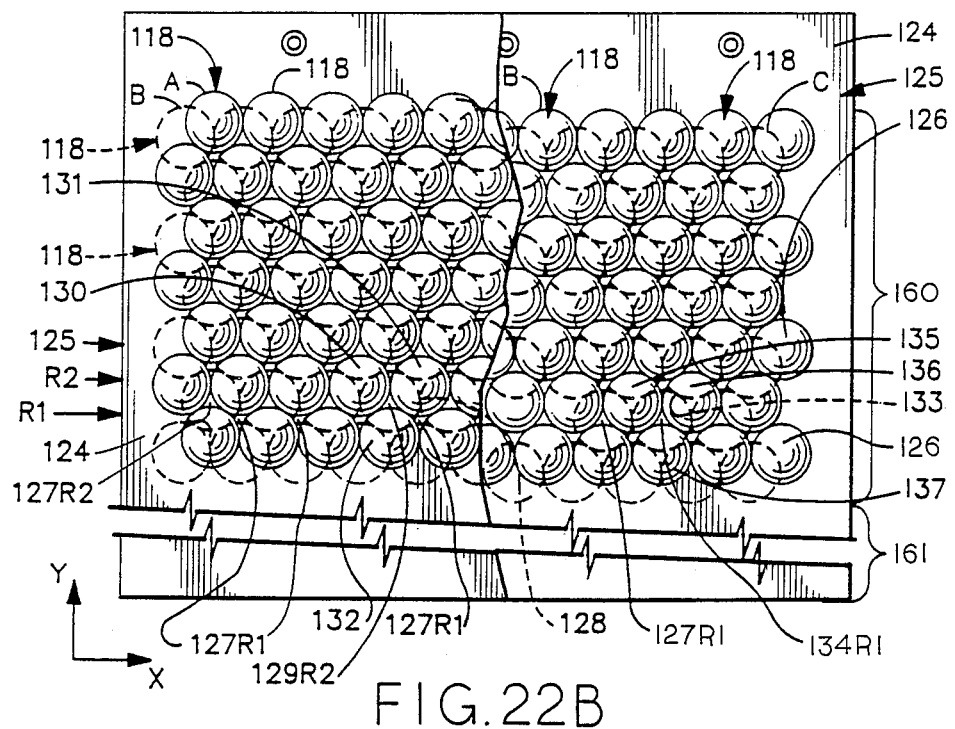
FIG. 22B is a front elevational view of FIG. 22A showing the relationships of the 3D members on the front, middle and third sheets across each of the sheets in x and y directions where three different patterns (A, B and C) are illustrated.
Figure 23A:
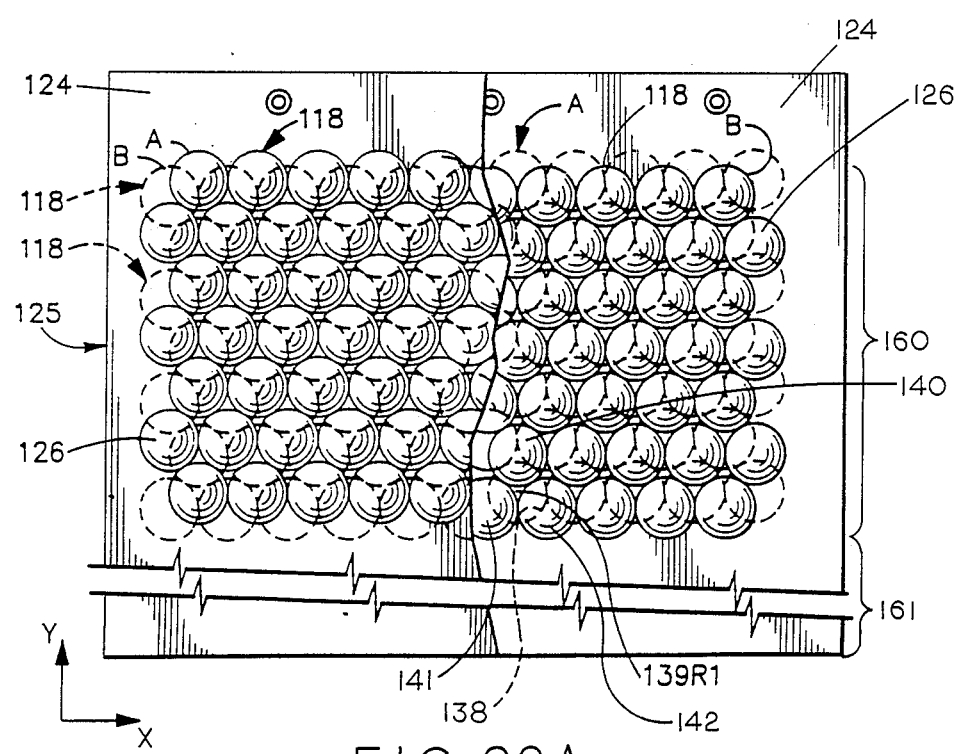
FIG. 23A is a view similar to FIG. 22B, wherein the pattern on the third sheet is an A pattern rather than a C pattern.
Figures 24A, 24B:
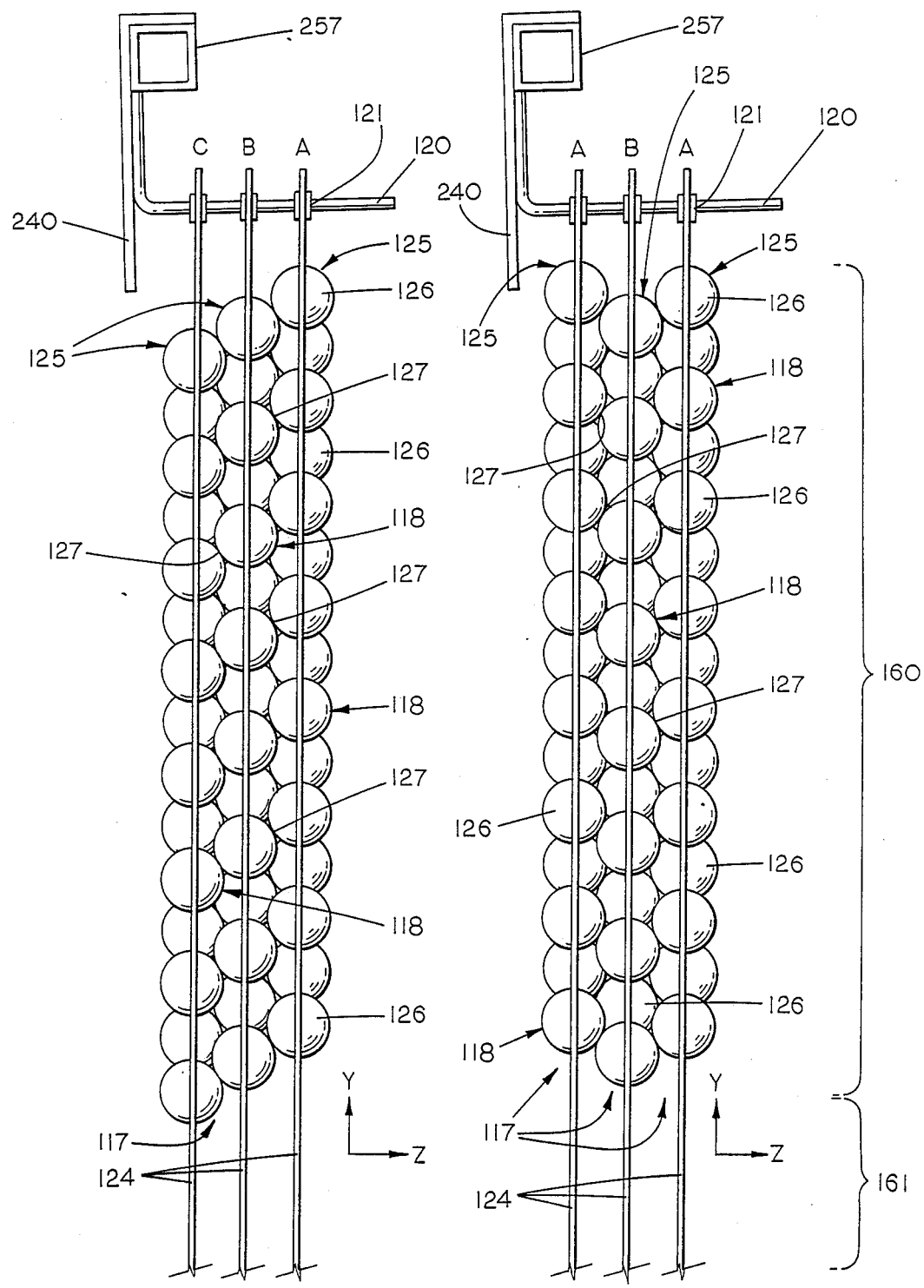
FIG. 24A is a cross-sectional view taken along line 24A—24A in FIG. 22A showing three 3D arrays hanging vertically with the 3D members close-packed, with the section being taken without cutting through the 3D members so that the spacial relationship of the close-packed 3D members is clear.
FIG. 24B is a side view of FIG. 23A showing three 2D arrays hanging vertically with the 3D members close-packed, with the section being taken without cutting through the 3D members so that the spacial relationship of the close-packed 3D members is clear.

To promote increased removal of the solids 26 from the liquid 27, each 2D array 117 is provided with the 3D members 118. Referring to FIGS. 22A, 22B and 23A, the 2D arrays 117 are shown in detail. Each 2D array 117 is shown including a sheet 124 that defines a two-dimensional 124 ("2D") plane extending in x and y directions. Each sheet 124 carries and positions a plurality of the 3D members 18 so that the 3D members 118 of a particular sheet 124 are described as forming a layer 125 that extends in the x and y directions. In FIG. 21, many layers 125 of the 3D members 118 are nested with each other to form one 3D array 119. Referring to FIGS. 22A, and 24A, a first layer 125 is shown in front (to the right in FIG. 24A) and is referred to as the A layer 125 to facilitate describing how the 3D members 118 of one sheet 124 are nested with 3D members 118 on another sheet 124. A second layer 125 is shown behind the A layer 125 in FIG. 22A and is referred to as the B layer 125 to designate the arrangement of the 3D members of an adjacent sheet 124 relative to the 3D members of the A layer 125. A third layer 125 is shown behind the second or B layer 125 in FIG. 22A and to the left in FIG. 24A. As described below, the third layer may be another A layer 125 (FIGS. 23A and 24B) or a C layer (FIGS. 22A, 22B and 24A).

FIG. 22B shows the first, second and third layers 125, with the left side of the figure showing the A layer 125 in front of the B layer 125. The 3D members 118 of the B layer 125 are hidden by the sheet 124 of the A layer 125 (see left side of FIG. 22B). The 3D members 118 of the third layer 125 are hidden by the A and B layers 125. On the right side of FIG. 22B, the A layer 125 has been cut away to show the B layer 125 in front of the third layer 125, and the B layer 125 is shown hiding the third layer 125.

FIGS. 22A, 22B, 23A, 23B, 24A and 24B illustrate the 3D members 118 in the form of spheres 126 that extend in the z direction from both sides of the sheets 124, and that also extend in the x and y directions. As discussed below, the 3D members 118 may be in the form of other protuberances or polyhedrons that extend in the x, y and z directions to define 3D shapes other than the spheres 126.

Figure 23B:
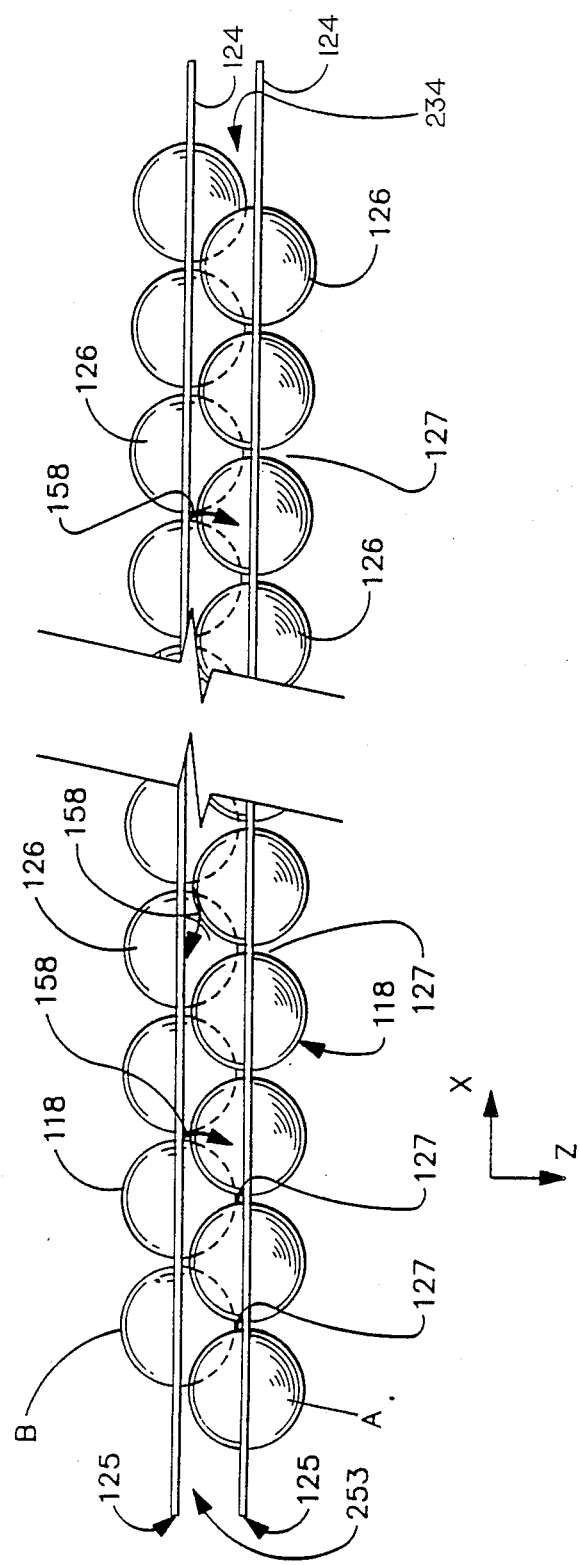
FIG. 23B is a top view looking down on the front two sheets shown in FIG. 22A and showing the offset in the x direction of the 3D members in the A and B patterns that permits nesting of such members.

As shown on the left side of FIG. 22B, the spheres 126 of the B layer 125 are offset in both the x and y directions from the spheres 126 (shown solid) of the A layer 125. FIG. 24A also shows the offset in the y direction of the spheres 126 of the B layer 125 relative to the spheres 126 of the A layer 125. FIG. 23B shows a plan view of two of the layers 125, the A and B layers, that are shown in FIG. 22A. The spheres 126 of the A layer 125 are shown closely spaced (or adjacent) relative to each other in the x direction.

Similarly, the spheres 126 of the B layer are adjacent each other in the x direction. The spheres 126 of the B layer 125 are shown offset in the x direction from the spheres 126 of the A layer 125.

In particular, the offset in both the x and y directions is such that the spheres 126 of the B layer 125 fit into selected ones of arcuate hollows or pockets 127 between the spheres 126 of the A layer 125. As shown in FIG. 22B, for example, there are two sets of pockets 127 in the A layer 125. There, the pockets 127 of a first set are referred to using the reference number 127R1 to indicate that they are in a row R1 in the x direction having a first row address (or height) in the y direction. The pockets 127 of a second set are designated 127R2 since they are in a row R2 in the x direction having a second address (or height) in the y direction. The R1 and R2 rows are identified on the left in FIG. 22B. In referring to specific pockets, the suffix "R1" designates a pocket 127 from the first set, whereas the suffix "R2" designates a pocket 127 from the second set. For example, one such sphere 128 (shown dashed) of the B layer fits into one such pocket 129R2 between a group of the spheres 130, 131 and 132 of the A layer 125. The sphere 128 of the B layer 125 that fits into the pocket 129R2 between the spheres 130, 131 and 132 is thus offset in the x direction by one-half the diameter of a sphere 126 and is offset in the y direction by one-half the diameter of a sphere 126. Described another way, the pocket 127R2 into which the sphere 128 fits is in the y direction from two upper adjacent spheres, the spheres 130 and 131, of the A layer 125.

When one such sphere 128 fits into one such pocket 127 formed by three such adjacent spheres 130, 131 and 132, the sphere 128 of the B layer 125 is described as being "nested" and is "close-packed" in relation to the adjacent spheres 130, 131 and 132 of the A layer 125. This nesting of the spheres 128, 130, 131 and 132, which is a nesting of the spheres 126 of one 2D array 117 with the spheres 126 of an adjacent 2D array 117, represents the minimum number of 2D arrays 117 for forming the 3D array 119.

Further, the third layer 125 may be positioned in either of two close-packed ways relative to the B layer 125 to extend the 3D array 119 further in the z direction. In particular, to illustrate one embodiment of the 3D array 119, the third layer 125 is shown in FIGS. 22A, 22B and 24A as a "C" layer. Here, the C layer 125 is placed adjacent the B layer 125 so that the spheres 126 of the C layer 125 are not aligned in the vertical or y direction with the spheres 126 of the A layer 125. Rather, the spheres 126 of the C layer 125 are further offset in the +x and +y directions from the locations of the spheres 126 of the B layer 125 as shown on the right side of FIG. 22B The +y offset is shown in FIG. 24A. In particular, the offset is defined when the spheres 126 of the C layer 125 fit into the first set of pockets 127R1 formed by the spheres 126 of the B layer 125. As so offset, the spheres 126 of the C layer 125 (shown dashed on the right side of FIG. 22B) fit into the hollows or pockets 127R1 on the side of the B layer 125 away from the A layer 125. It may be understood that one such sphere 125 of the C layer 125, a sphere 133, for example, fits into a pocket 134R1 formed by adjacent spheres 135, 136 and 137 of the B layer 125. The sphere 133 is thus nested in the pocket 134, and is close-packed in respect to the spheres 135, 136 and 137.

Alternatively, as shown on the right side of FIG. 23A and in FIG. 24B, the third layer 125 may be placed adjacent the B layer 125 so that the spheres 126 of the third layer 125 align in the x and y directions with those of the A layer 125 (the spheres 126 of the third A layer 125 are shown dashed in FIG. 23A). The spheres 126 of the third A layer 125 (shown dashed on the right side of FIG. 23A) fit in the first set of pockets 127R1 formed by the B layer 125. The term "nested" also applies to one sphere 138 of the third or A layer 125 (shown dashed) that fits in a pocket 139R1 formed by adjacent spheres 140, 141 and 142 of the B layer 126 so that the sphere 138 is close-packed in respect to the spheres 140, 141 and 142.

Referring again to FIGS. 22A, 22B, 23A and 23B, the term "close-packed" is also used to refer to the arrangement of the 3D members 118 on a given sheet 124. The spheres 126 are located on a given sheet 124 very closely adjacent each other, which can also be referred to as being "close-packed" in the 2D x-y plane of the sheet 124, or "planar close-packed." There, in the x direction, for example the center of one of the spheres 126 is spaced from the center of an adjacent sphere 126 by about the diameter of the spheres 126. As described below with respect to FIGS. 32A through 32D, greater spacing may be provided in the x and/or y directions between the spheres 126. It is to be understood that as long as the spheres 126 of one layer 125 are adjacent each other and form the pockets 127 so that the spheres 126 of the adjacent layer 125 can be positioned in such pockets 127 and in that manner become nested or close-packed in the 3D sense of forming a 3D array 119, the 3D members 118 are referred to as being "close-packed" or "planar close-packed" in the x-y plane of the layers 125. For example, in FIG. 22A the spheres 126 in a vertical column at the left edge of the sheet 124 of the A layer 125 are not touching, but are adjacent each other and cooperate with the spheres 126 that are offset in the +x direction to form the pockets 127.

One embodiment of the vertical 3D array 119 is made up of layers 125 arranged in the order of the ABC layers 125 (FIG. 22B), whereas another embodiment of the vertical 3D array 119 is arranged in the order of the ABA layers 125 (FIG. 23A). It is to be understood that depending on the desired width (in the z direction) of the 3D array 119, the 3D arrays 119 can be formed by selected numbers of the continuous ABCABC... layers 125, or the 3D arrays 119 can be formed from selected numbers of the continuous ABABAB... layers 125.

It may be understood then, that the term "array" is used in respect to the 2D arrays 117 to describe the placement of the 3D members 118, such as the spheres 126, on the sheets 124 in a fixed, desired order. That order is regular as shown in FIGS. 22A and 23A, for example, and includes the spheres 126 placed on the sheets 124 in the geometric patterns shown in FIGS. 22A, 22B, 23A and 23B. The 2D arrays 117 can also be described as being formed from interconnected 3D members 118, where the sheets 124 connect the 3D members 118 and hold them in the desired, fixed, regular, geometric pattern.

Further, the term "array" is used in respect to the 3D arrays 119 to describe the placement of the regularly arranged 3D members 118 of one of the 2D arrays 117 in close-packed or nested relationship with respect to the 3D members 118 of an adjacent one of the 3D arrays 117. This close-packing of the 3D members 118 of adjacent 2D arrays 117 gives the 3D array 119 a dimension in the z direction (FIGS. 22A and 23B). As noted above, the amount of that z dimension is selectable according to how many layers 125 are used to form the 3D array 119. Importantly, since the 3D members 118 of the 2D arrays 117 are in a fixed, regular arrangement, the resulting nested, three-dimensional arrangement of 3D members 118 of the 3D arrays 119 is also fixed and known. This is in direct contrast to loose, buoyant media or loose, non-buoyant media of the prior art wherein the media randomly form media beds when urged against screens placed in the liquid flow path.

Figure 25A:
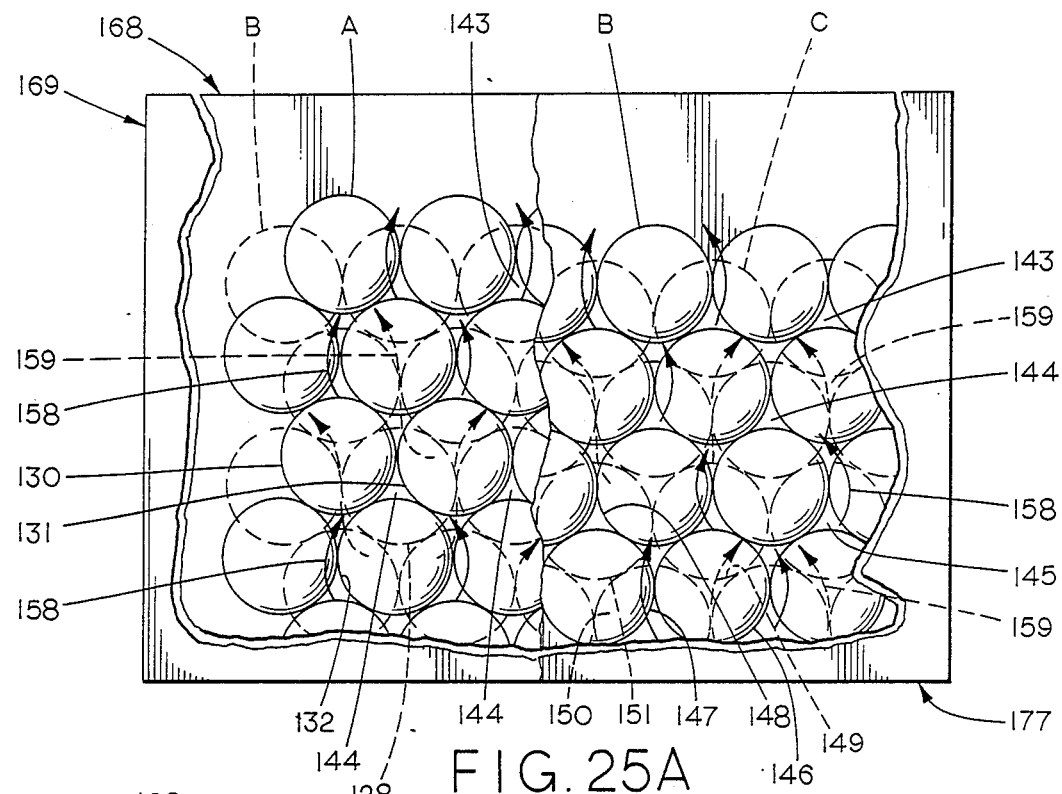
FIG. 25A is a view of an enlarged portion of FIG. 22B showing the shape of octahedronal interstices between the 3D members of the sheets having the A, B, C patterns.
Figure 25B:
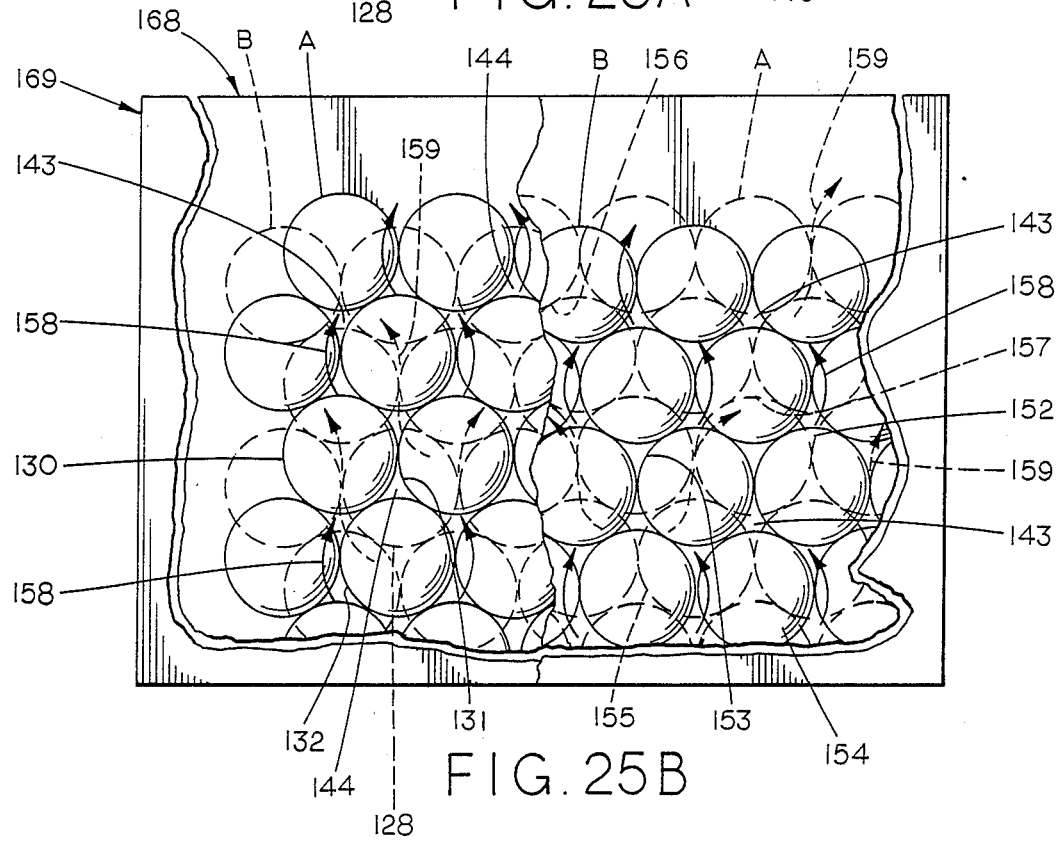
FIG. 25B is a view of an enlarged portion of FIG. 22C showing the shape of tetrahedral interstices between the 3D members of the sheets having the A, B, A patterns.
Figure 26A:
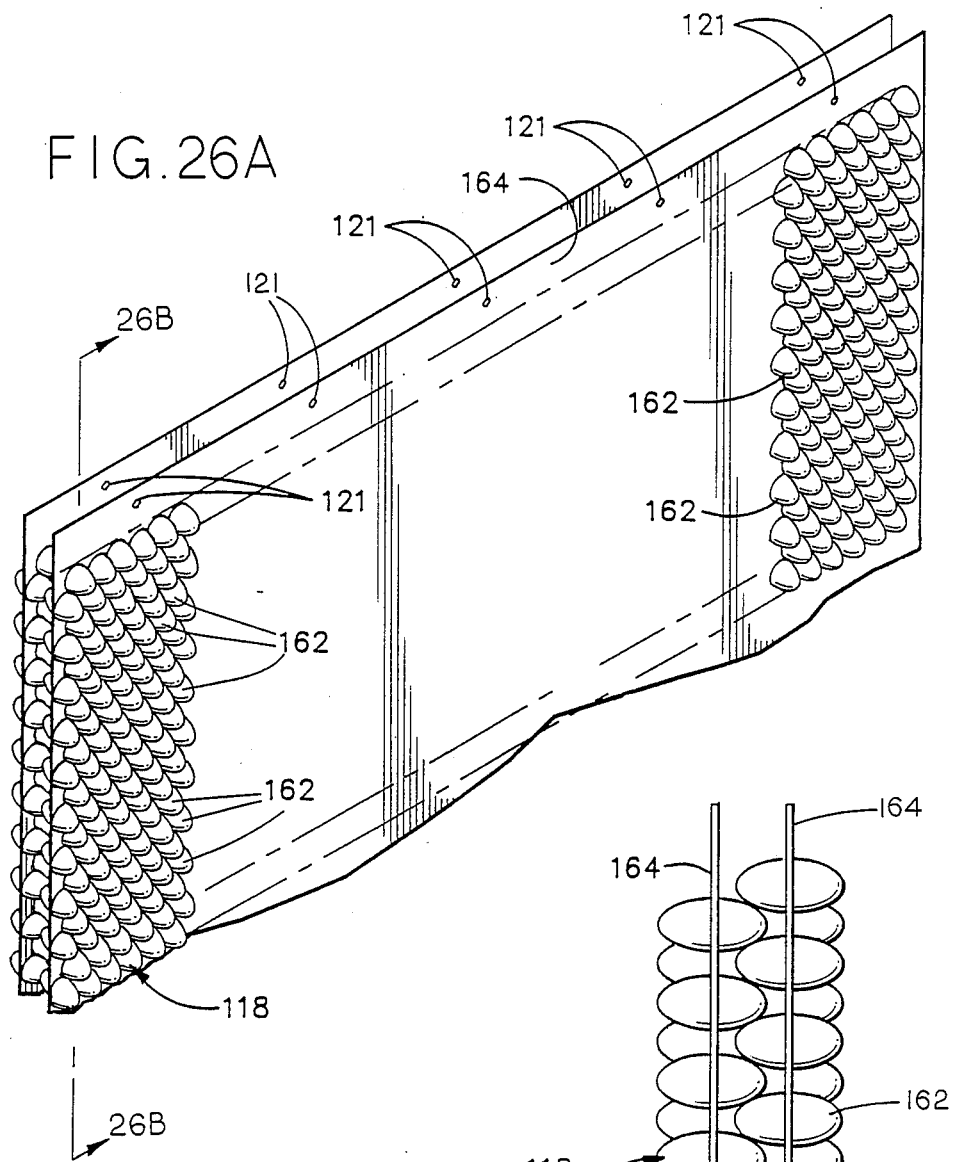
FIG. 26A is a perspective view of another embodiment of a 2D array wherein a sheet is shown having 3D members in the form of ellipsoids.
Figure 26B:
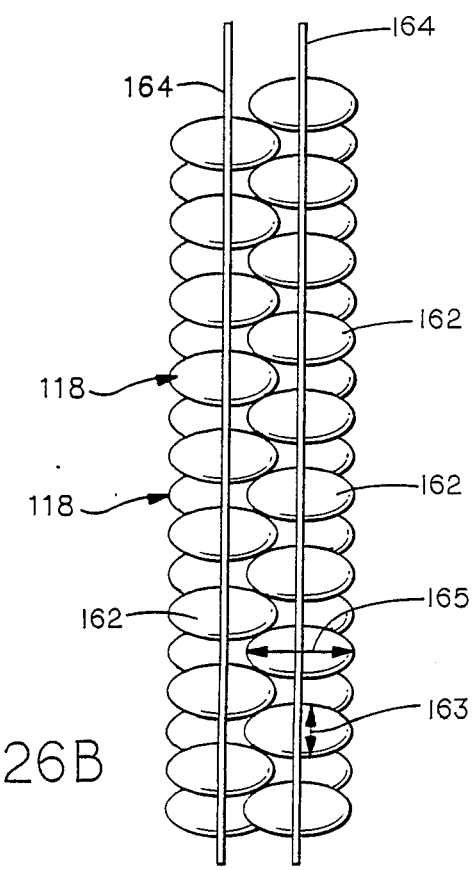
FIG. 26B is a cross-sectional view taken along line 26B—26B in FIG. 26A showing the shape of the ellipsoidal 3D members, with the section taken without cutting through the 3D members so that the spatial relationship of the close-packed 3D members is clear.

Importantly, the 3D arrays 119 are characterized by having regular open sites between the 3D members 118. Referring to FIGS. 25A and 25B, these open sites are referred to as interstices 143 and maybe selected to provide more or less open space between the close-packed 3D members 118, such as the spheres 126 of adjacent layers 125. When the 3D members 118 of the 3D arrays 117 are planar close-packed (i.e., in the x and y directions), and when the 3D array is close-packed (i.e., in the z direction as in the above-described ABAB layers 125 or ABCABC layers 125, for example), two types of interstices 143 are formed. Referring to FIG. 25A, tetrahedral interstices 144 are shown bounded by four spheres, such as the sphere 128 of the B layer 125 (shown dashed) and the spheres 130, 131 and 132 (shown solid) of the A layer 125. On the right in FIG. 25A, octahedral interstices 145 are bounded by six nearest spheres 126, which ar spheres 146, 147 and 148 (shown solid) of the B layer 115 and spheres 149, 150 and 151 (shown dashed) of the C layer 125.

Referring to the left of FIG. 25B, interstices 143 formed by ABA layers 125 are shown, wit tetrahedral interstices 144 formed by the spheres 128 (shown dashed), 130, 131 and 132. On the right in FIG. 25B, the octahedral interstices 145 are shown bonded by six nearest spheres, which are spheres 152, 153 nd 154 of the B layer 125 and spheres 155, 156 and 157 of he A layer.

Still referring to FIGS. 25A and 25B, it may be understood that the respective tetrahedral and octahedral interstices 144 and 145 are connected by arcuate intermediate passages 158 (shown by arcuate arrows 158 that curve around the spheres 126 between the interstices 143). Alternating ones of the passages 158 and the interstices 143 open one to another to form a generally vertical flow path 159 shown by the dashed arrows in FIGS. 25A and 25B for the liquid 27 and the poorly or non-settleable solids 26. The rate of flow of the liquid 27 in these flow paths 159 is reduced substantially such that the rate of flow of these solids 26 is also substantially reduced. This promotes settling by allowing the force of gravity to cause the poorly settleable solids 26 to move downwardly and hit the spheres 126. Additionally, each of the flow paths 159 is composed of short, thin sections represented by the succession of the interstices 143 and the intermediate passages 158. Significantly, each intermediate passage 158 causes directional changes of the liquid 27 and the non-settleable solids 26 so that the liquid 27 is directed against the surfaces of the spheres 126 that define one of the interstices 143. Thus, to the extent that some of the settleable solids 26 do not settle before flowing up to the 3D arrays 119, then the short sections of the flow path 159 with their shorter settling distances enhance the removal of the poorly settleable solids 26. In summary, the liquid 27 urges these non-settleable solids 26 into contact with the spheres 126 to promote adhesion of these non-settleable solids 26 to the spheres 126 and thus removal thereof from the liquid 27 As a layer of non-settleable solids 26 builds up on a sphere 126, the non-settleable solids 26 on the spheres 12 attract (via Van der Waal's forces) other solids 26 that flow slowly through the interstices 143 and the passages 158. As a result, there are three ways in which both types of solids 26 are removed from the liquid 27 flowing up the quiescent zones 134 through the flow path 159, namely, settlement, impact and Van der Waal's forces. Because the 3D arrays 119 are regular arrays in which the nested 3D members 118 are at known positions relative to each other in the 3D array 119, the series of interstices 143 and intermediate passages 158 that form a flow path 159 are of known and regular open size and shape. This results in increased periods of operation between cleaning of the 3D arrays 119 because the 3D arrays 119 can be designed with 3D members 118 having dimensions selected to avoid the random, very small spaces that exist in loose media that forms a randomly arranged filter bed under the action of buoyant forces or liquid flow.

In the vertical embodiment of the 3D arrays 119, the sheets 124 are hung on the rods 120 (FIGS. 22A and 23A) so that the 2D arrays 117 of at least the A layer 125 and the B layer 125 are present and positioned in offset relationship so that the spheres 126 on the opposite A and B layers 125 are close-packed as shown in FIG. 23B. The spheres 126 of the A and B layers 125 divide the quiescent zone 234 into many of the interstices 143 connected by the intermediate passages 158 to form many of the flow paths 159 in the removal channel 253 between the sheets 124.

In a preferred arrangement of the vertical embodiment of the 3D arrays 119, FIGS. 21, 22A, 22B, 23A, 24A and 24B show the 3D array 119 provided only in an upper section 160 of the quiescent zones 234. A lower section 161 of the quiescent zones 234 is formed by omitting the 3D members 118 from a lower portion of each sheet 124. This arrangement allows solids 26 that are settleable under the force of gravity to settle in that manner in the lower section 161 of the quiescent zone 234 before reaching the 3D array 119. This provides a two-stage removal of the solids 26, so that only poorly settleable or non-settleable solids 26 need be removed by the 3D array 119. This two-stage removal takes advantage of the range of solids 26 in a typical clarifier, where 90% of the solids 26 are generally settleable and will be removed in the lower section 160 of the quiescent zone 234 before the 3D array 119. This renders the 3D array 119 more efficient, since the 3D array 119 is not clogged by the settleable solids 26 and the poorly settleable or nonsettleable solids 26 are removed by the three-way action in the many flow paths 159 defined by the 3D array 119.

Hollow Ellipsoidal 3D Members 161

Referring again to FIG. 21, it may be observed that the number of sheets 124 required for a clarifier 225 will depend upon the size of the 3D members 118 in the z direction, which is the direction from the baffle 240 to the weir 235. When the spheres 126 are provided on the sheets 124 that number of sheets 124 will depend upon the diameter of the spheres 126. To reduce the number of sheets 124 required in a given length clarifier section 237 in the z direction, and to still provide the 3D arrays 119 as described above, the 3D members 118 are provided as hollow ellipsoids 162 as shown in FIGS. 26A, 26B, 30 and 31. A minor axis 163 (FIG. 26B) of each ellipsoid 162 is coextensive with a sheet 164 that corresponds to the sheet 124. A major axis 165 (FIG. 26B) of the hollow ellipsoids 162 extends perpendicular to the plane of the sheet 164. A 2:1 ratio is provided, for example, between the major axis 165 and the minor axis 163, and typical dimensions are one inch and one-half inch for the respective major and minor axes 165 and 163. Since the major axis is twice the minor axis, the sheets 164 can be spaced further apart than the sheets 124 that are provided with the spheres 126, yet the curved outer surfaces of the hollow ellipsoids 162 will still nest in generally the same manner as described above with respect to the sheets 124 having the spheres 126. In this manner, the 3D arrays 119 will be formed from 2D arrays 117 having the ellipsoids 162 thereon in regular patterns similar to that shown in FIGS. 22A or 23A. At the same time, fewer sheets 164 will be required in the z direction in a given length of the clarifier section 237.

3D Arrays 119 With Flow Control Deck 242

Referring to FIG 27, the 3D arrays 119 of the present invention may be mounted on the rods 120 that are secured to beam-type brackets 257. Those brackets 257 are similar to the beams 57 shown in FIG. 6, and are supported by beams 239. In a manner similar to the flow control deck 42, a flow control deck 242 is formed from flaps 243 that are structurally and functionally the same as the flow control deck 42C and the flaps 43C shown in FIG. 6. The 3D array 119 removes the solids 26 from the liquid 27 so that clarified liquid 27C flows over the flow control deck 242. The 3D array 119 includes many of the layers 125, such as the ABCABC layers 125 or the ABAB layers 125, for example, according to the characteristics of the liquid 27 and the solids 26 to be processed.

3D Arrays 119 Between Lamina 349

Figure 28A:
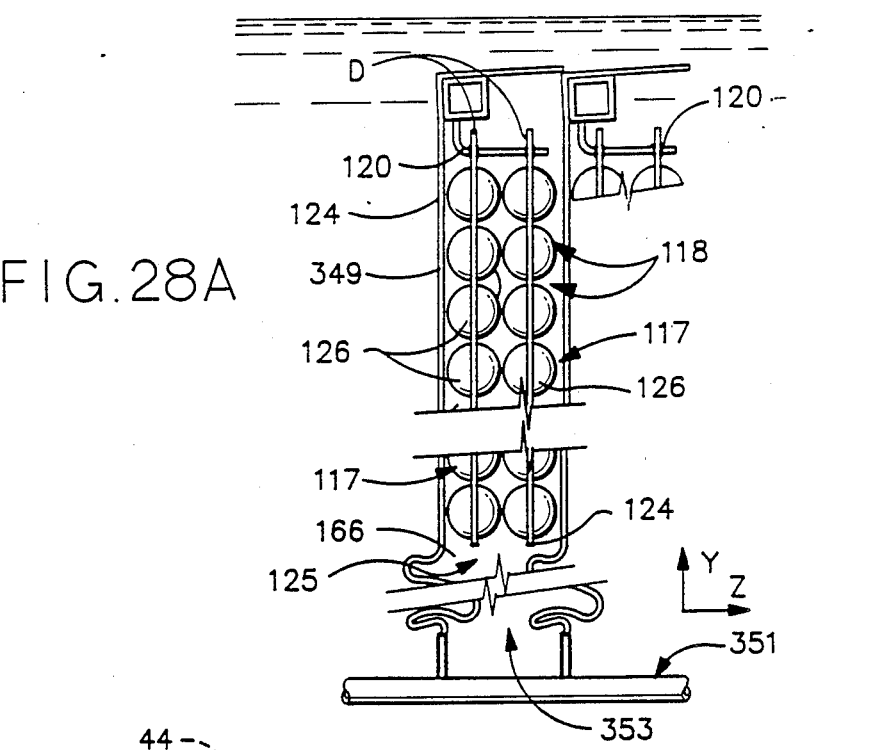
FIGS. 28A and 28B are side elevational views of two adjacent parallel lamina having the flap members and 2D arrays between the adjacent lamina, illustrating the upward flow of the liquid in the quiescent zone between two adjacent parallel lamina that becomes more restricted when the 2D arrays are moved from the open position shown in FIG. 28A to the position shown in FIG. 28B in which the 3D members of the 2D arrays are close-packed to form a 3D array.
Figure 28B:
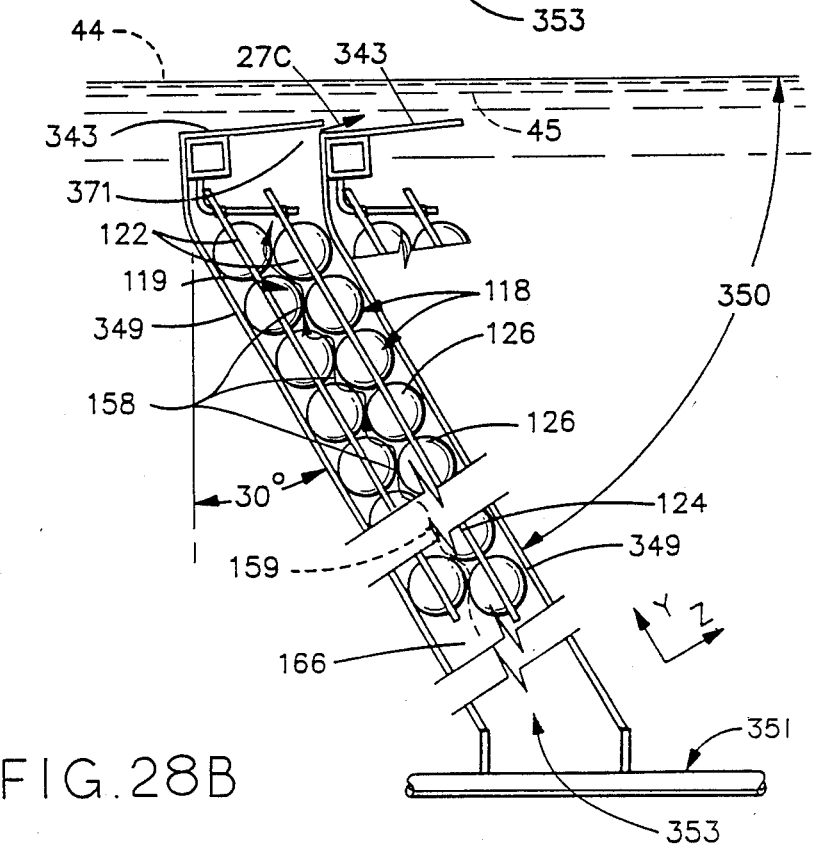

FIGS. 28A and 28B show an alternative way of rendering the 3D members 118 of the 2D arrays 117 close-packed to form the 3D arrays 119. For clarity of description, when a new element has the same structure as an element shown in one or more of FIGS. 1 through 20B, the reference number of the new element is three hundred more than that of the prior reference number. Thus, in FIG. 28A, lamina 349 are shown and are the same as the lamina 49 shown in FIG. 4A. Also, an adjustment mechanism 351 is provided and is the same as the mechanism 51 shown in FIGS. 4A and 4B. In FIG. 28A, the lamina 349 are shown vertically positioned. The 2D arrays 117 are mounted on the rods 120 and hang vertically. The 3D members 118 are shown as the spheres 126. The spheres 126 of one layer 125 are close packed in the x and y directions in that they are closely adjacent in both the x and y directions, with the spheres 126 being adjacent in vertical columns and horizontal rows. This is referred to as a D layer 125. However, when the sheets 124 are hung and the lamina 349 are vertical as shown in FIG. 28A, the spheres 126 are not close-packed in the z direction (to the left and right in FIG. 28A). Rather, the D layers 125 are slightly spaced in the z direction. As shown in FIG. 28A, the D layers 125 are initially positioned at the same height in the y direction so that when the lamina 349 are moved to the angle 350 (approximately 60°) shown in FIG. 28B relative to the upper surface 44 of the liquid 27, the spheres 126 become nested. In particular, when the nested 3D array 119 shown in FIG. 28B is viewed perpendicular to the plane of the 2D arrays 117 of the 3D array 119, the two adjacent spheres 126 of one column on the front (or right hand) D layer 125 form the pocket 127 and one sphere 126 from the near of left D layer 125 is nested in that pocket 127. In this embodiment, the sheets 124 only extend part way down the solids removal channel 353, so that such channel is relatively open below the 3D array 119. This allows settlement of the settleable solids 26 in a lower section 166 of the removal channel 353.

With the 3D members 118 of the 2D arrays 117 nested or close-packed in the z direction (perpendicular to the inclined lamina 349, FIG. 28B), the interstices 143 and the intermediate passages 158 are formed and form the inclined flow paths 159 to the top 122 (FIG. 28B) of the sheets 124 where the clarified liquid 27C exits for flow through the gap 371 into the upper layer 45.

To nest the 2D arrays 117 to form the ABA layers 125 or the ABC layers 125, the initial positions in the y and z directions of the sheets 124 for the A, B, and C layers 125 are varied accordingly so that the nesting occurs when the sheets 124 are inclined as shown in FIG. 28B. For example, when a C layer 125 is used, the sheet 124 for the C layer 125 is positioned so that the nesting of the 3D members 118 of the C layer 125 relative to the 3D members 118 of the B layer 125 will be as shown in FIG. 22B when the sheets 124 are inclined as shown in FIG. 28B.

To move the spheres 126 of the layers 125 shown in FIG. 28A into the arrangement of the close-packed 3D array 119 (close-packed in the z direction perpendicular to the plane of the sheets 124), a mechanism 351 is actuated to move the lamina 349 to an angle 350 of about 60° from the upper surface 44 of the liquid 27. This movement causes the spheres 126 of one layer 125, e.g., the front D layer, to move relative to the spheres 126 of the rear D layer 125, for example. At the angle 350, the spheres 126 of the layers 125 become close-packed in the z direction which is perpendicular to the plane of the now inclined sheets 124.

3D Arrays 119 In Circular Clarifier 425

Figure 30:
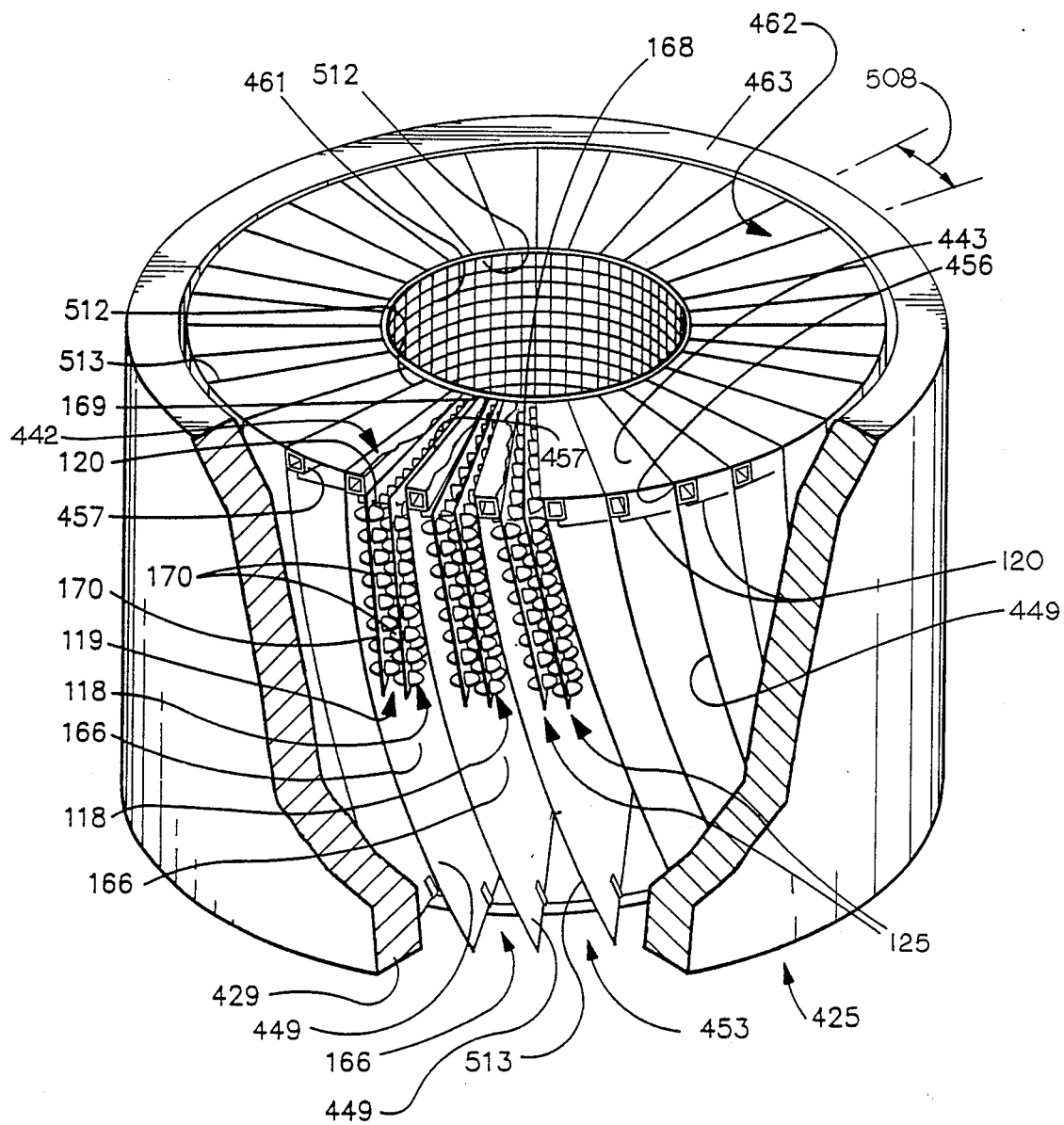
FIG. 30 is a perspective view of a portion of the circular clarifier shown in FIG. 17, illustrating the outer generally vertical edges of the lamina being curved to engage the outer wall of the detention basin as the lamina extend downwardly in an inclined position, wherein 2D arrays having elliptical 3D members are shown mounted between the lamina to form a 3D array between each pair of the lamina.
Figure 31:
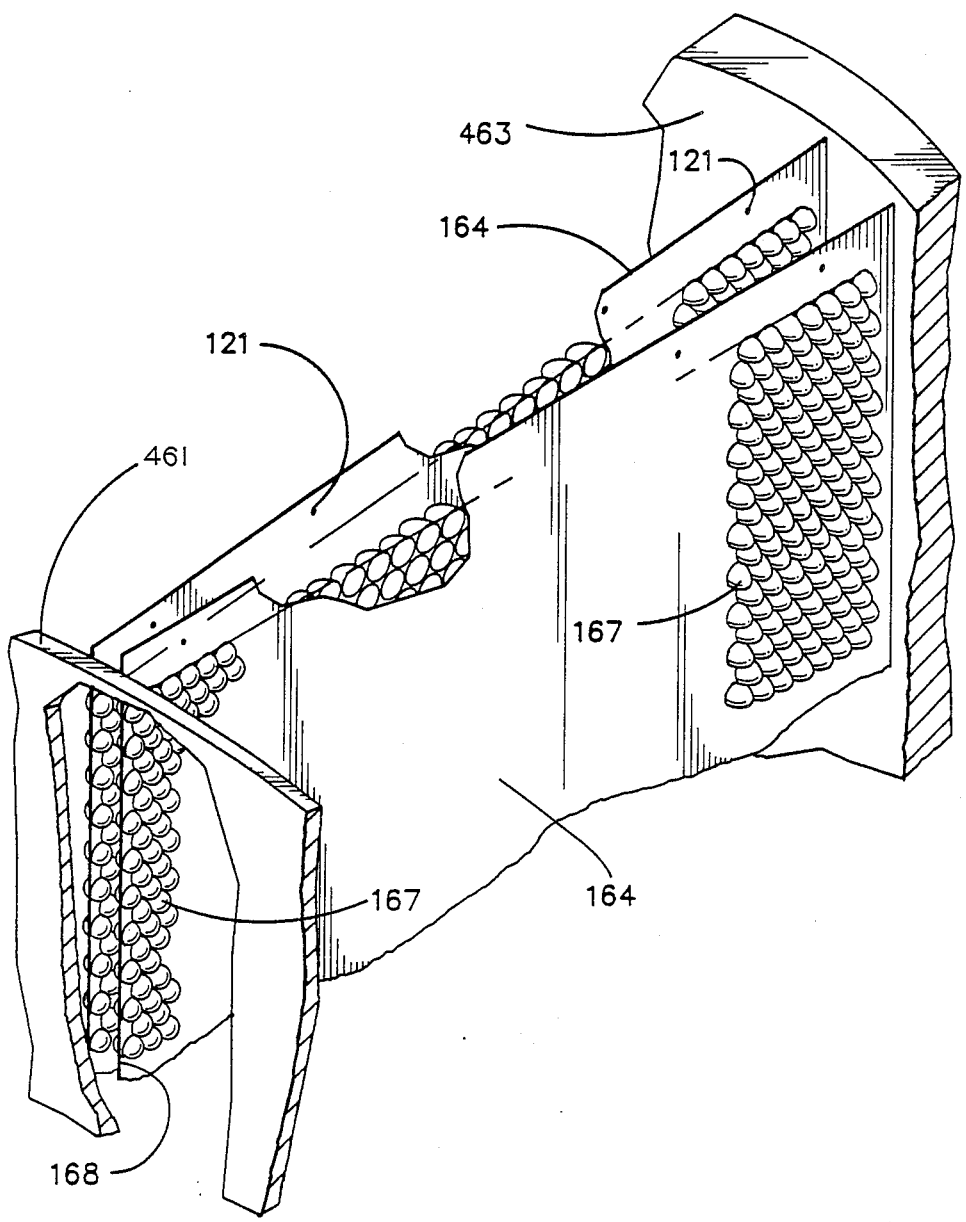
FIG. 31 is an enlarged portion of FIG. 30, showing the ellipsoidal 3D members having increasingly larger major axes to offset the increased distance between the lamina as the lamina extend radially toward the outer wall.

Another embodiment of the 3D arrays 119 is shown in FIGS. 30 and 31. There, a circular clarifier 425 is shown constructed in a manner similar to that shown in FIGS. 13 to 18, except for the provision of the 3D arrays 119. While the 3D arrays 119 can be provided in a circular clarifier 425 in a manner similar to that shown in FIG. 21, FIGS. 30 and 31 show the 3D arrays 119 provided between adjacent lamina 449 and below a deck 442, where the lamina 449 and the deck 442 are fabricated as shown in FIGS. 13 through 18. In particular, the A and B layers 125 are shown mounted on rods 120 between pairs of the lamina 449. The rods 120 are mounted on beam-type brackets 457 that are similar to the brackets 57B (FIG. 6) and that extend under the vertices 456 of the flap members 443 in a radial direction across a clarifier section 462. The lamina 449 are at the angle 508 relative to each other. As a result, the space between the lamina 449 adjacent an inner partition 461 is less than the space between the lamina 449 adjacent an outer wall 463. To provide the close-packed arrangement of the 3D members 118 of the 3D array 119 in this embodiment, the 3D members 118 located adjacent the inner partition 461 have smaller sizes than those located radially outward toward the outer wall 463. For example, in a sixteen foot outer diameter circular basin 429 having an eight foot diameter inner partition 461, the radial dimension (or width) of the annular clarifier section 462 would be four feet. The size of the 3D members 118 would vary by using the basic shape of the ellipsoids 162, but having the major axis 165 (FIG. 26B) gradually become larger. In particular, ellipsoids 167 are provided having, for example, a 0.75 inch minor axis. At a side 168 of the sheet 164 adjacent the inner partition 461, the major axis 165 of the ellipsoids 167 would also be about 0.75 inch, so that those ellipsoids 167 would be sphere-like.

Reference is made to FIG. 31 which shows an enlarged portion of FIG. 30. For ease of illustration, the lamina 449 and the sheets 164 are shown hanging vertically in FIG. 31. As shown in FIG. 31, major axis 165 of the ellipsoids 167 that are at radial distances further and further from the inner partition 461 have gradually and uniformly increasing dimensions, until the major axis 165 of the outer series of ellipsoids 167 (adjacent the outer wall 463) is 1.5 inches. Thus, with a 2:1 ratio of the outer diameter of the circular basin 429 relative to the diameter of the inner partition 461, this gradual increase in the dimension of major axis 165 of the ellipsoids 167 on the adjacent sheets 164 that are between adjacent lamina 449 enables those ellipsoids 167 on the adjacent sheets 124 to nest and assume the close-packed relative positions described above with respect to FIGS. 28A and 28B even though the lamina 449 are at the angle 508. As noted above. FIG. 31 is shown having the sheets 164 vertical. The 3D arrays 119 can be provided in the circular basin 429 without inclining the sheets 164 by portioning the sheets 164 in the manner in which the sheets 124 are positioned in FIG. 22A.

It is to be understood that the circular clarifier 425 is similar to the circular clarifier 25B in that the lamina 449 may be moved by a mechanism, such as the mechanism 51B shown in FIG. 17, into selected inclined positions relative to the upper surface 44 of the liquid 27. To provide the 3D arrays 119 between the inclined lamina 449, the 2D arrays 117 are arranged as described above with respect to FIGS. 28A and 28B. In particular, the 2D arrays 117 are initially positioned with the lamina 449 vertical (corresponding to the position shown in FIG. 28A) so that the 3D members 118 (the ellipsoids 167) will become nested or close-packed in the z direction when the lamina 449 are moved to the appropriate angle 350 (FIG. 28B) relative to the upper surface 44 of the liquid 27.

Also, the sheets 164 are shorter (in the y direction or height) than the lamina 449. This provides the open lower section 166 of a solids removal channel 453 for settling the settleable solids 26.

The circular clarifier 425 operates as described above with respect to the 3D arrays 119 and the embodiment shown in FIGS. 28A and 28B. Thus, in the inclined sheet 164 embodiment shown in FIG. 30 the respective inner and outer edges 512 and 513 of the lamina 449 become curved as the lamina 449 twist and become inclined. In a similar manner, the sheets 164 that carry the ellipsoids 167 twist and have inner and outer edges 169 and 170, respectively, that curve so that they extend along the respective inner partition 461 and the outer wall 463.

Woven Sheets 559 With 3D Members 118

Figure 29A:
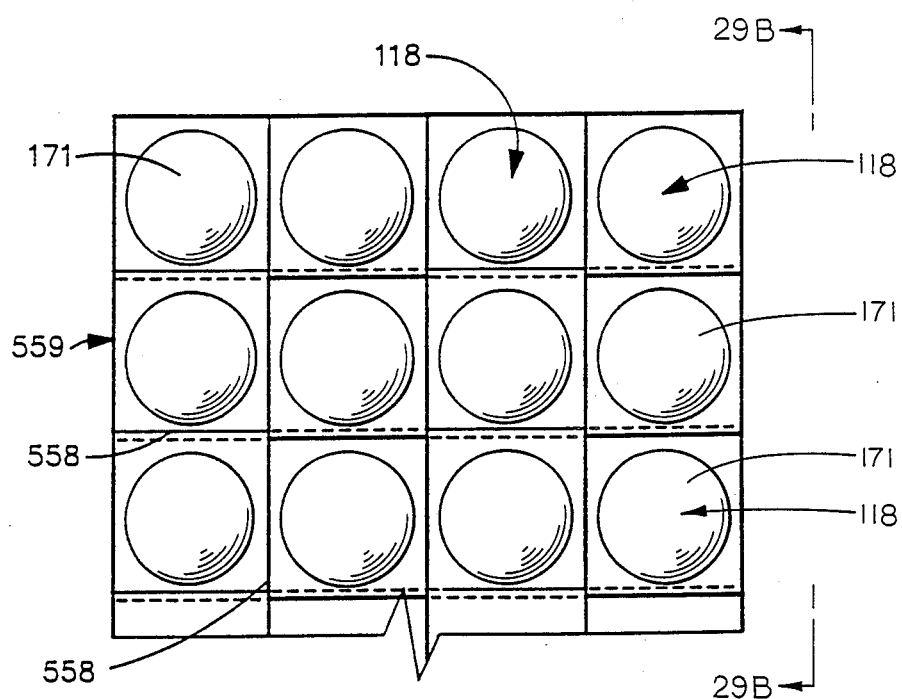
FIG. 29A is a front view of a sheet of the lamina, showing the lamina formed from woven strips of metal or plastic wherein each strip is provided with a series of half-3D members, and wherein the strips overlap to form full 3D members so that the sheet forms a 2D array.
Figure 29B:
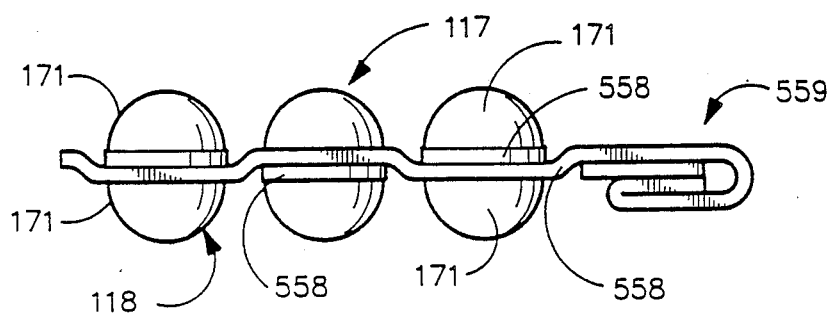
FIG. 29B is a cross-sectional view taken along line 29B—29B in FIG. 29A showing the strips of the woven lamina and the opposed half 3D members forming the 3D members of the 2D array, with the section taken without cutting through the 3D members so that the spatial relationship of the 3D members is clear.

Another embodiment of the 3D arrays 119 uses the structure of the woven lamina sheets 59 shown in FIGS. 10A, 10B and 11. This embodiment is shown in FIGS. 29A and 29B. In this embodiment, for ease of forming the 3D members 118, strips 558, which are similar to the strips 58, are fabricated from plastic material such as polyvinylchloride (PVC). Each warp and woof strip 558 is shown provided with a half section 171 that is one-half of a 3D member 118. As a result, where each warp and woof strip 558 cross, a 3D member 118 is formed. In this manner, a sheet 559 formed by the woven strips 558 having the half sections 171 forms the 2D array 117 of 3D members 118. The half sections 171 are held together by the overlapping of the warp and woof strips 558 to maintain the shape of the 3D members 118.

The sheets 559 may be used as the sheets 124 shown in FIGS. 21, 28B, 30 and 31, for example, in the vertical, inclined or cylindrical embodiments to promote additional and more efficient removal of the solids 26 from the liquid 27. The 3D arrays 119 would thus include many of the sheets 559 having the 3D members 118 in the form of the opposed sections 171 extending outwardly therefrom.

Manufacture of 2D Arrays 117

Figure 32E:
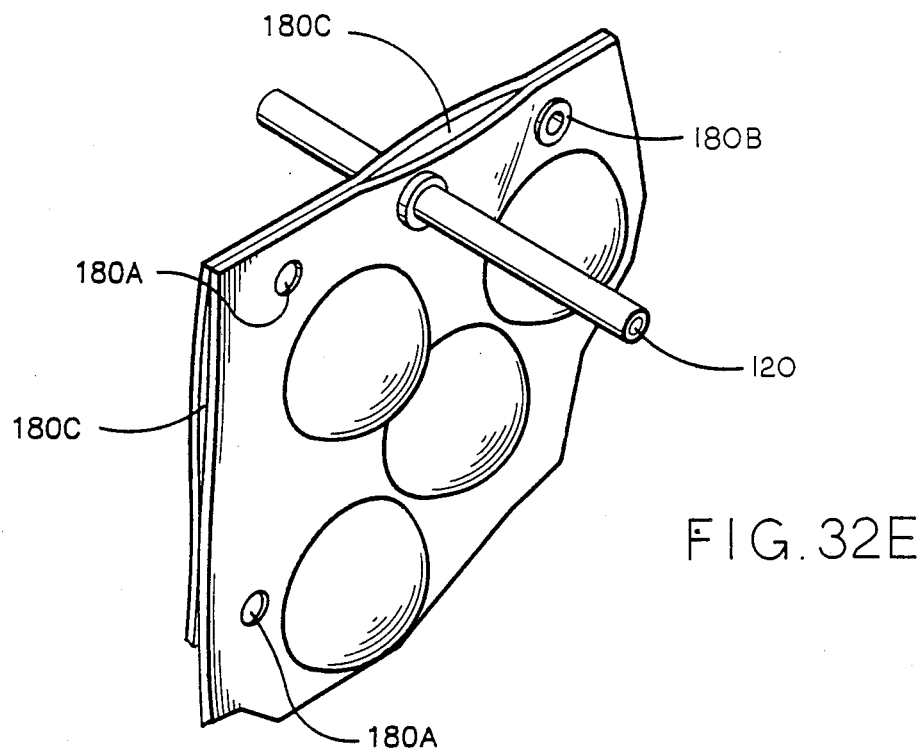
FIG. 32E is a perspective view of two sheets having 3D members thereon, showing spaced holes around the perimeter.
Figure 32F:
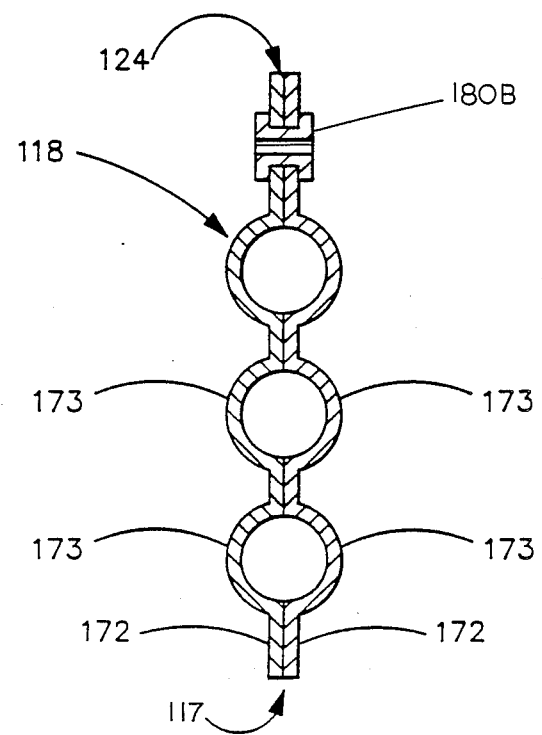
FIG. 32F is a side elevational view of the sheets shown in FIG. 32E, illustrating fasteners extending through the perimeter holes to secure the sheets together while allowing the liquid to flow between the sheets into the 3D members.

Referring to FIGS. 32A through 32F, the various embodiments of the 2D arrays 117 are manufactured by forming a pair of mating sheets 172 of plastic material with a series of protuberances 173 extending from one side 174 thereof in a given pattern (FIGS. 32C and 32F). The mating sheets 172 are arranged in opposed, touching relationship with the protuberances 173 aligned and oppositely facing to form the hollow 3D members 118 (FIGS. 32D and 32F). In FIGS. 32A through 32D, there is shown a method of sealing the mating sheets 172 together between each of the protuberances 173 to form the mating sheets 172 into the unitary sheet 124 having the 3D members 118 extending from both sides 174 thereof. The mating sheets 172 can also be formed and joined to provide sheets 164 having the ellipsoids 162 or 167 thereon. In this case, the protuberances 173 are suitably formed to become half of the ellipsoids 162 or 167.

In greater detail, one of the mating sheets 172 is provided and may be fabricated from PVC having a thickness of 20 mils and a height and length suited for the section 37 of the detention basin 29 in which it will be mounted. The x and y axes are defined as shown in FIGS. 22A and 22B.

A mold 175 (FIG. 32A), such as a vacuum forming mold, is provided with cavities 176 corresponding to half of the shape of the desired 3D members 118, which can be spherical or ellipsoidal as in the examples discussed above. In particular, to make a 2D array 117 that is to have the ellipsoids 162 or the ellipsoids 167 having a varying major axis 165, the cavities 176 would be dimensioned accordingly and different from the cavities 176 for hemispherical protuberances 173 for making the spheres 126. The cavities 176 are laid out according to the desired pattern for a particular one of the layers 125 of the 2D arrays 117. For example, to make the vertical embodiment of the 3D arrays 119 shown in FIG. 22A, either different molds 175 are used for the different A layer 125, B layer 125 and C layer 125, or the same mold is used and the perimeter edges 168, 169 and 177 (FIG. 25A) of the sheets 124 are trimmed to achieve the desired alignment of the 3D members 118, which alignment may be as shown in FIGS. 22A or 23A, for example.

The mating sheet 172 is placed on the mold 175 in the proper alignment and the mold 175 is heated, as by a resistance heater 178. The cavities 176 are connected to a vacuum pump 179 and air is withdrawn from the cavities 176 to deform the mating sheet 172 and provide half of the shape of the 3D members 118 in the form of the protuberances 173 that extend from the one side 174 of the mating sheet 172. Spaces 181 are provided between the protuberances 173 according to the selected pattern and are of minimum dimensions necessary to mate and bold the mating sheets 172. In this manner, the 3D members 118 will be as close as possible to each other to be close-packed for example in the x direction as shown in FIG. 22A.

Referring to FIG. 32C, two mating sheets 172 prepared as described above are placed with their mating sides 182 opposed and the sides 174 having the protuberances 173 facing outwardly. FIG. 32B shows a heater plate or platen 183 having cutouts 184 and narrow webs 185 between the cutouts 184 for engaging the mating sheets 172 between the protuberances 173. As shown in FIG. 32D, the mating sides 182 are placed together with the protuberances 173 aligned. The heater plate 183 squeezes the mating sheets 172 together and heat seals the sheets 172 to each other to form the integral sheet 124 having the 2D array 117 of 3D members 118 in the selected pattern.

The sheet 124 for the 2D array 117 that is to be mounted adjacent the sheet 124 formed as described above is then formed with the appropriate pattern of 3D members 118.

A typical sheet 124 may have a height in the y direction of two feet and a width of five feet.

The 3D members 118 made according to the above-described method are hollow. Because the mating sheets 172 are sealed together around each of the 3D members 118, the 3D members 118 remain hollow after immersion of the sheets 124 in the liquid 27, and become buoyant. The buoyant forces of the 3D members 118 reduce the upward forces that are required to hold the 2D arrays 117 up in the basin 225.

If the requirements of a particular clarifier basin 225 indicate that such buoyant forces are not desired or are unacceptable, then the 2D arrays 118 may be made by the following method, described with reference to FIGS. 32E and 32F. The mating sheets 172 are formed, as described above, with the protuberances 173 having the selected shape and in the desired pattern. Instead of using the plates 183 to heat seal the mating sheets 172 together, each mating sheet 172 is provided with a series of holes 180A, with the holes 180A being spaced apart by about twelve inches, for example. The sheets 172 are placed next to each other as described with respect to FIG. 32C and as shown in FIG. 32F, with the protuberances 173 aligned. The holes 180A in each sheet 172 are also aligned. Then threaded fasteners 180B, such as 5/16" hollow rivets having wide flanges, are inserted through the holes 180A and deform as shown in FIG. 32F to hold the sheets 172 together. However, as illustrated in FIG. 32E, the mating sheets 172 are free between the rivets 180B, such that as the sheets 172 flex during use, spaces 180C between the sheets 172 will allow the liquid 27 to flow or seep between the sheets 172 and into the opposed protuberances 173 that form the 3D members 118. If the conditions in a particular clarifier basin are such that not enough liquid 27 flows through the sheets 172 between the rivets 180B, the rivets 180B can be spaced further apart, or eliminated. When no rivets 180B are used, the grommets 121 hold the sheets 172 together at the top 122 of the sheet 124. Thus, the 3D members can fill with the liquid 27 or with both the liquid 27 and the solids 26 therein. This reduces or eliminates the buoyancy of the 3D members without using a dense, costly material to form the protuberances 173. Also, since the spaces 180C allow the liquid 27 and the solids 26 to flow out of the 3D members 118 upon removal of the 2D arrays 118 from the basin 225, the 2D arrays 118 are relatively light weight for ease of handling.

3D Arrays 119 With Variably Inclined Upper And Lower Sections In The Quiescent Zone 634

Figures 33, 34:
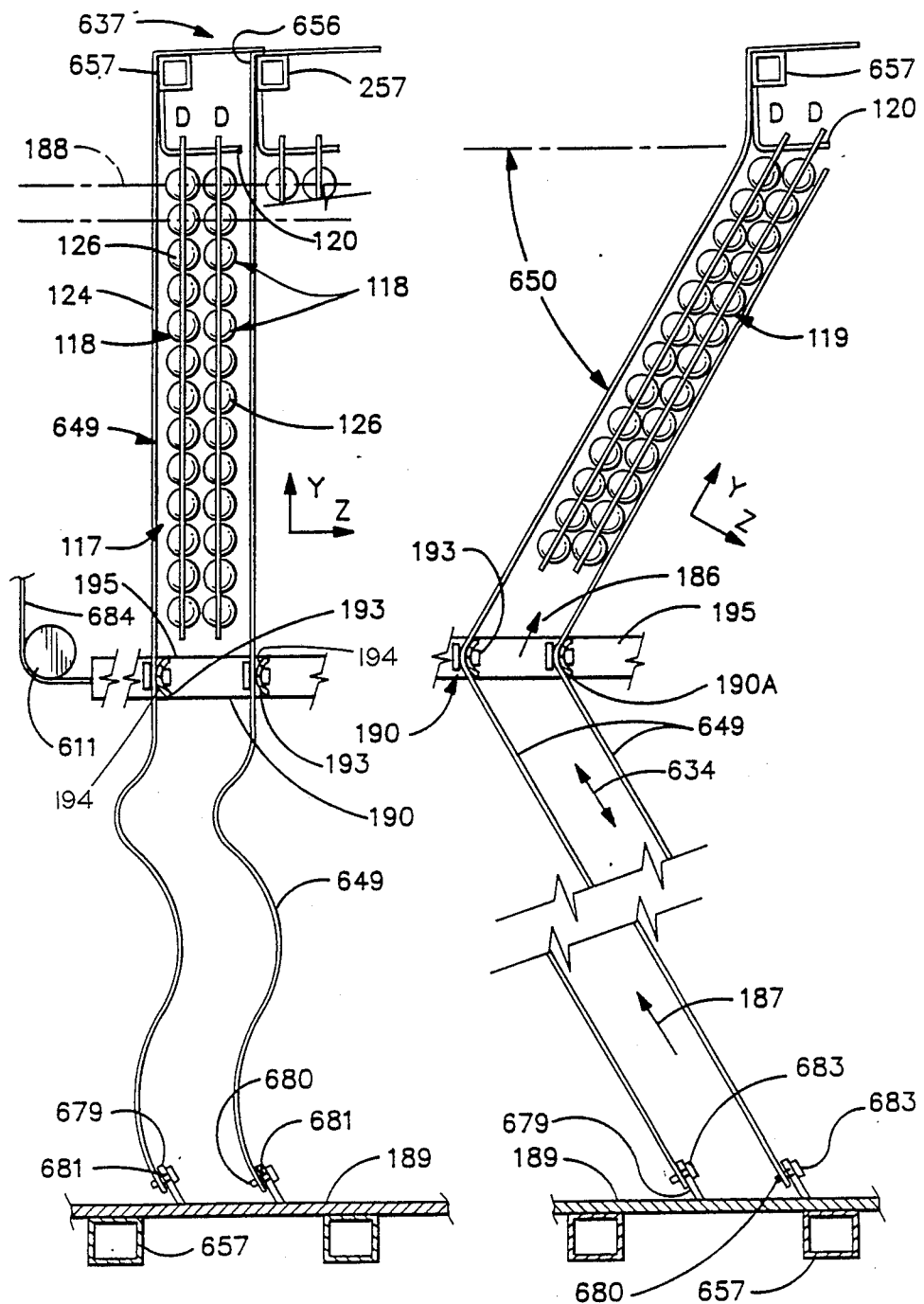
FIG. 33 is an elevational view from the side of the clarifier section showing two adjacent lamina hanging generally vertically, with 2D arrays between the upper ends of the lamina and loosely arranged.

Referring now to FIGS. 33 and 34, there is shown a further embodiment of the present invention in which the 3D arrays 119 are provided in the quiescent zones 634 defined by pairs 652 of the lamina 649. In FIG. 33, the lamina 649 are shown hanging loose and buckling since the length of each lamina 649 from a vertex 656 to a lower, fixed ladder-like structure 189 is longer than the vertical distance from the vertex 656 to such structure 189. The buckling of the lamina 649 (FIG. 33) provides enough length for the lamina 649 to be moved into the double angle position shown in FIG. 34.

As noted above, the embodiment shown in FIGS. 28A and 28B provides the quiescent zone 434 at one angle 350 relative to the upper surface 44 of the liquid 27 after adjustment of the lamina 449 using the adjustment mechanism 451. With the lamina 649 moved into the dual angle position shown in FIG. 34, the quiescent zones 634 are divided into an upper section 186 and a lower section 187. The upper section 186 is provided with the D layers 125 that form the 3D arrays 119 in the manner described above with respect to FIGS. 28A and 29B. To maximize settling in each section 186 and 187, each such section 186 and 187 may be positioned at a selectable angle relative to the upper surface 44 of the liquid 27.

Still referring to FIG. 33, the 2D arrays 117 are shown hanging generally vertically from the rods 120. The 2D arrays 117 are positioned between adjacent pairs of the lamina 649, in each quiescent zone 634. The 3D members 118 of each 2D array 117 are close-packed in the x direction (into the paper) and in the y direction, but are not close-packed or nested in the z direction. The 2D arrays 117 are thus the same as that shown in FIG. 28A. The spheres 126 extend only in the upper section 186 of the quiescent zone 634, leaving the lower section 187 open for settling the settleable solids 26 as described above with respect to FIGS. 28A and 28B.

The upper end of each lamina 649 is mounted at the vertex 656 as described above with respect to FIGS. 4A, 4B, 5A and 5B. Instead of being connected to an adjustment mechanism that is similar to the adjustment mechanism 51, the bottom 680 of each lamina 649 is provided with apertures 681 that cooperate with bolts 683. The bolts 683 secure the bottoms 680 of the lamina 649 to a ladder-like structure 189 that is held at a fixed vertical and horizontal position under the lamina 649 by the beams 657 that extend across the section 637 of the clarifier basin 629. As noted, the distance between the vertices 656 and the bottoms 680 of the lamina 649 in their generally vertical position shown in FIG. 34 is less than the length of the lamina 649. As a result, the lamina 649 buckle when they are in the vertical position shown in FIG. 33. The 2D arrays 117 are not urged into tight arrangement relative to each other and are preferably not nested or close-packed and thus do not form the close-packed 3D arrays 119. Rather, the 3D members 118 of the 2D arrays 117 hang freely and may touch or may be spaced by a small distance, such as 1/16 inch. The spheres 126 may touch, for example, along common horizontal lines 188 that coextend with the diameters of the spheres 126. If the spheres 126 do touch, they do not nest and are not close-packed. As a result, as compared to the interstices 143, there are large spaces between the 3D members 118 of adjacent 2D arrays 117 when the 2D arrays 117 hang generally vertically. The larger spaces facilitate the cleaning of the 3D arrays 119 as described below.

The extra length of the lamina 649 between the fixed bottoms 680 and their respective vertices 656 allows the lamina 649 to be moved into the dual angle position shown in FIG. 34. To move the lamina 649 from the generally vertical position shown in FIG. 33 to the dual angle position, a second ladder-like structure or knee mechanism 190 is mounted to straddle the opposite outside edges of the lamina 649 and the opposite outside edges of the sheets 124. Those opposite outside edges are the vertical edges that extend along the partition 238 shown in FIG. 21, for example, or along the outer walls 228 of the basin 229 shown in FIG. 31. A knee rung 193 extends horizontally through each quiescent zone 634 adjacent the right side of the left lamina 649 that forms each quiescent zone 634. Each knee rung 193 is located at a selected vertical position to provide the quiescent zone 634 with the upper and lower sections 186 and 187, respectively, having selected lengths when in the dual angle position shown in FIG. 34. It may be understood that by locating the knee rungs 193 at a higher position, for example, the upper section 186 will be shorter. Each knee rod 193 is formed from an arcuately-shaped member that is about one-third of a cylindrical tube having a six inch outer diameter. In this manner, when an outer curved surface 194 (FIG. 33) of the knee rung 193 engages and moves the lamina 649 horizontally, the lamina 649 assume a broad curved shape, referred to as a knee 193A, which avoids metal fatigue at the knee 193A. Grommets 194A secure the knee rung members to the knee 193A of the lamina 649.

The opposite ends of each knee rung 193 are secured to a control member 195. A tape 684 extends around a pulley 611 (FIG. 33) to a winch such as the winch 86 (FIG. 14) to move the control member 195 horizontally and vertically to move the knee rungs 193 from the position shown in FIG. 33 (at which the lamina 649 hang vertically) to the dual angle position shown in FIG. 34. As the knee rungs 193 are moved up and to the left by the control member 195, each rung 193 forces its adjacent lamina 649 to the left. As each lamina 649 moves the knee 193A is formed in each lamina 649. As this happens, the bottoms 680 of the lamina 649 are held fixed by the connection to the fixed ladder-like structure 189.

This movement of the control member 195 to the left and upwardly is selected according to the angle 650 that is desired for the upper section 186 of the quiescent zones 634 relative to the upper surface 44 of the liquid 27. One factor in selecting the angle 650 of the upper section 186 is how much and in what manner the spheres 126 of a given 2D array 117 in one of the upper sections 186 should become nested to form the 3D array 119 in each quiescent zone 634. For example, if it is desired to have the 2D arrays 117 in FIGS. 33 and 34 assume the close-packed arrangement according to the above descriptions of FIGS. 28A and 28B, then the angle 650 of the upper section 186 should be about 60° using the 2D arrays 117 described above in respect to those FIGS. 28A and 28B. In a typical installation, the upper section 163 may have a two foot length in the dual angle position shown in FIG. 34 (from the vertex 656 to the knee 193A), and the knee 193A may be offset one foot from vertical under the vertex 656. The rest of the lamina 649 would typically extend downwardly at an angle six feet from the knee 193A to the bottom 680 secured to the fixed structure 189, with the bottom 690 being offset horizontally three feet from the knee 193A. By varying these dimensions and the location of the tabs 679 horizontally on the structure 189, the lower section 187 of the quiescent zone 634 will be at a selectable angle from the upper surface 44 to promote settling of the settleable solids 26 in the lower section 187.

With the arrangement of the 2D arrays 117 shown in FIG. 33, the 3D arrays 119 are formed as described above when the control members 195 move the upper sections 186 into the angle 650 relative to the upper surface 44. To permit cleaning of the lamina 649 and the 3D arrays 119, the control member 195 is moved to the right and down so that the angle 650 becomes about 70° to unpack the 3D arrays 119 and enlarge the interstices 143 and the interconnecting passageways 158 sufficient to allow the solids 26 to flow upwardly during cleaning as described below. However, since it is desirable to continue the process of removing the solids 26 from the liquid 27 during cleaning, the cleaning apparatus 199 described below is provided.

Cleaning and Removing Solids 26 From 3D Arrays 119

Figure 35A:
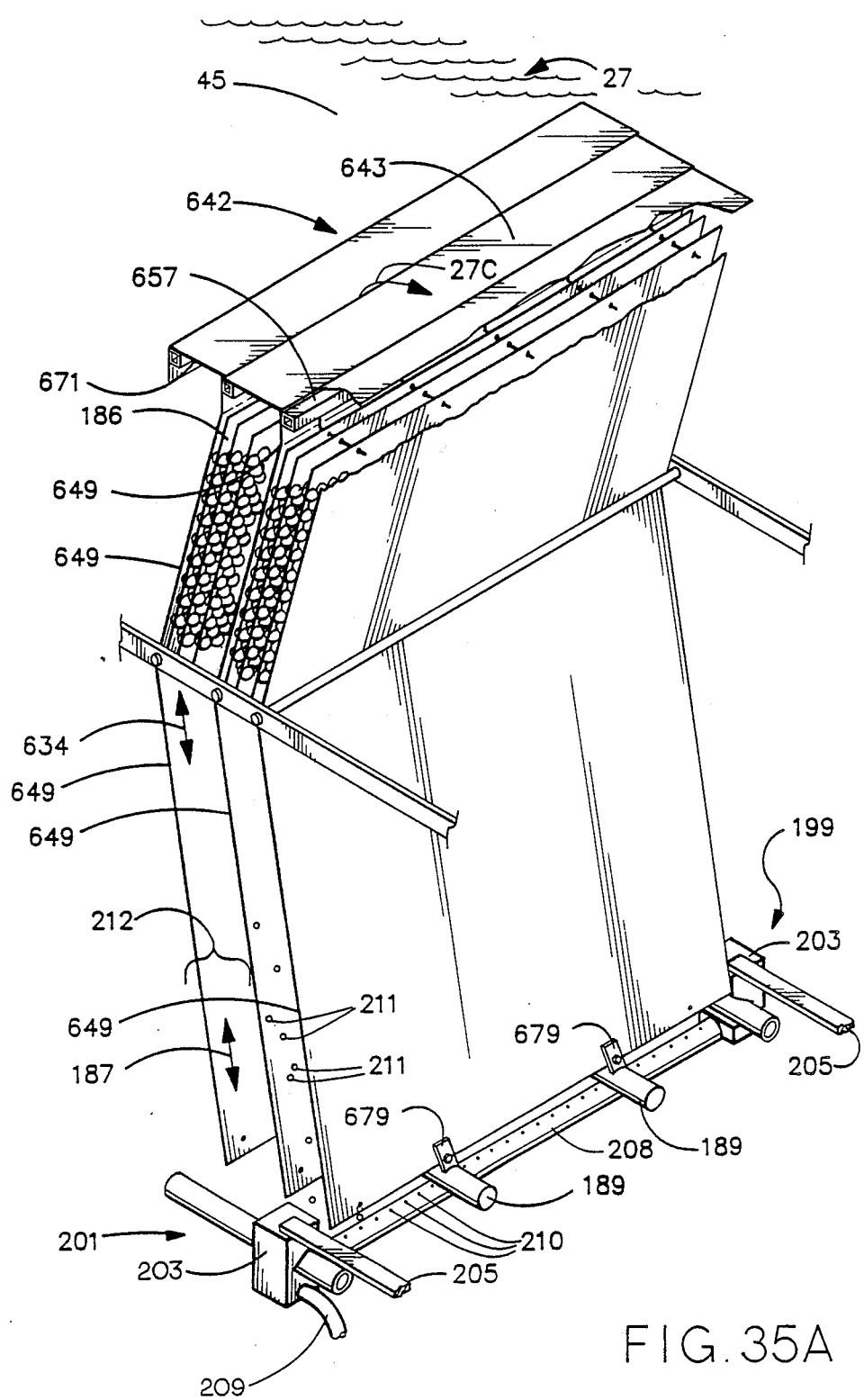
FIG. 35 is a perspective view of a pair of lamina shown in FIGS. 33, 34A and 34B, illustrating a support at the bottom of the lamina that carries an air supply pipe that extends across the section of the clarifier under the bottoms of adjacent lamina.
FIG. 35B is an elevational view of the air supply pipe shown in FIG. 35A supplying air bubbles between the adjacent lamina to clean the 3D arrays and the lamina.
Figure 35B:
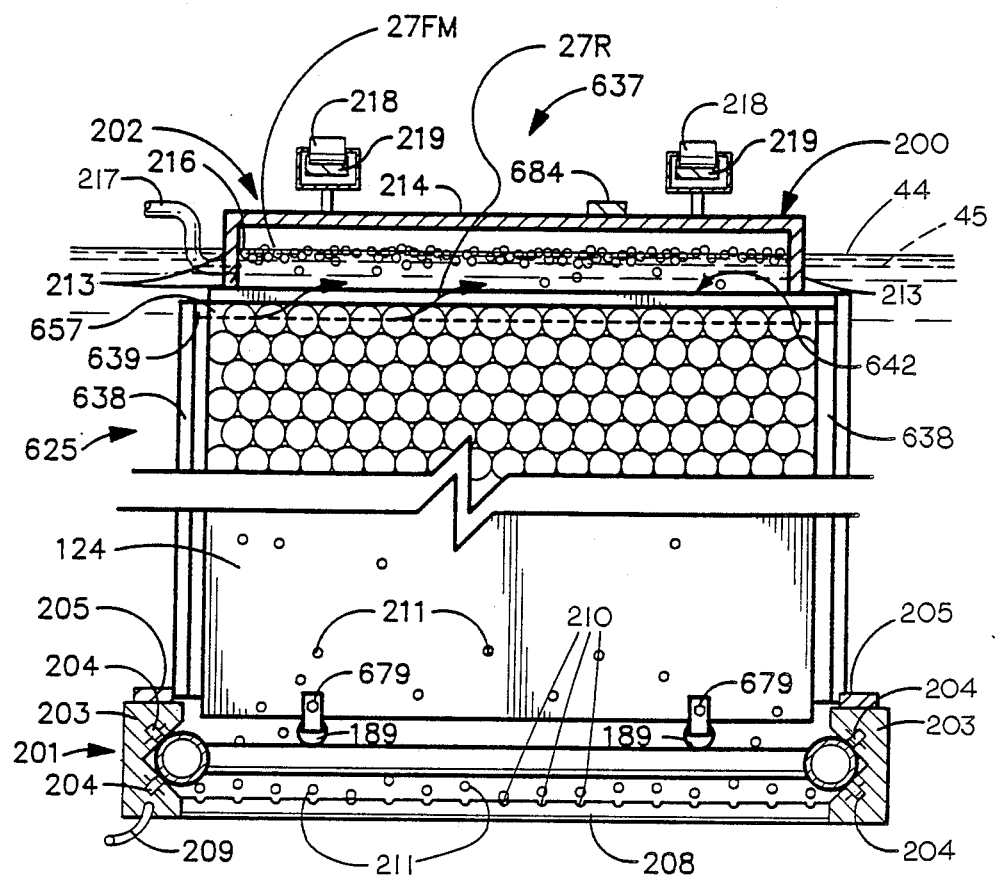

Referring now to FIGS. 35A and 35B, the 3D arrays 119 shown in FIGS. 22A and 22B are provided in the upper sections 186 of the quiescent zones 634 between the lamina 649 of the embodiment shown in FIGS. 33 and 34. The cleaning apparatus 199 is described with respect to this embodiment of the 3D arrays, but the apparatus 199 may be provided in a similar manner for use with the 3D arrays 119 shown in FIGS. 21, 27, 30 and 31 as well.

Figure 36:
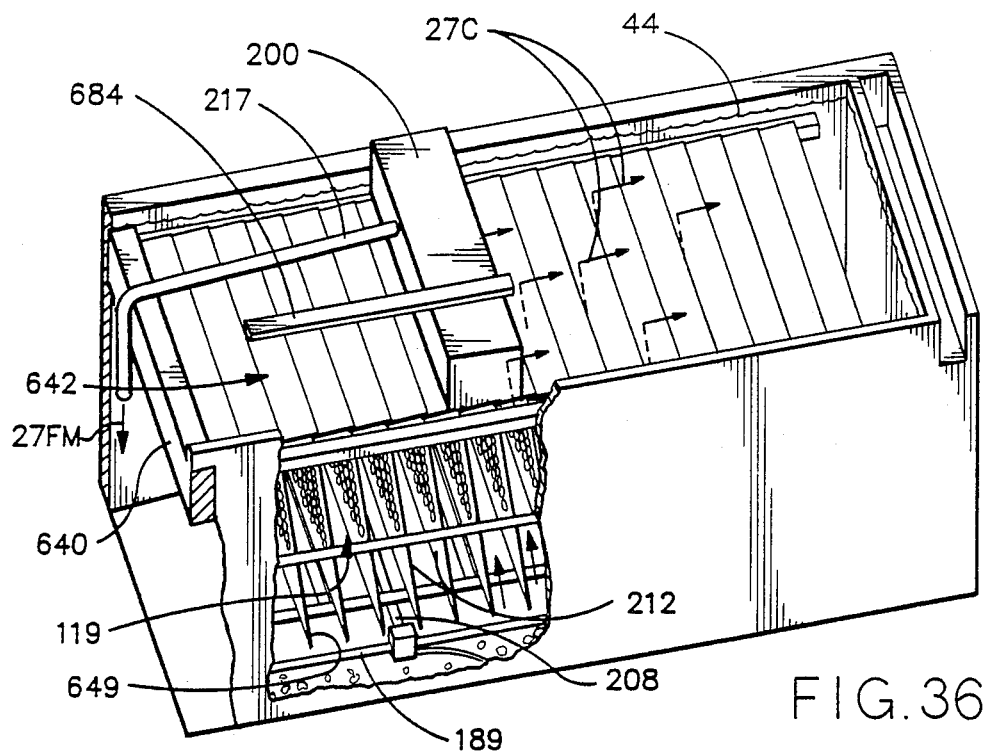
FIG. 36 is a perspective view similar to FIG. 3A showing a travelling reservoir that extends into the liquid and solids that flow above a pair of lamina during operation of the air supply pipe, wherein the reservoir travels with the pipe for collecting the solids.

Initially, the lamina 649 are shown inclined at a selected angle, which, as described above, may be the 70° angle 650 to loosen the packing of the 2D arrays 117 so that settleable solids 26 can flow upwardly in the remaining larger interstices 143 and the interconnecting passages 158 (FIG. 25A). At the angle selected for cleaning, then, the flow paths 159 (FIG. 25A) are enlarged to accept the settleable solids 26 without clogging. This angle can be easily selected since the 3D array 119 has a regular arrangement of the 3D members 118, which is loosened in a regular manner. Depending on the sizes of the solids 26, this selected angle can still nest the 2D arrays 117 enough to permit continued desired three-way operation of the 3D arrays 119 as described above. If so, the embodiment of the apparatus 199 shown in FIGS. 35A, 35B, and 36 is used so that a reservoir 200 collects the solids 26 that are carried up through the quiescent zone 634, through the gaps 671 of the flap members 643 and into the upper layer 45 of the liquid 27. The lower section 187 of the quiescent zone 634 is shown in operating condition to settle settleable solids 26 from the liquid 27. The 3D arrays 119 are provided in the upper sections 186 of the quiescent zones 634 and are shown in operating condition to remove the non-settleable solids 26 from the liquid 27 so that the clarified liquid 27C flows through the gaps 671 into the upper layer 45 (FIGS. 35A and 35B) of liquid 27 above the flow control deck 642. Subject to the above consideration the cleaning apparatus 199 separates the solids 26 from the lamina 649 and the 3D members 118 of the 3D arrays 119 during operation of the clarifier 625 without allowing significant solids 26 to remain in the clarified liquid 27C in the upper layer 45.

The cleaning apparatus 199 includes an air supply 201 below a group 212 of the lamina 649 and the 3D arrays 119 therein. The group 212 is shown in FIG. 35A as including two adjacent lamina 649. As shown in FIGS. 35B and 36, the reservoir 200 includes a solids collector 202 positioned above the air supply 201 on the other side of the lamina 649, the 3D arrays 119 and the deck 642 for collecting solids 26 separated from the groups 212 of the lamina 649 and the 3D members 118 of the 3D array 119 in that group 212.

The air supply 201 includes a pair of carriages 203 that ride on rollers 204 set at a V-shaped angle. The rollers 204 ride on opposite sides of the ladder structure 189, which extends under all of the lamina 649. When the adjustment mechanism 51 is used, the carriages 203 ride on the parallel beams 77 (FIG. 3C) of the structure 76 of that mechanism 51. Tapes 205 are connected to the carriages 203. The tapes 205 are driven in a manner similar to the tapes 84 (FIG. 3C) and 84B (FIG. 16) to move the carriages 204 along the structure 189 at a selected rate.

The air supply 201 further includes a pipe 208 supplied with high pressure air by a hose 209 that is available in standard clarifiers 25. The pipe 208 is mounted on the carriages 203 below the lamina 649 and the structure 189. Holes 210 spaced along the pipe 208 allow the high pressure air to flow upwardly as bubbles 211 that violently move and expand and enter the quiescent zone 634 between one group 212 formed by two adjacent lamina 649.

To clean all of the lamina 649 and the 3D arrays 119, the air supply 201 and the solids collector 202 are initially located at one end of the section 637 of the clarifier 625 with the air supply 201 below, and the solids collector 202 above, an end group 212 of lamina 649 and the 3D arrays 119. The air supply 201 provides the bubbles 211 of high pressure air that float upwardly through the lamina 649 of the end group 212 and through the enlarged interstices 143 (FIG. 25A) and the enlarged intermediate passages 158 (FIG. 25A) of the 3D arrays 119 of the group 212. As described above, the interstices 143 and the passages 158 have been opened or enlarged to allow passage of the bubbles 211 and the both types of solids 26. Thus, the non-settleable solids 26 also flow through the enlarged interstices 143 and the enlarged passages 158. The action of the bubbles 211 rising through the liquid 27, and of the liquid 27 displaced by the bubbles 211, remove the solids 26 that have settled on and coated the lamina 649 and cause the removed solids 26 to float upwardly in the flow paths 159 of the quiescent zone 634 of the group 212. The bubbles 211 and the liquid 27 break up the settleable solids 26 so that they flow through the 3D arrays 119 of the group 212. As the bubbles 211 and such displaced liquid 27 flow upwardly through the interstices 143 and the intermediate passages 158, the non-settleable solids 26 are removed from the 3D members 118 and flow upwardly with the pieces of the settleable solids 26. The bubbles 211 and the removed solids 26 flow with the liquid 27 through the gap 671 into the collection reservoir 200 of the solids collector 202 (see arrows 27R). As shown in FIG. 36, the collection reservoir 200 is positioned above the group 212 of the lamina 649 and the 3D arrays 119 and is larger in plan view than the group 212 to assure collection of all of the solids 26. In particular, and referring to FIG. 35B, a frame 213 of the reservoir 200 extends across the width of the section 637 of the clarifier 625 and spans beyond the group 212 of the lamina 649 and the 3D members 118. The frame 213 is dimensioned vertically to extend into the upper layer 45 of the liquid 27 and terminates adjacent the deck 642. The frame 213 has a top 214 to contain a foaming air/liquid/solids mixture 27FM that flows upwardly through the gap 671 into the reservoir 200. This mixture 27FM fills the reservoir 200. The pressure of the mixture 27FM in the reservoir 200 forces the mixture 27FM through an outlet 216 into a discharge hose 217 that is positioned to discharge the mixture 27FM into the basin 629 at a location at which the mixture 27FM will flow into the clarifier section 637 with the influent liquid 27.

The frame 213 and the top 214 of the reservoir 200 are carried on rollers 218 that ride on rails 219 that extends above the section 637 of the clarifier 625 and perpendicular to the flap members 643 of the deck 642. A tape 684 (FIGS. 35B and 36) is connected to the reservoir 200 and extends around a pulley and a winch in a manner that is similar to the pulley 85 and the winch 86 shown in FIG. 3C for moving the solids collector 202 along the rails 219 to position it over successive groups 212 of lamina 649 and the 3D members 119. The movement of the tape 684 that drives the reservoir 200 and the movement of the tapes 204 that drive the carriages 203 are synchronized by controlling the winches. In this manner the reservoir 200 of the solids collector 202 stays above the air supply pipe 208 as they advance along the section 637 of the clarifier basin 629.

Figure 37:
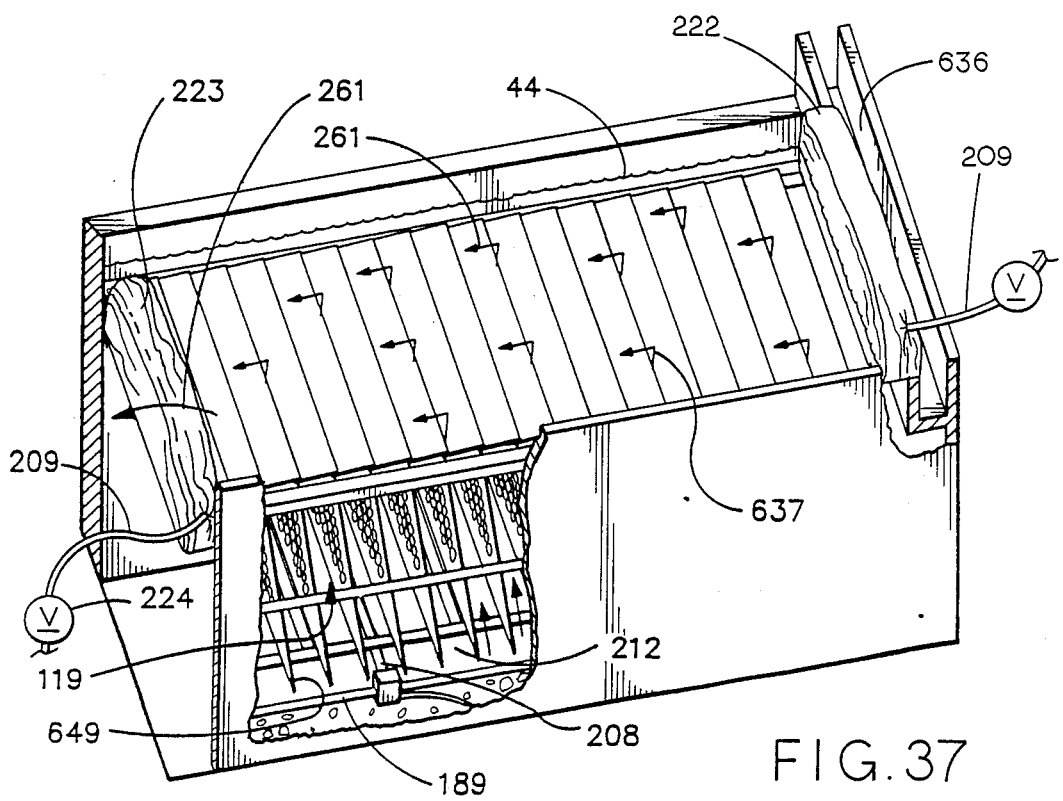
FIG. 37 is a perspective view similar to FIG. 3A showing alternate apparatus for removing the solids from above the deck, wherein inflatable dams are provided at opposite ends of the clarifier to block the weir and cause the liquid and solids to flow into the detention basin upstream of the clarifier section.

Referring to FIG. 37, if it is necessary to suspend operation of the whole clarifier section 637 during cleaning, the solids collector 202 is rendered inoperative (lifted out of the liquid 27) and a weir dam 222 is inflated by the hose 209 of the air system to prevent the liquid 27 and the foaming mixture 27FM from entering the trough 636. At the other end of the section 637, a baffle dam 223 is deflated by opening a valve 224 to allow the mixture 27FM to flow (see arrows 261) toward the left in FIG. 37 to return the foaming mixture 27FM to the basin 629 upstream of the clarifier section 637. The air pipe 208 is moved under the lamina 649 and the 3D arrays 114 to sequentially remove the solids 26 from the groups 212 and cause them to flow upwardly and through the gaps 671 as the air/solids/liquid mixture 27FM. The mixture 27FM flows onto the deck 642 and flows to the left in FIG. 37 over the deflated baffle dam 223 and into the clarifier basin 629 upstream of the lamina 649 and the 3D arrays 119. At the end of the cleaning cycle, the weir dam 222 is deflated, the baffle dam 223 is inflated and the air supply 201 is shut off to return the section 637 to its normal operating condition.

Figure 38:
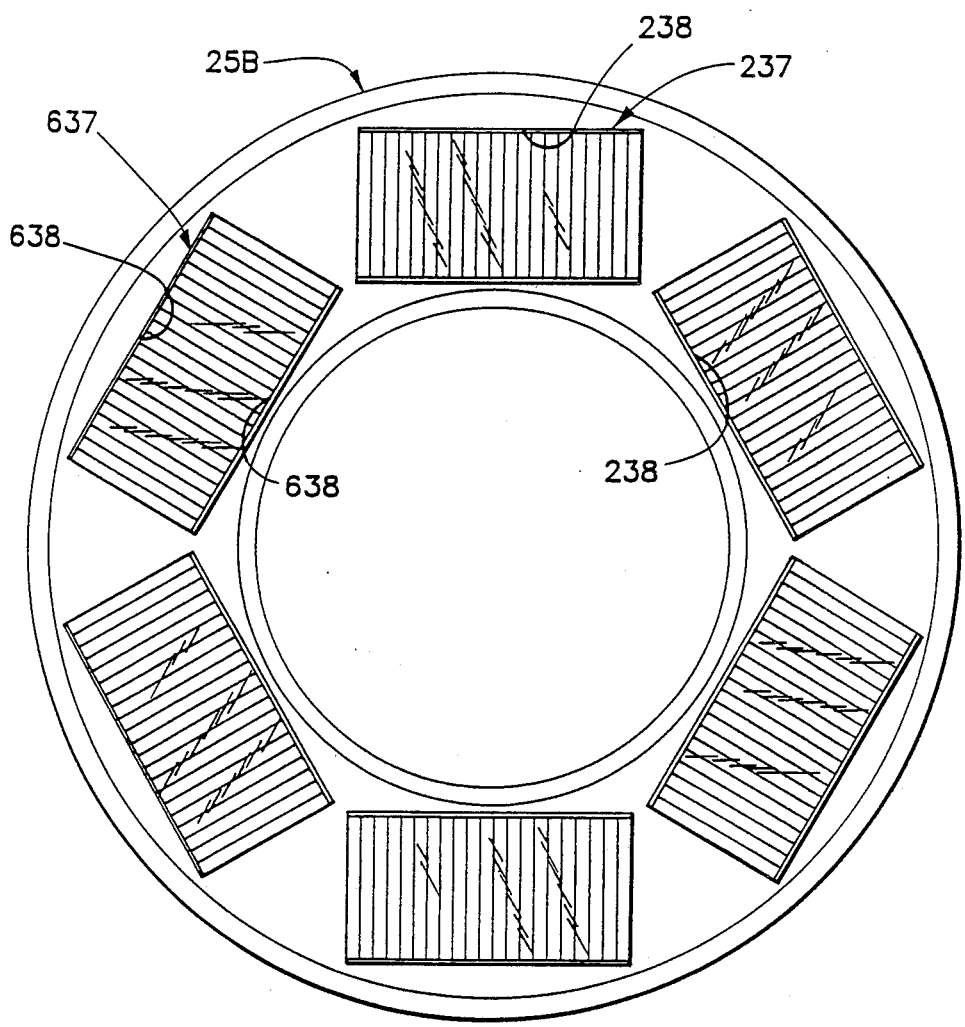
FIG. 38 is a plan view of a circular clarifier showing rectangular clarifier sections installed around an annular clarifier section.

A final embodiment of the present invention (FIG. 38) makes it easier to install the 3D arrays 119 in a circular clarifier. FIG. 38 is a plan view of the circular clarifier 25B shown in FIGS. 13 through 18. In this embodiment, the rectangular clarifier sections 237 shown in FIG. 21, or the rectangular sections 637 shown in FIGS. 33, 34, 35A and 35B are installed in the clarifier 25B as straight sections rather than being in an annular clarifier section shown in FIGS. 13 through 18. Each straight section 237 or 637 is bounded by partitions 238 or 638 such that the lamina 649 and the 3D arrays 119 can either hang vertically or at fixed angles 650 from the upper surface 44. From a practical standpoint these straight clarifier sections 237 and 637 avoid the necessity of making the ellipsoids 167. This allows the use of the 3D arrays 119 with the spheres 126 so as to allow standardizing the spheres 126 even for use in circular clarifiers.

METHODS OF THE INVENTION

Based on the above descriptions, it may be appreciated that one method of the present invention is to clarify the liquid 27 by separating the suspended solids 26 from the liquid 27. A step in this method includes dividing the detention basin 239 (FIG. 21) into a plurality of the generally vertical flow paths 634 by mounting the two-dimensional arrays 117 of 3D members 118 in the detention basin 239. Each of the flow paths 634 has an upper end at the top 122 of the 2D arrays 117. The 3D members 118 are then selectively moved into close-packed relationship, such as that shown in FIG. 22A, to form the series of interstices 143 in the flow paths 634 to promote removal of the solids 26 from the liquid 27. The selective moving of the 3D members 118 may be by moving the 2D arrays 118 horizontally in FIGS. 24A and 24B, for example, into the close-packed relationship. Alternatively, such moving may be by changing the angle 250 (FIG. 28B) of the 2D arrays 117 from vertical as shown in FIG. 28A to the angle 250 shown in FIG. 28B. That step of moving the 3D members 118 is effective to decrease the width of each of the flow paths 634 to urge the 3D members 118 of the two-dimensional arrays 117 together and to position those 3D members 118 in close-packed relationship to promote removal of the solids 26 from the liquid 27.

In the context of FIGS. 28A and 28B, the method of the present invention separates solids 26 from the liquid 27 by containing the liquid 27 and the solids 26 in the detention basin 629. A plurality of the lamina 649 are provided in the basin 629, with the lamina 649 extending downward in the liquid 27 and the so)ids 26. The lamina 649 form the flow channels 634 for the liquid 27 and the solids 26. The next step is inserting between adjacent ones of the lamina 649 at least two of the sheets 124 having the hollow spheres 126 formed thereon. The hollow spheres 126 are arranged so that the spheres 126 of adjacent ones of the sheets 124 form the interstices 143 in the flow channels 634.

Flowing the liquid 27 and the solids 26 in each flow channel 634 causes the solids 26 to be removed in said interstices 143 and become separated from the liquid 27 that flows out of the flow channels 634.

In the operation of the embodiment shown in FIGS. 28A and 28B, the method includes mounting the spheres 126 in separate vertical two-dimensional arrays 117 in each of the vertical flow paths 634. As shown in FIG. 28B, by decreasing the width of each of the flow paths 634, the two-dimensional arrays 117 are urged together and to position the spheres 126 in close-packed relationship. The flap members 643 releasably close the upper end of each of the flow paths 643. By supplying the liquid 27 and the solids 26 to the detention basin 629 under pressure, the liquid 27 flows through the interstices 143 and the passages 158 between the close-packed spheres 126 so that the solids 26 are removed from the liquid 27. As shown in FIG. 35A, the angle 650 is changed to 70° to selectively increase the width of each of the flow paths 634 to permit removal of the solids 26 from the spheres 126.

FIGS. 29A and 29B illustrate how a method of the present invention includes providing a plurality of the thin strips 558. Each of the strips 558 has formed therein the protuberance 171 extending beyond the plane of the strip 558 at regular spacing relative to the adjacent protuberances 171. The method includes weaving the thin strips 558 into closely spaced relationship to form the thin lamina or sheet 559, the lamina having the protuberances 171 of the strips 558 that extend in one weaving direction forming the three-dimensional members 118 with the strips 558 that extend in another weaving direction. A plurality of the lamina 559 are provided in the basin 629. Each lamina 559 is supported so that each lamina 559 is free to move horizontally in the basin 629 (FIG. 28A). The lamina 559 are supported in parallel relationship for defining the separate liquid flow channels 634 having widths that vary according to the angle 650 at which said lamina 559 are positioned. The lamina 559 are moved relative to each other when the angle 650 is decreased to nest the 3D members 118 to form the interstices 143 in the flow channels 634. The liquid 27 and the solids 26 in each said channel to cause the solids to become separated from the liquid 27.

While the preferred embodiments have been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. In an apparatus for clarifying liquid in which solids are suspended, including basin means for receiving the liquid and the solids suspended therein, and means for supplying the liquid and the solids to said basin means, the improvement comprising:

a plurality of arrays of three-dimensional members; and means for mounting said arrays extending downwardly in the liquid and the solids in said basin means with said three-dimensional members forming substantially parallel interstitial flowpaths through which the supplied liquid and solids flow, the solids being removed from the liquid in said flowpaths; and flow control means, in said basin means, selectively operable in response to said supplying means to substantially equalize the flow of liquid through said substantially parallel interstitial flowpaths.

2. In an apparatus according to claim 1, the further improvement comprising:

each of said arrays is generally two-dimensional and extends across said basin means; and said three-dimensional members are positioned by said mounting means in close-packed relationship to form said interstices.

3. In an apparatus according to claim 2, the further improvement comprising:

said close-packed three dimensional members also form intermediate passages between said interstices, successive ones of said interstices and intermediate passages forming flow paths for reducing the rate of flow of the liquid and the solids to promote removal of the solids from the liquid.

4. In an apparatus according to claim 1, the further improvement comprising:

each of said arrays is formed from a two-dimensional sheet that extends across said basin means, a plurality of said three-dimensional members extending from each said sheet in a third dimension and being in a regular pattern; and said mounting means being effective to position said sheets relative to each other in the third dimension to nest said three-dimensional members of one said sheet with said three-dimensional members of an adjacent sheet to form said interstices.

5. In an apparatus according to claim 1, the further improvement comprising:

each of said arrays is formed from a pair of sheets, each of said sheets having half of each said three-dimensional member formed thereon, said pair of sheets being loosely fastened together with said half members aligned to form said three-dimensional members.

6. In an apparatus for clarifying liquid in which solids are suspended, including basin means for receiving a flow of the liquid and the solids suspended therein, and means extending across said basin means for dividing at least a portion of the liquid in said basin into upper and lower sections the improvement comprising:

a plurality of arrays of three-dimensional members extending downwardly from said dividing means, adjacent ones of said arrays being positioned to nest said three-dimensional members of said adjacent arrays and define substantially parallel interstitial flowpaths for the liquid flowing from the lower section to the upper section; and said dividing means selectively operable in response to liquid flow into said basin means to substantially equalize flow of liquid through said substantially parallel interstitial flowpaths.

7. Apparatus according to claim 6, the further improvement comprising:

each of said arrays is formed from a web having said three-dimensional members extending from each side thereof.

8. Apparatus according to claim 7, wherein:

said three dimensional members are hollow and curved.

9. Apparatus according to claim 7, wherein:

said three-dimensional members are hemispheres and are positioned on one side of said web in a given pattern; and said three-dimensional members also include hemispheres positioned on the opposite side of said web in said pattern.

10. In an apparatus according to claim 6, the further improvement comprising:

sheet like members support said three dimensional members; and said three-dimensional members extend outwardly from said sheet like members.

11. In an apparatus according to claim 10, the further improvement comprising:

said three-dimensional members being provided on each said sheet-like member in close horizontal and vertical relationship to provide spaced pockets between adjacent ones of said three-dimensional members; and said three-dimensional members of said adjacent sheet-like members being positioned in offset relationship so that three-dimensional members of one of said sheet-like members extend into said pockets of an adjacent one of said sheet-like members.

12. In an apparatus according to claim 10, the further improvement comprising:

said three-dimensional members being provided on each said sheet like member in similar arrays having spaces between said three-dimensional members in each of two orthogonal directions to form pockets between said three-dimensional members of each said sheet-like member, said three-dimensional members that extend from one said sheet-like member being positioned relative to said three-dimensional members extending from an adjacent sheet-like member to nest said protuberances of one said sheet-like member into said pockets of said adjacent sheet-like member.

13. In an apparatus according to claim 10, wherein:

said three-dimensional members are hemispherical and hollow.

14. Apparatus according to claim 6, in which:

each said array of three-dimensional members includes a sheet having bubbles formed therein, each of said bubbles having a diameter of from one-half to one inch, the center of one said bubble being spaced from the center of an adjacent bubble by about the diameter of said bubbles to provide pockets for receiving said three-dimensional members from an adjacent array to permit said nesting of said arrays.

15. Apparatus according to claim 6, the further improvement comprising:

each said array of three-dimensional members includes a pair of sheets, each of said sheets having hollow projections extending from a first side thereof at regularly spaced intervals, each said sheet having a second side opposite to said first side; and means for holding said second sides together at spaced locations with said projections aligned to form said three-dimensional members from pairs of said aligned projections and allow the liquid to flow between said spaced locations and between said sheets.

16. Apparatus according to claim 6, in which the liquid received in said basin means has an upper surface, the further improvement comprising:

said arrays being provided at least across said portion of said basin means;

means for defining a collection zone at the upper surface of part of said portion of said basin means, said part including a group of said arrays;

means mounted under said collection zone and under said group of arrays for supplying air to said interstices and intermediate passages of said group of arrays to dislodge the solids from said interstices and intermediate passages and carry the dislodged solids to said collection zone; and means for moving said defining means and said supplying means relative to successive ones of said groups of arrays to clean said arrays of only said groups while the other groups of said arrays continue to clarify the liquid flowing therein from the lower section to the upper section.

17. Apparatus according to claim 6, in which the liquid received in said basin means has an upper surface, the improvement further comprising:

a weir at one end of said basin means;

said basin means having a first inflatable barrier therein, in an inflated condition said first barrier being effective to direct the flowing liquid and the solids suspended therein beneath said plurality of arrays, in a deflated condition said first barrier being effective to allow the flowing liquid and the solids suspended therein to flow above said plurality of arrays;

means mounted under said plurality of arrays for supplying air to said interstices and said intermediate passages of said arrays to dislodge the solids from said three-dimensional members around said interstices and said intermediate passages and carry the dislodged solids toward the upper surface of the liquid;

said basin means having a second inflatable barrier therein, in an inflated condition of said second barrier the liquid and the solids being blocked from flowing over said weir and out of said basin means, in a deflated condition of said second barrier the upper surface of the liquid being above said weir; and means for inflating said second barrier and deflating said first barrier during operation of said air supplying means so that the removed solids and the liquid flow over said deflated first barrier for flow under said arrays upon reinflation of said first barrier and deflation of said second barrier.

18. Apparatus for clarifying liquid in which solids are suspended, comprising:

basin means for receiving a flow of liquid and the solids suspended therein;

planar means extending across at least a part of said basin means for controlling the flow of the liquid and the solids in said basin means, said controlling means being formed from a plurality of sheet-like members, each of said members having two opposing edges;

means for holding one edge of each of said plurality of members in a fixed position in the liquid with an opposite edge of said members being in releasable sealing engagement with an adjacent holding means so that an opposite edge of each said member is free to move out of sealing engagement with said adjacent member in response to the liquid in said basin means; and a plurality of arrays of three-dimensional members extending adjacent each other and generally vertically below said planar means, said three-dimensional members of said adjacent ones of said arrays being nested so that said adjacent three-dimensional members define a plurality of interstices through which the liquid flows to said planar means.

19. Apparatus according to claim 18, wherein:

each of said arrays is form from a web having said three-dimensional members extending from each side thereof, adjacent ones of said webs defining a flow channel in which the liquid flows to said planar means.

20. Apparatus according to claim 19, wherein:

said webs have a top section and a bottom section, said three-dimensional members extending only from said top sections so that said flow channels are larger near said bottom section than near said top section at which said interstices are located.

21. Apparatus according to claim 19, wherein:

said three-dimensional members are hollow and curved.

22. Apparatus according to claim 19, wherein:

said three-dimensional members are hemispheres and are positioned on one side of said web in a given pattern; and said three-dimensional members also include hemispheres positioned on the opposite side of said web in said pattern.

23. In an apparatus for clarifying flowing liquid by separating suspended solids from the liquid, including flow controller barrier means for dividing at least a portion of the liquid into upper and lower sections, said barrier means including a plurality of elongated members, each of said elongated members having opposing free and fixed ends; means for mounting said elongated members so that each said elongated member is cantilevered with the free end thereof in releasable sealing engagement with a fixed end of an adjacent one of said elongated members to form a horizontal planar barrier between said upper and lower sections of the liquid; and means for supplying the liquid and the suspended solids beneath said barrier means to create a of said elongated members upwardly to promote equal liquid flow from said lower section to said upper section through each unit of area covered by said barrier means; the improvement comprising:

means for dividing the liquid flow from said lower section to said upper section into a plurality of flow channels, said dividing means being formed from a plurality of generally vertically extending adjacent sheet-like members having protuberances extending from each side thereof, said protuberances of one said sheet-like member extending toward one said adjacent sheet-like member between said protuberances of said adjacent sheet-like member to define said flow channels.

24. In an apparatus according to claim 23, the further improvement comprising:
said protuberances being provided on each said sheet-like member in close horizontal and vertical relationship to provide horizontally and vertically spaced pockets between adjacent protuberances; and
said protuberances of said adjacent sheet-like members being positioned in close relationship so that said protuberances of said one sheet-like members extend into said pockets of an adjacent one of said sheet-like members.

25. In an apparatus according to claim 23, the further improvement comprising:
said protuberances being provided on each said sheet-like member in regular, close horizontal and vertical relationship to provide a series of spaced pockets between adjacent ones of said protuberances; and
said protuberances of said adjacent sheet-like members being positioned in rows that are horizontally offset so that protuberances of one of said sheet-like members extend into said pockets of an adjacent one of said sheet-like members.

26. In an apparatus according to claim 23, the further improvement comprising:
said protuberances being provided on each said sheet like member in similar arrays in each of two orthogonal directions to form pockets between said protuberances of one said sheet-like member in each of said directions, said protuberances that extend from one of said sheet-like members being offset in said two directions from said protuberances that extend from one of said adjacent sheet-like members to nest said protuberances of one said sheet-like member into said pockets of said adjacent sheet-like member.

27. In an apparatus according to claim 23, wherein:
said protuberances are hemispherical and hollow, and said protuberances of one sheet-like member extend toward said adjacent sheet like members to define, with said protuberances of said adjacent sheet-like member, said flow channels having interstices for separating the solids from the liquid.

28. In an apparatus according to claim 23, the further improvement comprising:
means extending into each said flow channel for moving said adjacent sheet-like members to adjust the amount that said protuberances of one said sheet-like member extend toward said protuberances of said adjacent sheet-like member.

29. Apparatus according to claim 28, wherein:
said moving means includes a pair of vertically extending lamina having a selected number of said sheet-like members therebetween, and an arm extending between and into engagement with each of said lamina, said arm being movable to move said lamina to cause said sheet-like members to move and adjust the amount by which said protuberances of one said sheet-like member extend toward said protuberances of said adjacent sheet-like member.

30. A system for clarifying liquid that is particle-laden, comprising:
means for supplying particle-laden liquid to said system;
means for defining an opening through which the liquid flows out of said system;
means mounted on said defining means and extending over at least a portion of said opening for normally closing said portion of said opening, said closing means being movable in response to the force of the liquid tending to flow through said portion of said opening to control the flow of the clarified liquid out of said system;
spacer means for dividing the particle-laden liquid into separate liquid flow channels and dividing said portion of said opening into sections, one said section being provided for each said flow channel so that the liquid flowing in a given one of said flow channels exits said system through a given section of said opening; and
a three-dimensional array of hollow polyhedronal units received in each of said liquid flow channels for forming a plurality of interconnected interstices and intermediate passages within each said flow channel.

31. A system according to claim 30, wherein the particles include settleable and non-set particles, further comprising:
said liquid flow channels having an upper portion and a lower portion; and
said means for mounting said three-dimensional array only in said upper portion of each said liquid flow channel to form said interconnected interstices and intermediate passages for settling the non-settleable particles after the settleable particles have settled in said lower portion.

32. A system according to claim 30, wherein:
said three-dimensional array is formed by separate sheets, each of said sheets having multiple ones of said polyhedronal units extending therefrom to form nests between adjacent groups of said polyhedronal units, said polyhedronal units of a given one of said sheets being received in said nests of one of said sheets that is adjacent to said given one of said sheets to form said interconnected interstices and intermediate passages.

33. A system according to claim 32, further comprising:
said polyhedronal units being provided on a plurality of said sheets that extend generally parallel to said flow channels, said polyhedronal units being in a regular pattern having relatively uniform spaces between adjacent polyhedronal units; and
means for mounting said sheets in said flow channels with said polyhedronal units of a first of said sheets adjacent said polyhedronal units of a second of said sheets to form said three-dimensional array as a three-dimensional close-packed arrangement of said polyhedronal units.

34. A system according to claim 32, further comprising:
said polyhedronal units being provided on a plurality of said sheets that extend generally parallel to said flow channels, said polyhedronal units being in a regular pattern having relatively uniform spaces between adjacent polyhedronal units; and
means for moving said sheets in each said flow channel to position said polyhedronal units of a first one of said sheets in said spaces of a second one of said sheets to form said three-dimensional array as a three-dimensional, close-packed arrangement of said polyhedronal units.

35. Apparatus for separating solids from liquid, comprising:
a detention basin for containing the liquid and the solids, the liquid having an upper surface;
a plurality of parallel lamina extending in said basin at a selectable angle relative to the surface of the liquid in said basin for defining separate liquid flow channels; and
a plurality of interconnected polyhedrons mounted in said separate flow channels to form a plurality of two-dimensional arrays of said polyhedrons, said polyhedrons of one said two-dimensional array being nested with said polyhedrons of an adjacent two-dimensional array when said lamina are at a first angle relative to the surface of the liquid, said polyhedrons of said one two-dimensional array not being nested with said polyhedrons of said adjacent two-dimensional array when said lamina are at a second angle relative to the surface of the liquid.

36. Apparatus according to claim 35, wherein:
said series of interconnected polyhedrons only extend in that part of said liquid flow channels that is toward the upper surface of the liquid.

37. Apparatus according to claim 35, further comprising:
means for moving each of said lamina to change said angle of each of said lamina, said changing of said angle being effective to selectively nest said polyhedrons for separating the solids from the liquid and to move said polyhedrons from said nested relationship to permit cleaning of said polyhedrons.

38. Apparatus according to claim 35, further comprising:
means for supplying air beneath a selected group of said lamina;
means extending through the upper surface of the liquid and vertically aligned with said air supplying means for collecting solids from said selected group of said lamina and said two-dimensional arrays in said group of lamina; and
means for moving said air supplying means and said collecting means in unison relative to all said parallel lamina to dislodge the solids from successive groups of said lamina and said two-dimensional arrays in said group of lamina and to collect the dislodged solids at the upper surface of the liquid.

39. Apparatus according to claim 38, further comprising:
said collecting means includes a frame that defines a collection zone above said group of said lamina;
means for changing said angle of each of said lamina to partially move said polyhedrons out of nested relationship into a partially nested relationship;
said air supplying means being effective to move the dislodged solids through said partially nested polyhedrons into said collection zone; and
said moving means moves said air supplying means and said collecting means to supply air to successive ones of said groups and to said collection zone so that said collection zone stays above said successive ones of said groups to collect the dislodged solids.

40. Apparatus for separating solids from liquid to clarify the liquid, comprising:
a detention basin having walls for containing the liquid and the solids, an outlet for clarified liquid and a bottom, the liquid having an upper surface within said basin;
a plurality of parallel lamina, adjacent ones of said lamina dividing at least a portion of said detention basin into a plurality of flow channels, each of said flow channels being open adjacent said bottom of said basin for receiving the liquid and the solids and guiding the liquid and the solids toward the upper surface of the liquid;
a plurality of two-dimensional arrays of interconnected filter media, a selected number of said arrays being received in each of said flow channels in adjacent relationship, said media of a first of said two-dimensional arrays being in nested relationship with said media of a second of said two-dimensional arrays; and
a flow controller member attached to each of said lamina and extending generally parallel to and under the upper surface of the liquid, a first of said members extending from its respective lamina in releasible sealing engagement with the adjacent end of the next adjacent member.

41. Apparatus according to claim 40, further comprising:
said media in said nested relationship forming interstices effective to reduce the rate of flow of the liquid and the solids in said flow channels; and
means for flowing the liquid and the solids into said detention basin at a pressure differential causing the liquid and the solids to flow upward in said flow channels and through said interstices of said media in said nested relationship toward said flow controller members, said media in said nested relationship promoting removal of the solids from the liquid, each said flow controller member being movable out of the sealing engagement with said next adjacent member in response to the liquid flowing upward in its respective channel to open its respective flow channel formed by said adjacent lamina and allow the clarified liquid to flow out of said flow channel toward said outlet.

42. Apparatus according to claim 40, wherein the solids include settleable and non-settleable materials, and wherein:
said lamina have a selected length extending from a top thereof adjacent the upper surface of the liquid;
each of said arrays has a given length that is shorter than said selected length; and
said arrays are received in said flow channels toward said tops of said lamina so that said interstices are formed in the upper ends of said flow channels, the lower ends of said flow channels being effective to settle the settleable materials and said interstices being effective to separate the non-settleable materials from the liquid.

43. Apparatus according to claim 40, wherein:
each said two-dimensional array of filter media is formed from a two-dimensional web having three-dimensional members extending from each side thereof.

44. Apparatus for separating solids from liquid, comprising:
a detention basin for the liquid and the solids, said basin having an outlet, a bottom section and an upper section, said liquid having an upper surface in said basin;
means for supplying the liquid and the solids to said bottom section of said detention basin, said supplying means causing the liquid to flow from said bottom section to said upper section in said detention basin;

dividing means for creating a plurality of separate liquid flow channels in said lower section of said detention basin, each said channel having an upper end and a lower end;

means for supporting said dividing means in said lower section of said detention basin with said upper end below the upper surface of the liquid;

a plurality of two-dimensional arrays of interconnected filter media, each said array having an upper end, ones of said arrays being received in at least one of said flow channels;

means for holding said upper ends of said arrays at a given vertical position in at least said one flow channel with said media in a loose three-dimensional arrangement; and means for moving said dividing means to position said flow channels at common selectable angles in relation to the upper surface of the liquid in said detention basin, at a first of said angles said channels having a width for receiving said media in said loose three-dimensional arrangement, at a second of said angles said channels being effective to press said two-dimensional arrays of media together transversely of the length of said flow channels into a three-dimensional close-packed arrangement to promote removal of the solids from the liquid.

45. Apparatus according to claim 44, wherein:

each of said arrays includes at least one sheet, each of said sheets having a plurality of hollow polyhedrons thereon forming said filter media.

46. Apparatus according to claim 45, wherein:

said hollow polyhedrons are formed in a regular pattern on each of said sheets, each said pattern being the same on each of said sheets.

47. Apparatus according to claim 44, wherein:

said moving means engages said dividing means between said upper end and said lower end of said channels to form each said channel into an upper portion extending at said second common selectable angles and a lower portion at a third of said common selectable angles; and said holding means holds said arrays in said upper portions of said channels.

48. Apparatus according to claim 47, wherein:

said dividing means includes a plurality of flexible lamina extending generally vertically in said detention basin, and means positioned at selected locations having a given vertical spacing for holding the top and bottom said lamina in fixed positions, each said lamina having a length exceeding said vertical spacing so that when said lamina are positioned at said first selectable angle said lamina are buckled; and said moving means includes a knee member extending horizontally across said detention basin and engaging each said lamina, and means for moving each said knee member generally horizontally to cause said lamina to assume a generally V-shape as it extends between said selected locations.

49. Apparatus for clarifying liquid by removing solids from the liquid, comprising:

a cylindrical basin having an outer curved wall, an outlet and an inner curved partition for defining an annular clarifier portion, said clarifier portion containing the liquid and the solids, said liquid having an upper surface;

means for supplying the liquid and the solids into said basin for flow upwardly into said clarifier portion;

a plurality of flexible lamina each having first, second, third and fourth sides, each said lamina being positioned at an angle relative to the upper surface of the liquid and adjacent other said lamina in a radial arrangement around said partition, said first side of each of said lamina being adjacent said outer curved wall of said basin, said third side of each of said lamina being adjacent said partition, said second side of each said lamina extending along a first radial path adjacent the upper liquid surface, said fourth side of each said lamina extending along a second radial path spaced from the upper liquid surface;

a three-dimensional array of filter media between adjacent ones of said lamina in said clarifier portion; and means for moving said first radial paths into a new angular relationship with respect to said second radial paths to adjust said angle of said lamina relative to the upper surface of the liquid from a first angle to a second angle, said lamina at said first angle being effective to maintain said three-dimensional array in a close-packed arrangement to promote removal of the solids in the clarifier section, said lamina at said second angle being effective to release said three-dimensional array so that said media spread apart into a loose-packed arrangement.

50. Apparatus according to claim 49, wherein:

each said three-dimensional array of media extends radially and vertically in said clarifier portion, each said three-dimensional array including a plurality of sheets, each said sheet having bubble-like protrusions thereon, said protrusions having a selected dimension extending perpendicularly from said sheets, said selected dimension of said protrusions that are toward said outer wall being greater than said selected dimension of said protrusions that are adjacent said inner partition, said selected dimension gradually becoming less for the protrusions that extend from said outer wall toward said inner partition.

51. Apparatus according to claim 50, wherein:

said bubble-like protrusions are ellipsoids having a minor axis and a major axis, the selected dimension being the dimension of said major axis, the dimension of the minor axes of said protrusions being relatively the same, the selected dimension of the major axes of said protrusions adjacent said outer wall being greater than that of said protrusions adjacent said inner partition to compensate for decreased space between adjacent lamina as said adjacent lamina extend radially inward from said outer wall to said inner partition.

52. Apparatus according to claim 49, wherein:

said three-dimensional array is formed from a plurality of webs, each of said webs having three-dimensional members extending from each side thereof.

53. Apparatus according to claim 52, wherein:

said three-dimensional members are hollow and curved.

54. Apparatus according to claim 52, wherein:

said three-dimensional members are hemispheres and are positioned on one side of each said web in a given pattern; and said three-dimensional members also include hemispheres positioned on the opposite side of each said web in said pattern.

55. Apparatus for clarifying liquid by separating solids from the liquid, comprising:

a cylindrical detention basin having an outlet, a curved outer wall and a central cylindrical partition provided with a smaller radius than that of said outer wall to form an annular clarifier section within which liquids and solids suspended therein are contained;

means for flowing the liquid and the solids upwardly in said clarifier section;

planar flow controller means extending radially from said curved wall to said cylindrical partition for controlling the flow of the liquid and the solids in said clarifier section, said controller means being formed from a plurality of sheet-like members, each of said members having two opposing edges;

means for holding one edge of each of said plurality of members in a fixed position in the liquid with an opposite edge of each of said members being in releasable sealing engagement with an adjacent one of said members so that said opposite edge of each said member is free to move out of sealing engagement with said adjacent member in response to the upward flow of the liquid in said clarifier section to allow clarified liquid to flow toward said outlet;

a plurality of parallel lamina extending downwardly in said clarifier section at a variable angle relative to the surface of the liquid in said basin for defining separate liquid flow channels in said clarifier section;

a plurality of two-dimensional arrays of interconnected three dimensional protrusions extending vertically in each said flow channel below said sheet-like members, said three dimensional protrusions of one said array normally being spaced apart or touching in loosepacked relationship horizontally; and means for moving said lamina in tandem to change said angle of said lamina and cause adjacent pairs of said lamina to move toward each other and press said three dimensional protrusions therebetween together into nested relationship to encourage separation of the solids from the liquid.

56. Apparatus according to claim 55, wherein:
each of said two-dimensional arrays is formed from a web having said three-dimensional protrusions extending from each side thereof.

57. Apparatus according to claim 56, wherein:
said three-dimensional protrusions are hollow and curved.

58. Apparatus according to claim 57, wherein:
said three-dimensional protrusions are hemispheres and are positioned on each side of said web in a given pattern.

59. Apparatus according to claim 55, wherein:
a two-dimensional member said three-dimensional protrusions of each of said two-dimensional arrays; and said three-dimensional protrusions of a given array extend outwardly from each side of one said two-dimensional member.

60. Apparatus according to claim 59, further comprising:

said three-dimensional protrusions being provided on each said two-dimensional member in close horizontal and vertical relationship to provide a series of regularly spaced pockets along each two-dimensional array; and said three-dimensional protrusions of said adjacent two-dimensional members being pressed by said moved lamina so that said three-dimensional protrusions of one said two-dimensional member extend into said pockets of an adjacent one of said two-dimensional members to form said nested relationship.

61. Apparatus for separating settleable solids from liquid, comprising:

a detention basin having a curved outer wall for containing the liquid and the solids, said basin having a curved partition having a radius less than the radius of said curved outer wall of said detention basin, the liquid in said basin having an upper surface;

a plurality of lamina, each of said lamina having upper and lower edges and having opposing sides;

means for mounting each upper edge of said lamina along a different upper radial path extending from said curved outer wall of said detention basin to said partition, each of said lamina extending downward at an angle relative to the upper surface of the liquid, said plurality of lamina defining separate liquid flow channels;

filter polyhedrons received in each said flow channel, said polyhedrons being interconnected to form separate two-dimensional arrays of polyhedrons that are normally loosely arranged in a third dimension in said flow channels; and means connected to each said lower edge of each said lamina for tandemly positioning each said lower edge along a different lower radial path that is angularly and vertically offset relative to said corresponding upper radial path so that said opposing sides of each said lamina extend along curved paths adjacent both said curved outer wall and said partition to define said separate flow channels, said tandem positioning being effective to move adjacent lamina closer together to press said separate two-dimensional arrays toward each other and cause said polyhedrons to nest in said third dimension.

62. In an apparatus according to claim 61, the further improvement comprising:

said polyhedrons being interconnected by a sheet-like member;

said polyhedrons being provided on each said sheet-like member in similar patterns and having pockets therebetween, said tandem positioning being effective to move adjacent sheet-like members relative to each other in a direction generally parallel to said lamina so that said polyhedrons of one said sheet-like member move into said pockets of said adjacent sheet-like member.

63. A method of clarifying liquid by separating solids from the liquid, comprising the steps of:

dividing a detention basin into a plurality of generally vertical flowpaths by mounting two dimensional arrays of three-dimensional filter members in said detention basin, each of said flowpaths having an upper end; and selectively moving said filter members into close-packed relationship to form a series of interstices in said flowpaths to promote removal of the solids from the liquid in said flowpaths; and controlling the flow through said flowpaths to substantially equalize the flow through said plurality of vertical flowpaths.

64. The method of claim 63, comprising the further steps of:

forming said arrays of filter members from a plurality of sheets, each said sheet having protuberances extending therefrom in a regular pattern and having spaces between said protuberances; and said step of selectively moving results in said protuberances of one said sheet moving into said spaces of an adjacent one of said sheets to form said interstices.

65. A method according to claim 63, wherein:

said form step includes forming a pair of sheets with semi-spherical pockets and joining said sheets with said pockets aligned to form said protuberances.

66. A method of clarifying liquid by separating solids from the liquid, comprising the steps of:

dividing a detention basin into a plurality of generally vertical flow paths each having an upper end;

mounting two-dimensional arrays of three-dimensional filter members in each of said vertical flow selectively decreasing the width of each of said flow paths to selectively urge said members of said two-dimensional arrays together and position said members in close-packed relationship to promote removal of the solids from the liquid in said flow paths.

67. The method of clarifying liquid according to claim 66, including the further steps of:

supplying the liquid and the solids to the basin under pressure to cause the liquid to flow through said close-packed members so that the solids are removed from the liquid in said flow paths; and selectively increasing the width of each of said flow paths to permit said three-dimensional members to spread from said close-packed relationship to promote release of the removed solids.

68. A method of separating solids from liquid, comprising the steps of:

containing the liquid and the solids in a detention basin;

providing a plurality of lamina in said basin, said lamina extending downward in the liquid and the solids, said lamina forming flow channels for the liquid and the solids;

inserting between adjacent ones of said lamina at least two sheets having hollow spheres formed thereon, said hollow spheres of said sheets being arranged so that adjacent ones of said sheets form interstices in said flow channels;

flowing the liquid and the solids in each said flow channel to cause the solids to remain in said interstices and become separated from the liquid that flows out of said flow channels; and controlling the flow through said flow channels to substantially equalize the flow through said interstices in said flow channels.

69. A method of separating solids from liquid, comprising the steps of:

containing the liquid and the solids in a detention basin, the liquid having an upper surface;

providing a plurality of thin strips, each of said strips having formed therein a protuberance extending beyond the plane of said strip at regular spacing relative to the adjacent protuberance;

weaving said thin strips into closely spaced relationship to form a thin lamina, said lamina having said protuberances of said strips that extend in one weaving direction forming three-dimensional members with said strips that extend in another weaving direction;

providing a plurality of said lamina in said basin;

supporting each said lamina so that each said lamina is free to move horizontally in said basin, said lamina being supported in parallel relationship for defining separate liquid flow channels having widths that vary according to the angle at which said lamina are positioned;

moving said lamina horizontally relative to each other to nest said three-dimensional members to form interstices in said flow channels; and flowing the liquid and the solids in each said channel to cause the solids to become separated from the liquid that flows out of said channels.

70. The method of separating solids from liquid according to claim 69, wherein:

said moving step tilts said lamina relative to the upper surface of the liquid in said basin so that one said lamina moves longitudinally relative to an adjacent one of said lamina to nest said three-dimensional members.

* * * * *